United States Patent
Matsumoto et al.

(10) Patent No.: US 11,005,346 B2
(45) Date of Patent: May 11, 2021

(54) ALIGNMENT METHOD AND ALIGNMENT DEVICE FOR ANNULARLY ALIGNED CONDUCTORS

(71) Applicant: HONDA MOTOR CO., LTD., Tokyo (JP)

(72) Inventors: Yutaka Matsumoto, Tochigi (JP); Nobuhisa Takahashi, Tochigi (JP); Kenichi Ohno, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 16/086,730

(22) PCT Filed: Mar. 22, 2017

(86) PCT No.: PCT/JP2017/011445
§ 371 (c)(1),
(2) Date: Sep. 20, 2018

(87) PCT Pub. No.: WO2017/164236
PCT Pub. Date: Sep. 28, 2017

(65) Prior Publication Data
US 2019/0103792 A1    Apr. 4, 2019

(30) Foreign Application Priority Data
Mar. 22, 2016  (JP) .............................. JP2016-057373

(51) Int. Cl.
*H02K 15/085*    (2006.01)
*H02K 15/06*    (2006.01)
(Continued)

(52) U.S. Cl.
CPC ........... *H02K 15/085* (2013.01); *H02K 15/06* (2013.01); *H02K 15/066* (2013.01);
(Continued)

(58) Field of Classification Search
CPC .... H02K 15/085; H02K 15/06; H02K 15/066; H02K 15/0043; H02K 15/0428; H02K 15/064
See application file for complete search history.

(56) References Cited

U.S. PATENT DOCUMENTS

| | | | |
|---|---|---|---|
| 6,425,175 B1 * | 7/2002 | Sawada | H02K 15/0414 29/564.1 |
| 8,726,493 B2 * | 5/2014 | Guercioni | H02K 15/0081 29/606 |

(Continued)

FOREIGN PATENT DOCUMENTS

| | | |
|---|---|---|
| JP | 2011-229334 | 11/2011 |
| JP | 2012-235544 | 11/2012 |

(Continued)

OTHER PUBLICATIONS

International Search Report, dated Jun. 13, 2017 (dated Jun. 13, 2017), 1 page.

*Primary Examiner* — Peter Dungba Vo
*Assistant Examiner* — Jeffrey T Carley
(74) *Attorney, Agent, or Firm* — Rankin, Hill & Clark LLP

(57) ABSTRACT

The alignment method of the electrical conductors includes an aligning step of aligning a plurality of electrical conductors 40 in an annular shape while being overlapped in a circumferential direction of the annular shape by moving gripping devices 230 inward in a radial direction of the annular shape, in which the gripping device 230 has a pair of claws 232g1 and 232g2 capable of pinching one leg portions 41 of the substantially U-shaped electrical conductors 40 one by one, one claw 232g1 has a length capable of gripping one leg portion 41, and the other claw 232g2 has a length capable of gripping one leg portion 41 of one substantially U-shaped electrical conductor 40-1 and gripping (Continued)

the other leg portion 44 of the other substantially U-shaped electrical conductor 40-2.

3 Claims, 39 Drawing Sheets

(51) Int. Cl.
*H02K 15/00* (2006.01)
*H02K 15/04* (2006.01)

(52) U.S. Cl.
CPC ..... *H02K 15/0043* (2013.01); *H02K 15/0428* (2013.01); *H02K 15/064* (2013.01)

(56) References Cited

U.S. PATENT DOCUMENTS

| | | | |
|---|---|---|---|
| 9,444,315 B2 | 9/2016 | Saito et al. | |
| 2011/0260572 A1* | 10/2011 | Hiraga | H02K 15/068 310/207 |
| 2015/0074985 A1 | 3/2015 | Ohno et al. | |
| 2015/0078875 A1* | 3/2015 | Saito | H02K 15/04 414/751.1 |
| 2015/0207391 A1* | 7/2015 | Yamada | H02K 15/085 29/825 |

FOREIGN PATENT DOCUMENTS

| | | | |
|---|---|---|---|
| JP | 2015-61389 | 3/2015 | |
| JP | 5705287 | 3/2015 | |
| WO | WO-2012007972 A1 * | 1/2012 | ......... H02K 15/0421 |
| WO | 2014/010642 | 6/2016 | |

\* cited by examiner

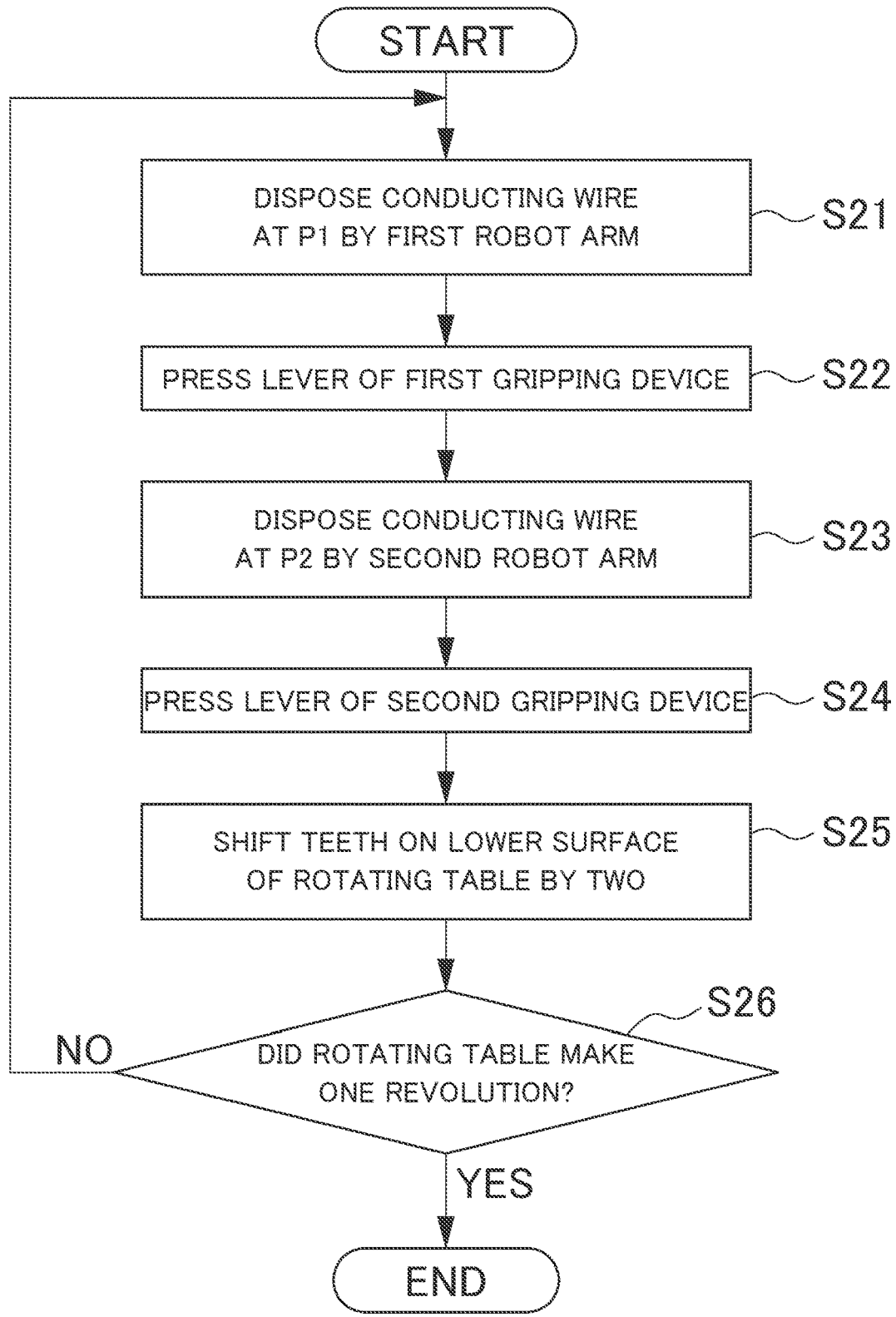

INSERTING STEP

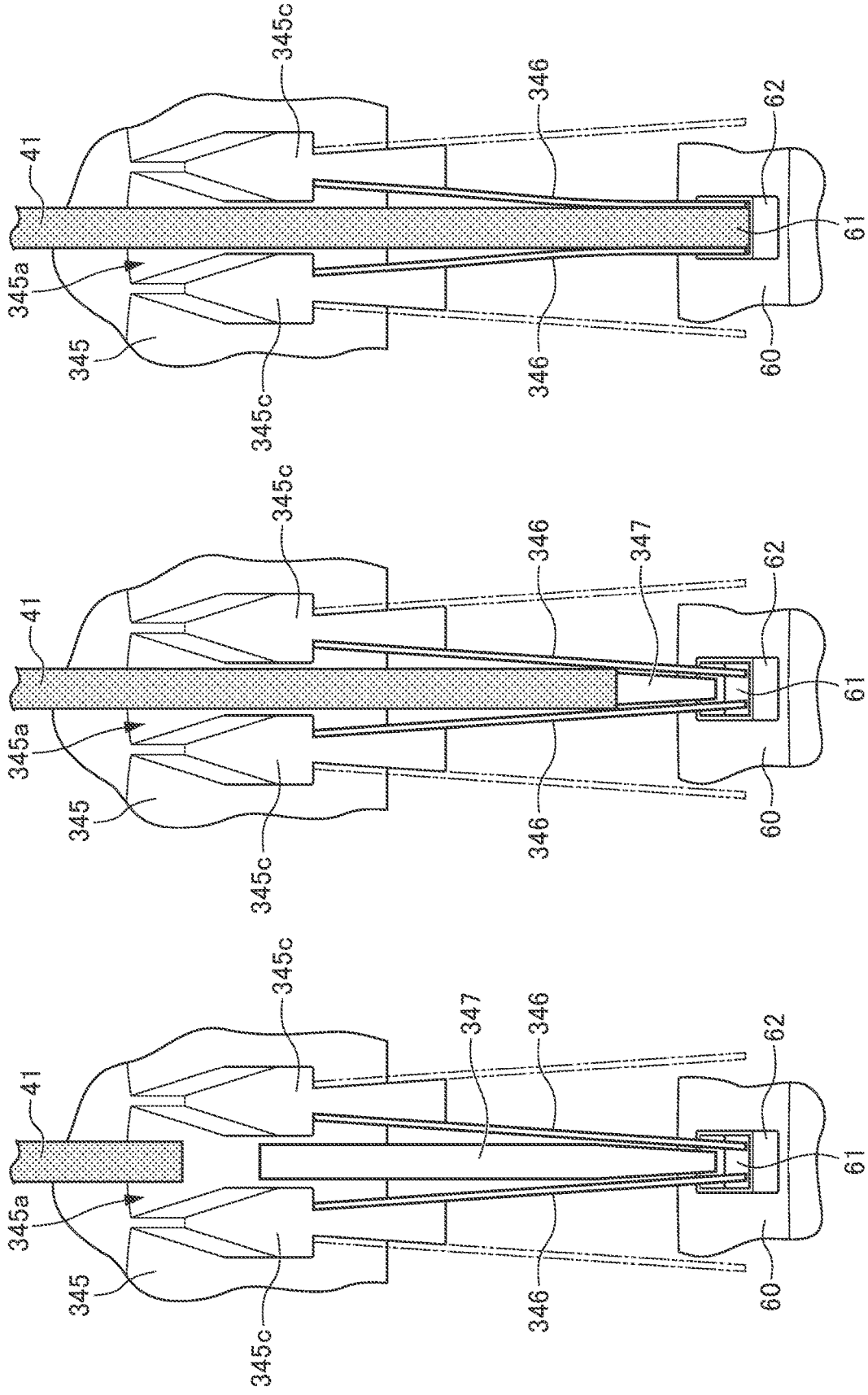

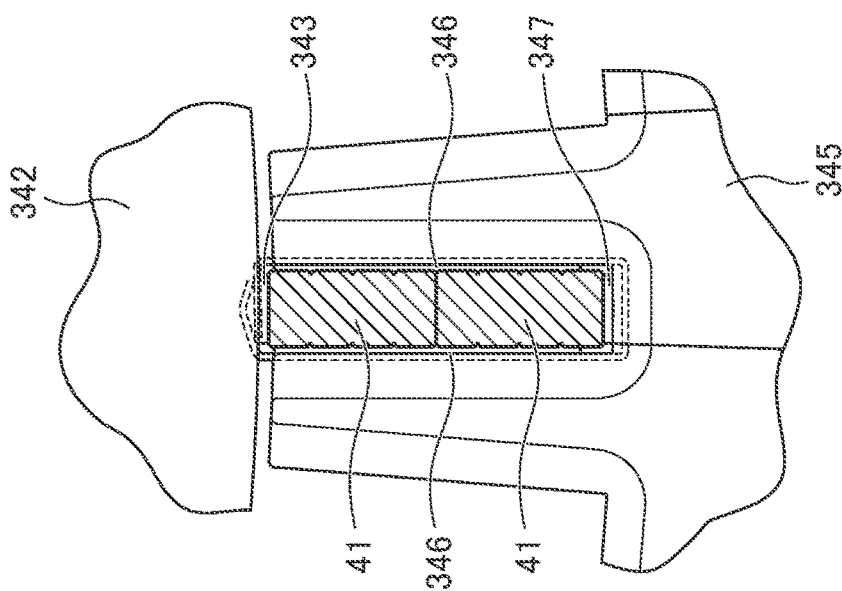
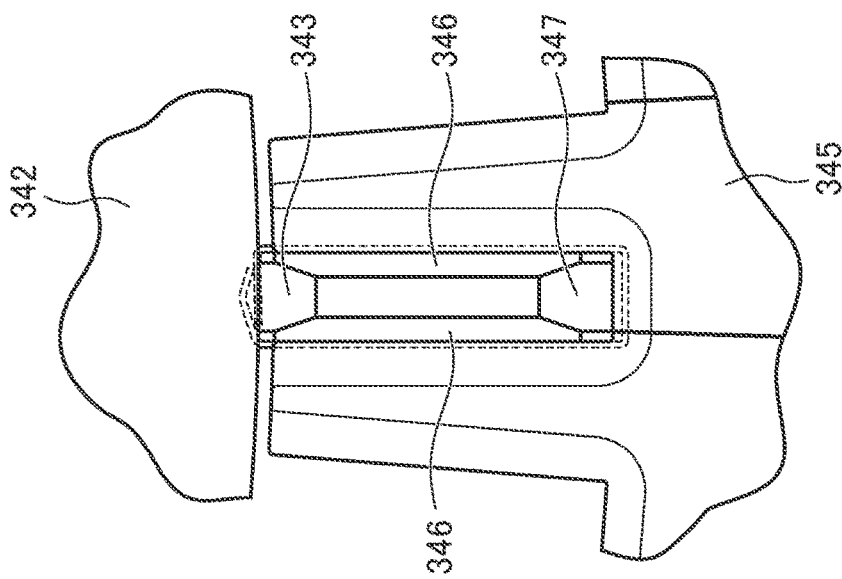
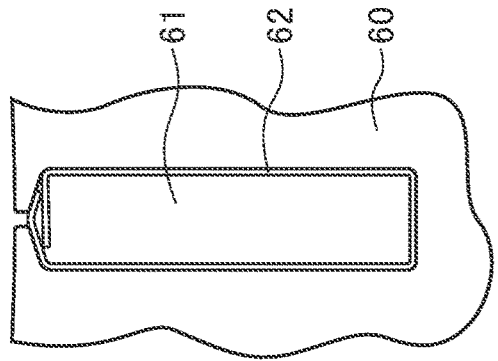

ALIGNMENT METHOD AND ALIGNMENT DEVICE FOR ANNULARLY ALIGNED CONDUCTORS

TECHNICAL FIELD

The present invention relates to an alignment method and an alignment device. More specifically, the present invention relates to an alignment method and an alignment device in which a plurality of substantially U-shaped electrical conductors are disposed in an annular shape, and the plurality of electrical conductors are aligned in a state in which substantially apex portions provided at turn portions of the conductors are alternately overlapped, by moving the plurality of electrical conductors in a direction in which the diameter of the annular shape decreases.

BACKGROUND ART

A stator coil of a rotary electric machine is formed, for example, as follows. First, a plurality of electrical conductors formed in a substantially U-shape are aligned in an annular shape while being overlapped in a circumferential direction. Next, leg portions of the electrical conductors aligned in the annular shape are aligned in a straight line and are each inserted into slots arranged in a stator core in an annular shape. Then, end portions of the adjacent leg portions are connected to each other. Accordingly, the stator coil of a rotary electric machine is formed (see Patent Documents 1 and 2).

Patent Document 1: Japanese Patent No. 5705287 H116-0463-US01 (HNEF-103)

Patent Document 2: PCT International Publication No. WO2014/010642

DISCLOSURE OF THE INVENTION

Problems to be Solved by the Invention

Gripping devices of a disposing device described in Patent Document 1 are disposed in a turn portion and grip substantially U-shaped electrical conductors (coils) to be disposed in an annular shape. The gripping device has a chuck for gripping only one leg portion of the substantially U-shaped coil as the electrical conductor, and the length of a claw of the chuck is a sufficient length for gripping one leg portion. When the gripping devices are moved toward the center of the annular shape in which the gripping devices are disposed so as to be assembled, the other leg portions of the electrical conductors which are not gripped by the chucks of the gripping devices are not supported by anything and may not be aligned in the straight line.

In addition, in Patent Document 2, although an alignment device of an electrical conductor in which substantially U-shaped electrical conductors are gripped by gripping devices, and while being overlapped in a circumferential direction of an annular shape, are aligned in the annular shape is described, alignment of leg portions of electrical conductors, which are not supported by anything, in a straight line when the gripping devices are assembled toward the inside of the annular shape is not disclosed. Furthermore, a problem that the electrical conductor which is not aligned in the straight line is pinched between the distal end of a chuck provided in the gripping device and a guide provided inside the annular shape because the leg portions are not aligned in the straight line, and a technique for solving the problem are not disclosed.

In order to solve the problem, an object of the present invention is to provide an alignment method and an alignment device capable of simultaneously aligning one leg portion of each electrical conductor of a plurality of electrical conductors and the other leg portion of each electrical conductor of the plurality of electrical conductors in a straight line using chucks of gripping devices.

Means for Solving the Problems (1) An alignment method of an electrical conductor in which a plurality of substantially U-shaped electrical conductors (for example, coil elements 40 which will be described later) are overlapped and are aligned in an annular shape, the method including: an arranging step of disposing the electrical conductors in an annular shape at intervals at which the electrical conductors do not overlap in an circumferential direction of the annular shape by causing a plurality of gripping devices (for example, gripping devices 230 which will be described later) disposed in the annular shape to each grip one end portion of each of the electrical conductors; and an aligning step of aligning the plurality of electrical conductors in the annular shape while overlapping the electrical conductors in a circumferential direction of the annular shape by moving the gripping devices in a radially inward direction of the annular shape, in which the gripping device has a pair of claws (for example, claws 232g1 and 232g2 which will be described later) capable of pinching one leg portion (for example, one leg portion 41 which will be described later) of each of the substantially U-shaped electrical conductors one by one, one claw (for example, a fixed claw 232g1 which will be described later) has a length capable of gripping one leg portion, and the other claw (for example, a movable claw 232g2 which will be described later) has a length capable of gripping one leg portion of one substantially U-shaped electrical conductor (for example, one coil element 40-1 which will be described later) and gripping the other leg portion (for example, one leg portion 44 which will be described later) of the other substantially U-shaped electrical conductor (for example, the other coil element 40-2 which will be described later).

According to the invention of (1), since the other claw is longer than one claw, when the gripping devices disposed in the annular shape are moved inward in the radial direction of the annular shape, the other leg portion which is not gripped by the gripping device is able to follow a long portion of the other claw. Accordingly, it becomes possible to align the other leg portions, and when the gripping devices are moved to predetermined positions inside the annular shape, one leg portion of each substantially U-shaped electrical conductor and the other leg portion of each substantially U-shaped electrical conductor can be aligned in the straight line.

(2) The alignment method of an electrical conductor, in which, in the aligning step, after moving the gripping devices to predetermined positions inside the annular shape, while the plurality of electrical conductors are in a state of overlapping so as not to be moved in the circumferential direction of the annular shape, the gripping devices are moved outward in a radial direction of the annular shape, and are moved from the positions to the predetermined positions inside the annular shape again.

According to the invention of (2), when the gripping devices are moved inward in the radial direction, there may be cases where the electrical conductor may be pinched between the member at the predetermined position inside the annular shape and the other claw of the gripping device and the other leg portion of the electrical conductor is not aligned. When the gripping device is caused to further retreat after the diameter of the annular shape is further decreased, the pinched electrical conductor returns to a correct position due to the spring back force. By assembling the gripping devices toward the inside in the radial direction again in this state, the other leg portions of the electrical conductors can be aligned.

(3) An alignment device of an electrical conductor in which a plurality of substantially U-shaped electrical conductors (for example, coil elements 40 which will be described later) are overlapped and aligned in an annular shape, the device including: a plurality of gripping devices (for example, gripping devices 230 which will be described later) which are provided in an annular shape and respectively hold one leg portion of each of the electrical conductors; and a moving portion (for example, a driving mechanism 250 which will be described later) which moves the plurality of gripping devices in a radial direction of the annular shape, in which the gripping device has a pair of claws (for example, claws 232g1 and 232g2 which will be described later) capable of pinching one leg portion of each (for example, one leg portion 41 which will be described later) of the substantially U-shaped electrical conductors one by one, one claw (for example, fixed claws 232g1 which will be described later) has a length capable of gripping one leg portion, and the other claw (for example, a movable claw 232g2 which will be described later) has a length capable of gripping one leg portion of one substantially U-shaped electrical conductor (for example, one coil element 40-1 which will be described later) and gripping the other leg portion of the other substantially U-shaped electrical conductor (for example, the other coil element 40-2 which will be described later).

According to the invention of (3), the same actions and effects as those of the invention of (1) are exhibited.

Effects of the Invention

According to the present invention, it is possible to provide an alignment method and an alignment device capable of simultaneously aligning one leg portion of each electrical conductor of a plurality of electrical conductors and the other leg portion of each electrical conductor of the plurality of electrical conductors in a straight line using chucks of gripping devices.

BRIEF DESCRIPTION OF THE DRAWINGS

FIG. 5 is a view illustrating a first gripping device according to the embodiment, in which

FIG. 6 is a view illustrating a second gripping device according to the embodiment, in which

FIG. 17 is a flowchart showing operations of a coil element disposing step according to the embodiment.

FIG. 34 is a view for explaining operations of a guide plate, a pair of first expansion plates, and a second expansion plate according to the embodiment.

FIG. 35 is a view for explaining operations of the guide plate, the pair of first expansion plates, and the second expansion plate according to the embodiment.

PREFERRED MODE FOR CARRYING OUT THE INVENTION

Hereinafter, an embodiment of the present invention will be described in detail with reference to the drawings.
<Configuration of Stator Manufacturing Apparatus>

Figure 1:
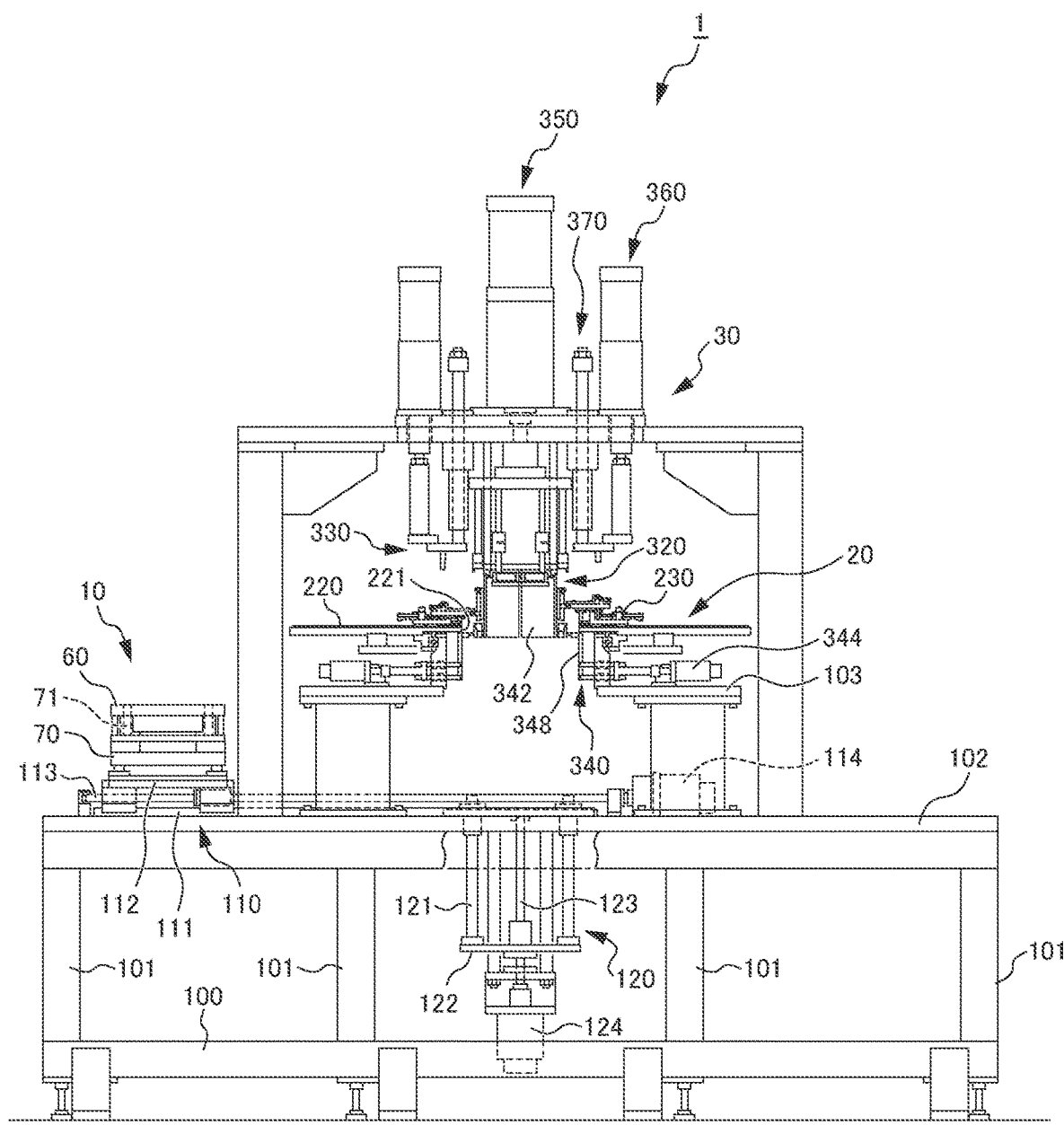
FIG. 1 is a front view illustrating a stator manufacturing apparatus according to an embodiment of the present invention.
Figure 2:
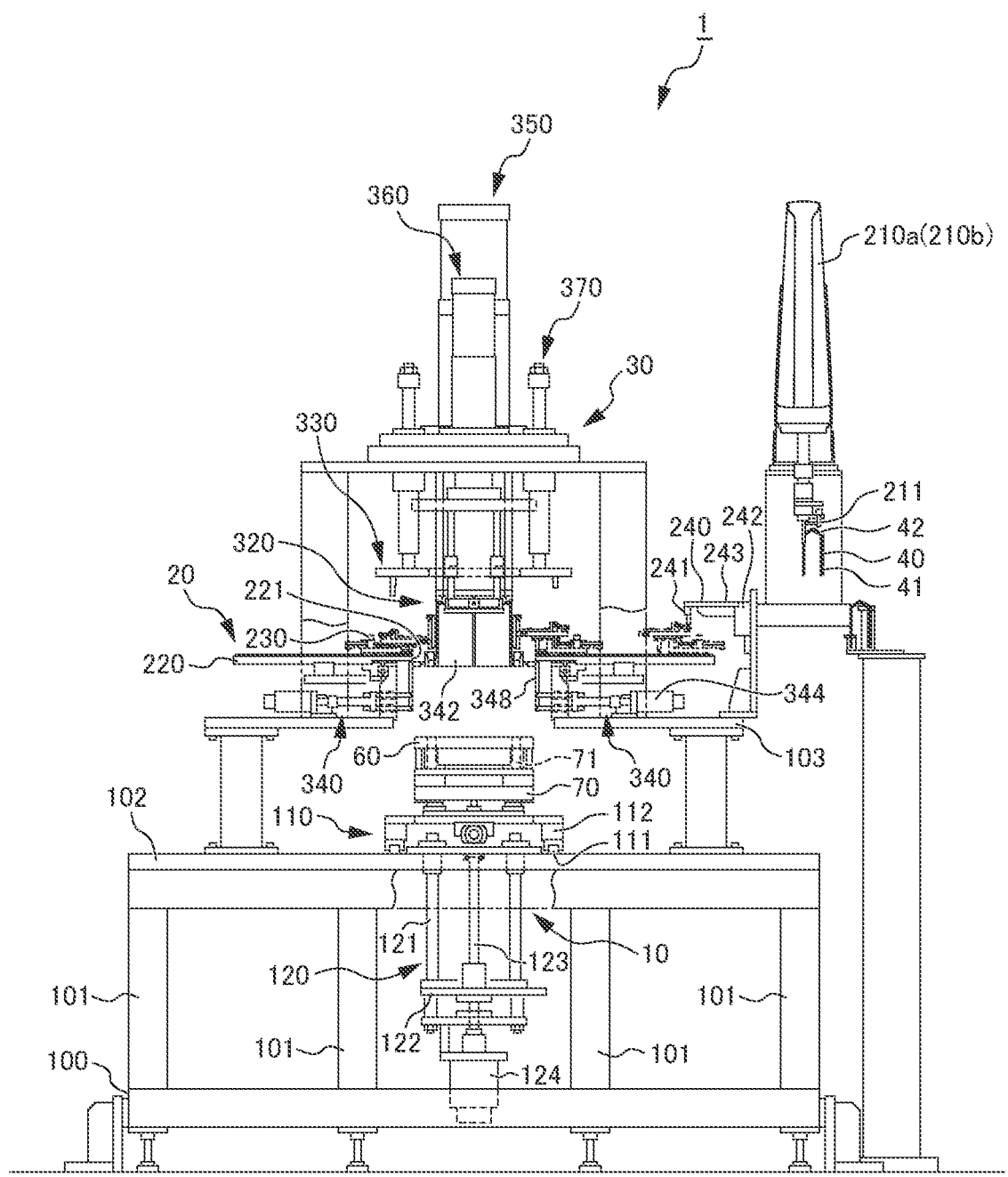
FIG. 2 is a side view illustrating the stator manufacturing apparatus according to the embodiment.
Figure 3:
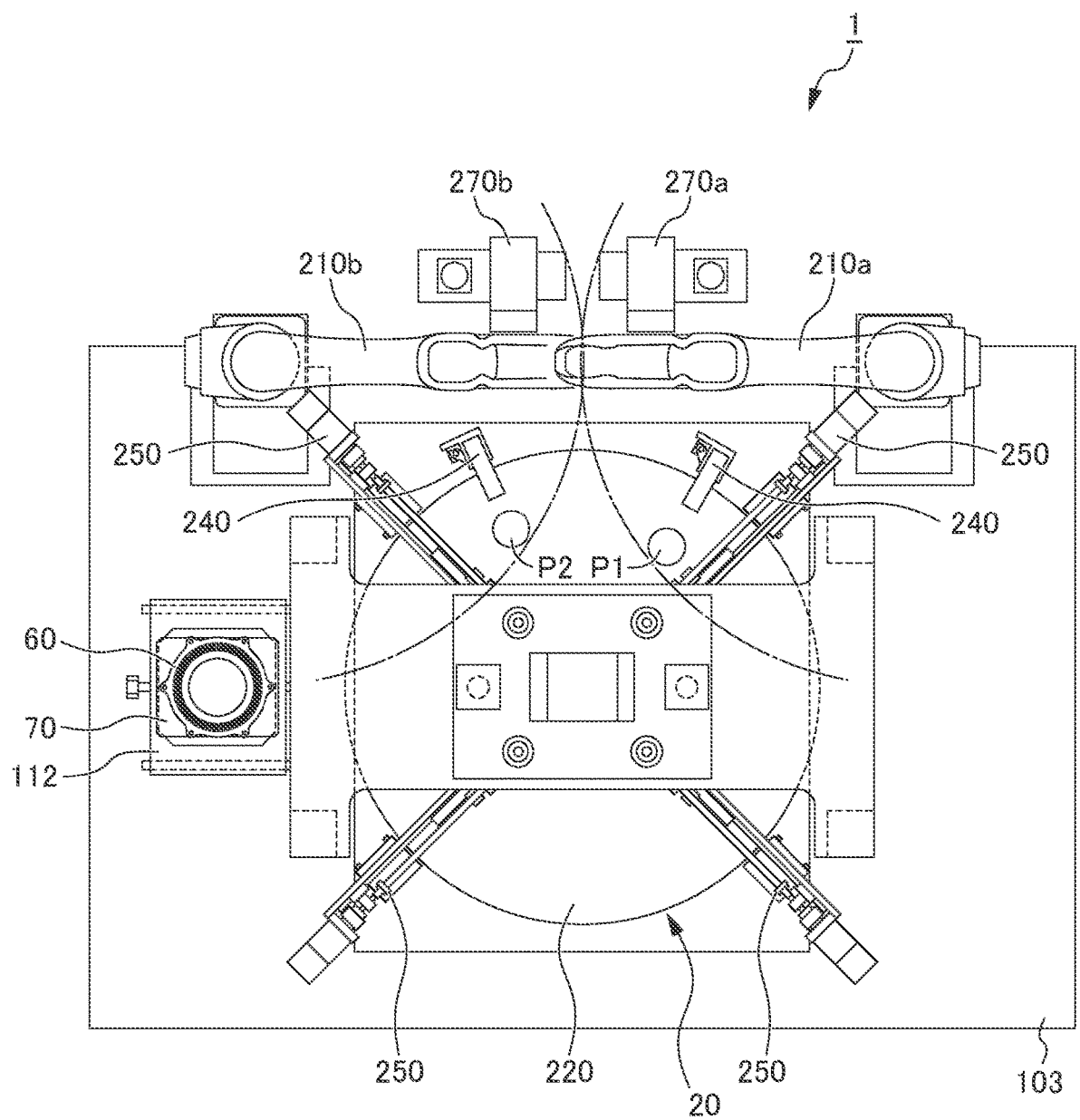
FIG. 3 is a plan view illustrating the stator manufacturing apparatus according to the embodiment.

FIG. 1 is a front view illustrating a stator manufacturing apparatus 1 according to the embodiment. FIG. 2 is a side view illustrating the stator manufacturing apparatus 1 according to the embodiment. FIG. 3 is a plan view illustrating the stator manufacturing apparatus 1 according to the embodiment. The stator manufacturing apparatus 1 includes a stator core transporting device 10, a coil element alignment device 20, and a coil element inserting device 30. In the stator manufacturing apparatus 1, substantially U-shaped coil elements 40 are formed from linear electrical conductors on the back surface of the apparatus, a plurality of the formed coil elements 40 are disposed in an annular shape by the coil element alignment device 20, the plurality of coil elements 40 disposed in an annular shape are moved in a direction in which the diameter of the annular shape is decreased by the coil element alignment device 20 to be assembled and form an assembly 50, and leg portions 41 of the coil elements 40 in the formed assembly 50 are each inserted into slots 61 of a stator core 60 by the coil element inserting device 30, whereby a stator is manufactured.

Here, as the coil elements 40 as the electrical conductors, coil elements 40 for a rotary electric machine, which are each inserted into the slots 61 of the stator core 60 of the rotary electric machine to cause end portions thereof to be connected so as to form a stator coil, are used. Furthermore, the stator core 60 has a plurality of the slots 61 arranged in an annular shape. In the slot 61, insulation paper 62 attached to the inner wall is disposed. The insulation paper 62 avoids contact between the coil element 40 and the stator core 60.

In the stator manufacturing apparatus 1, the stator core transporting device 10 is disposed on a base 100, the coil element alignment device 20 is disposed above the stator core transporting device 10, and the coil element inserting device 30 is disposed at the center portion of the coil element alignment device 20. The base 100 has a plurality of columnar base leg portions 101 and a rectangular flat plate portion 102 supported by the base leg portions 101. The flat plate portion 102 is positioned at the height of the waist of an operator.

Next, each device will be described.
<Configuration of Stator Core Transporting Device 10>

The stator core transporting device 10 transports a jig 70, to which the stator core 60 is fixed, to the coil element inserting device 30 provided at the center of the stator manufacturing apparatus 1.

The stator core transporting device 10 includes a horizontal direction transporting mechanism 110 and an elevating mechanism 120.

The horizontal direction transporting mechanism 110 extends on the flat plate portion 102 of the base 100 in a range from the front left side end portion of the stator manufacturing apparatus 1 to the center where the coil element inserting device 30 is positioned. The horizontal direction transporting mechanism 110 includes a slide rail 111 which is laid on the flat plate portion 102 of the base 100 from the front left side end portion of the stator manufacturing apparatus 1 to the center where the coil element inserting device 30 is positioned, a transporting table 112 which has a rectangular hole at the center, has the jig 70 placed thereon, to which the stator core 60 is fixed, and is engaged with the slide rail 111 to be moved, a ball screw mechanism 113 which causes the transporting table 112 to be engaged with the slide rail 111 and moved in a horizontal direction, and a servomotor 114 which is disposed closer to the front right side of the stator manufacturing apparatus 1 than the slide rail 111 and rotates the ball screw mechanism 113. In the horizontal direction transporting mechanism 110, after the jig 70 to which the stator core 60 is fixed is placed on the transporting table 112 by the operator at the front left side end portion of the stator manufacturing apparatus 1, the transporting table 112 driven by the servomotor 114 is engaged with the slide rail 111 and is transported to the center of the stator manufacturing apparatus 1. In addition, in the horizontal direction transporting mechanism 110, after the plurality of coil elements 40 are inserted into the stator core 60 while being fixed to the jig 70, the transporting table 112 on which the jig 70 is placed is transported from the center to the front left side end portion of the stator manufacturing apparatus 1.

Here, the jig 70 which fixes the stator core 60 holds the stator core 60 in a state of being lifted by a support wall 71 having a vertical hole. Accordingly, when the leg portions 41 of the coil elements 40 in the assembly 50 are each inserted into the slots 61, the stator core 60 fixed to the jig 70 can be maintained in a state in which the leg portions are suspended in the vertical holes without the interference between the distal ends of the leg portions 41 and the jig 70.

The elevating mechanism 120 extends in a vertical direction of the flat plate portion 102 of the base at the center of the stator manufacturing apparatus 1. The elevating mechanism 120 includes four rods 121 which pushes the jig 70, which is inserted into four corners of the hole formed in the transporting table 112 and has the stator core 60 fixed thereto, upward from the transporting table 112 of the horizontal direction transporting mechanism 110, a fixing plate 122 which fixes the lower ends of the four rods 121 below the flat plate portion 102 of the base 100, a ball screw mechanism 123 which moves the fixing plate 122 in the vertical direction, and a servomotor 124 which rotates the ball screw mechanism 123. In the elevating mechanism 120, the jig 70 having the stator core 60 fixed thereto on the transporting table 112 transported to the center of the stator manufacturing apparatus 1 by the horizontal direction transporting mechanism 110 is lifted upward to the coil element inserting device 30 provided at the center of the stator manufacturing apparatus 1 by the four rods 121 in response to the movement of the ball screw mechanism 123 driven by the servomotor 124. In addition, in the elevating mechanism 120, the jig 70 to which the stator core 60 having the plurality of coil elements 40 inserted thereinto is fixed is placed on the transporting table 112 by lowering the four rods 121.

<Configuration of Coil Element Alignment Device 20>

The coil element alignment device 20 arranges the plurality of coil elements 40 in a circumferential direction to be disposed in an annular shape with respect to a center axis C1, and thereafter moves the plurality of coil elements 40 in a direction in which the diameter of the annular shape decreases so as to be gathered and form the assembly 50.

The coil element alignment device 20 includes two robot arms 210a and 210b, a rotating table 220, a plurality of gripping devices 230, and two switch devices 240. Furthermore, the coil element alignment device 20 includes four driving mechanisms 250 and a table driving device 260.

As illustrated in FIGS. 2 and 3, the two robot arms 210a and 210b are articulated arms disposed on the back side of the stator manufacturing apparatus 1, and have hands 211 for gripping the coil elements 40 at the distal ends thereof. Each of the two robot arms 210a and 210b grips the coil element 40. Here, the coil element 40 is a substantially U-shaped coil element in which, by bending a substantially center portion of an S-shaped portion formed of four linear coil rectangular wire rods while twisting the substantially center portion, the S-shaped portion is formed into a mountain shape in which a substantially apex portion is provided at a turn portion 42 and the linear leg portions 41 are provided at both ends of the turn portion 42. The coil elements 40 are formed by two coil forming devices 270a and 270b installed behind the stator manufacturing apparatus 1. The two robot arms 210a and 210b grip the coil elements 40 from the two coil forming devices 270a and 270b and supply the coil elements 40 to be disposed at two disposition points P1 and P2 on the rotating table 220.

The rotating table 220 integrally rotates the plurality of gripping devices 230 disposed in an annular shape. The rotating table 220 has a disk shape having a circular hole 221 at the center. The circular hole 221 at the center of the rotating table 220 corresponds to the diameter of the stator core 60, and for example, is set to have a diameter slightly larger than the diameter of the stator core 60. Below the circular hole 221, the stator core 60 is installed, and the coil element inserting device 30 for each inserting the leg portions 41 of the coil elements 40 in the assembly 50, into which the plurality of coil elements 40 aligned by the coil element alignment device 20 are assembled, into the slots 61 of the stator core 60. Accordingly, the leg portions 41 of the coil elements 40 in the assembly 50 aligned in an annular shape by the coil element alignment device 20 are each inserted into the slots 61 of the stator core 60 by the coil element inserting device 30.

Figure 4A:
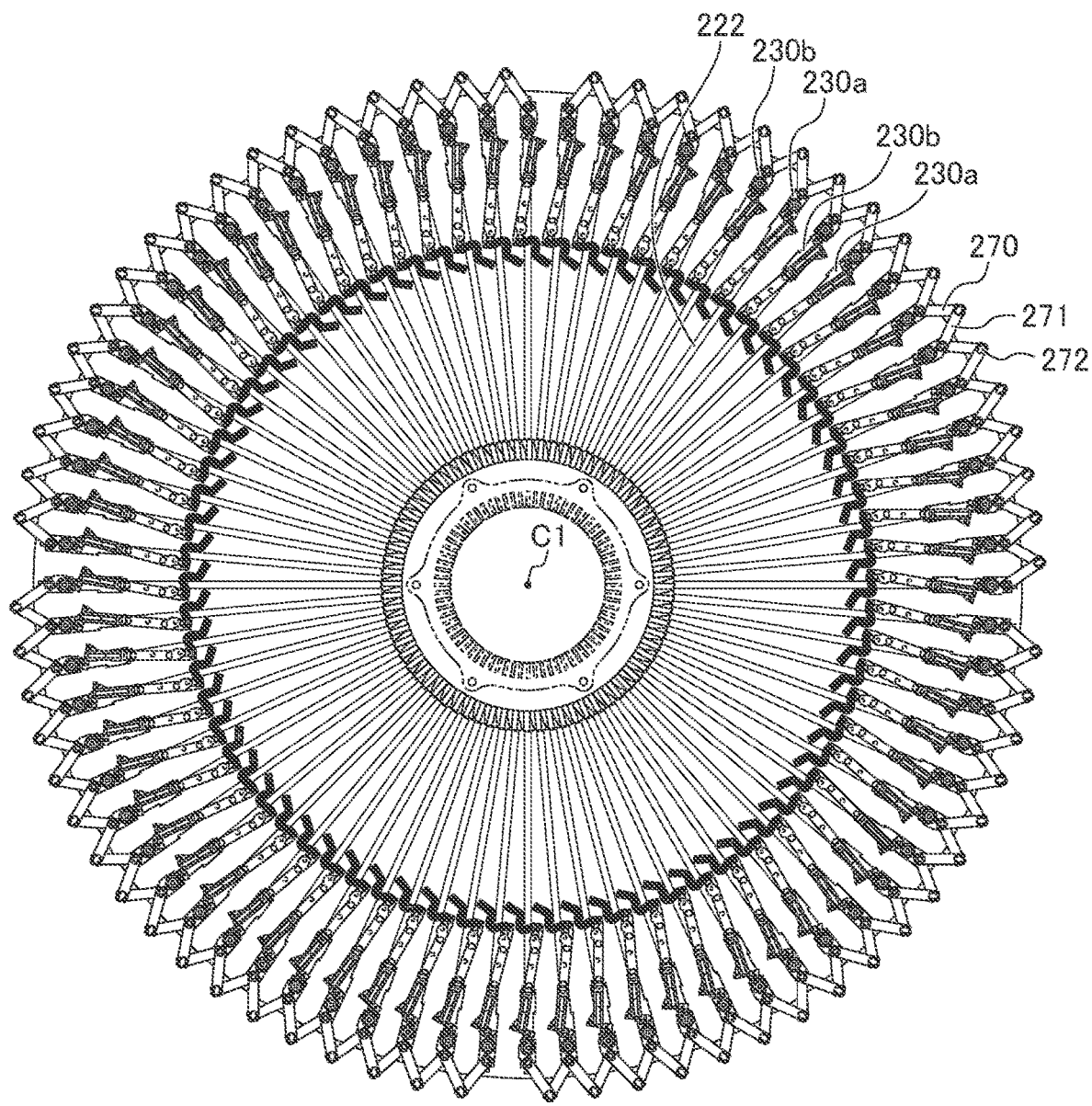
FIG. 4 is a view illustrating a plurality of gripping devices according to the embodiment.

FIG. 4 is a view illustrating the plurality of gripping devices 230 according to the embodiment. The plurality of gripping devices 230 hold a lower portion of one leg portion 41 of each of the coil elements 40 disposed by the two robot arms 210a and 210b. As illustrated in FIG. 4(A), the plurality of gripping devices 230 are disposed in an annular shape on the rotating table 220. More specifically, the plurality of gripping devices 230 are each engaged with slide rails 222 radially extending on the rotating table 220, and can be moved in a radial direction by the driving force of the four driving mechanisms 250 (see FIG. 3).

Figure 4B:
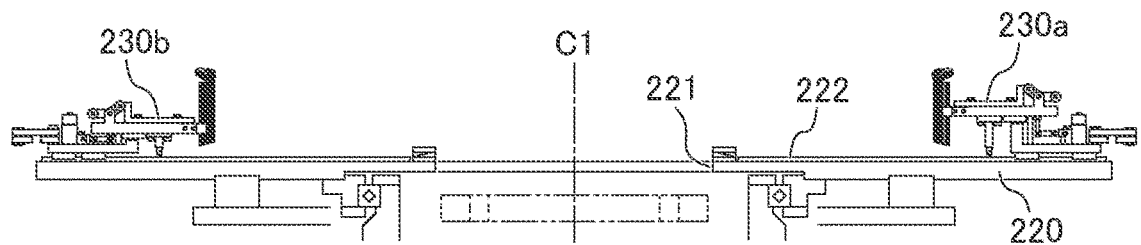

As illustrated in FIG. 4 (B), the plurality of gripping devices 230 are disposed such that the heights of the adjacent gripping devices 230 are alternately shifted in an axial direction (height direction) of the center axis C1 of the annular shape. More specifically, when the plurality of gripping devices 230 are caused to advance in a radially inward direction by the slide rails 222 to be assembled, the gripping devices 230 are alternately shifted in the axial direction of the center axis C1 so as not to interfere with each other. In FIG. 4(B), a first gripping device 230a is illustrated on the right side of the figure, and the second gripping device 230b is illustrated on the left side of the figure.

The plurality of gripping devices 230 are constituted by two types of first gripping devices 230a and second gripping devices 230b, which are different in height in the axial direction of the center axis C1 and are moved by receiving the driving force from the driving mechanisms 250. The height of the first gripping device 230a is high, the height of the second gripping device 230b is lower than the first gripping device 230a, and the first gripping devices 230a and the second gripping devices 230b are alternately arranged in a circumferential direction. As illustrated in FIG. 3, the first gripping device 230a receives the coil element 40 from the first robot arm 210a at the disposition point P1 on the front right side of the stator manufacturing apparatus 1. The second gripping device 230b receives the coil element 40 from the second robot arm 210b at the disposition point P2 on the front left side of the stator manufacturing apparatus 1.

As illustrated in FIG. 4(A), in the plurality of gripping devices 230, the adjacent gripping devices 230 are linked by a link mechanism 270. By the link mechanism 270, the second gripping device 230b adjacent to the first gripping device 230a is linked to the first gripping device 230a, and the second gripping device 230b linked to the first gripping device 230a is linked to the adjacent first gripping device 230a. In this manner, the plurality of adjacent gripping devices 230 are sequentially linked and thus follow the driving of the driving mechanisms 250.

Figure 5A:
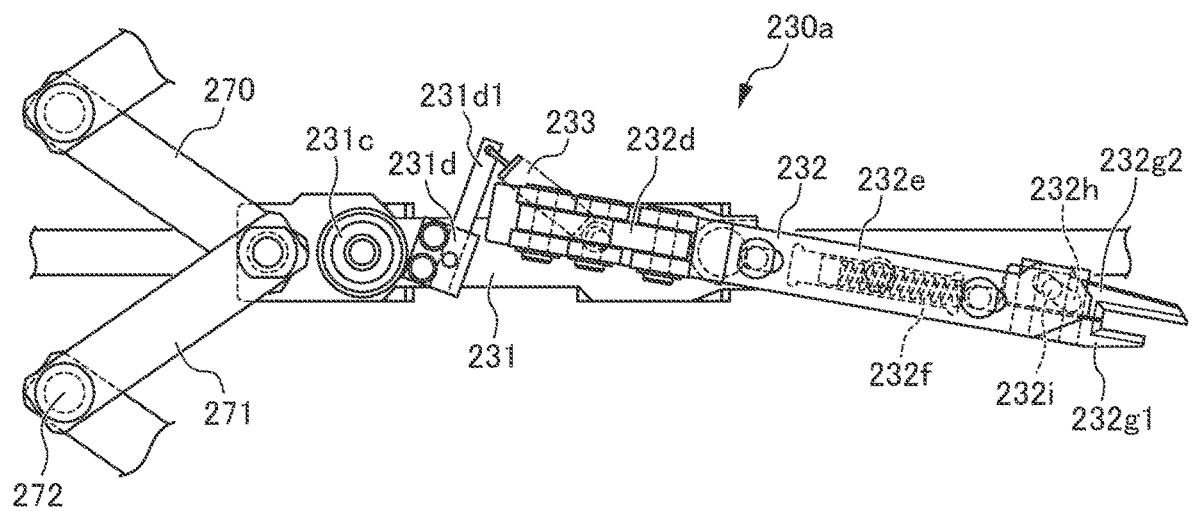
FIG. 5(A) is a partially transparent plan view and FIG. 5(B) is a partially transparent side view.
Figure 5B:
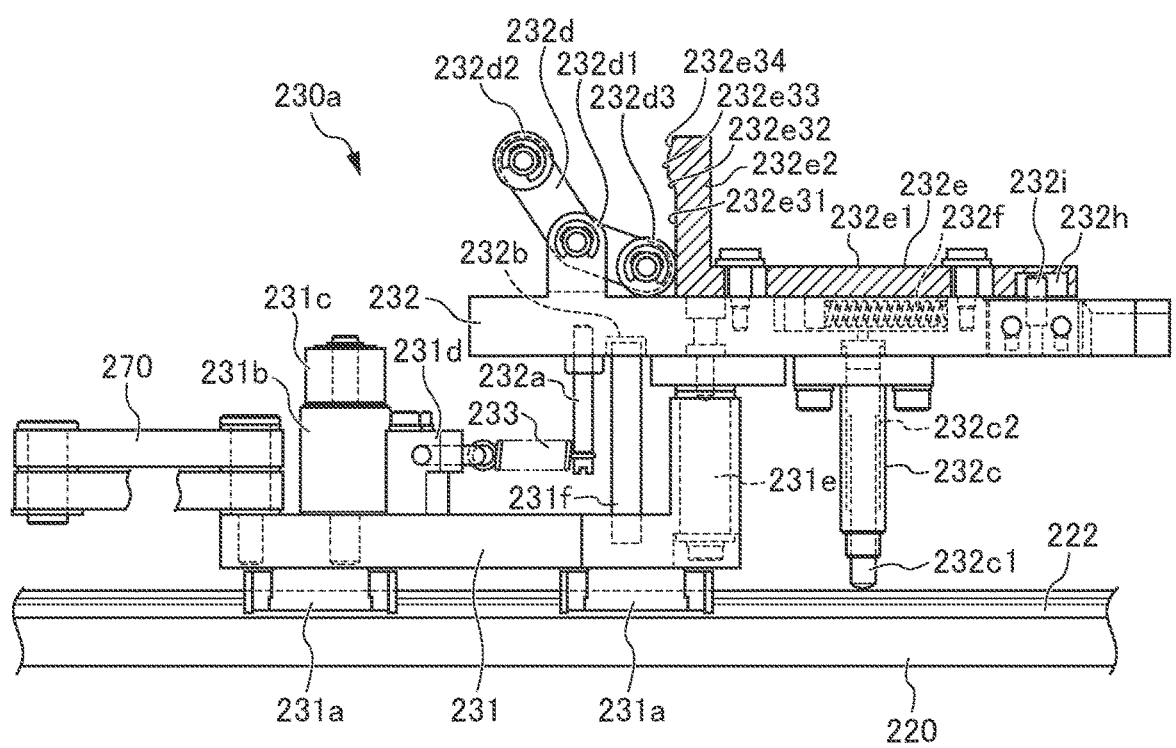
Figure 6A:
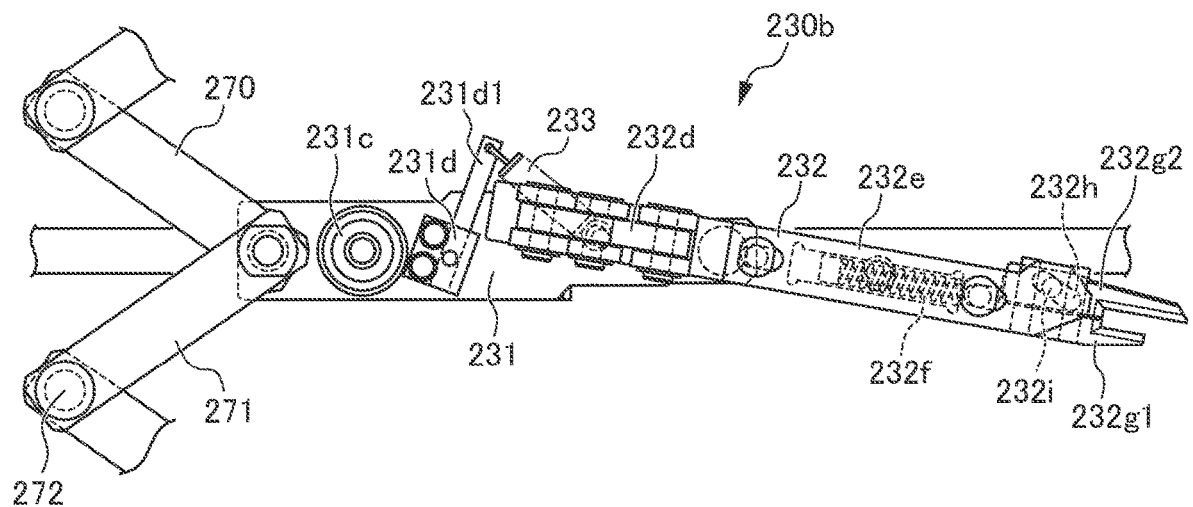
FIG. 6(A) is a partially transparent plan view and FIG. 6(B) is a partially transparent side view.
Figure 6B:
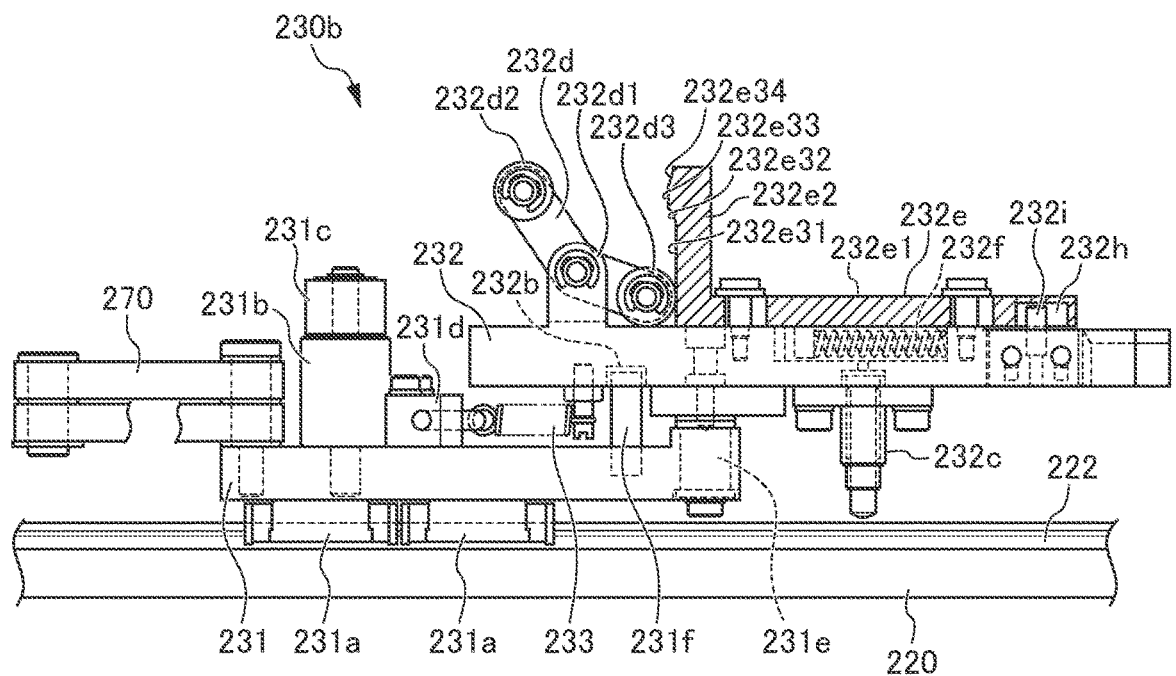

FIG. 5 is a view illustrating the first gripping device 230a according to the embodiment, in which FIG. 5(A) is a partially transparent plan view and FIG. 5(B) is a partially transparent side view. In addition, FIG. 6 is a view illustrating the second gripping device 230b according to the embodiment, in which FIG. 6(A) is a partially transparent plan view and FIG. 6(B) is a partially transparent side view. Here, the first gripping devices 230a and the second gripping device 230b constituting the plurality of gripping devices 230 have the same basic configuration, and are different only in height in the axial direction of the center axis C1. Therefore, the first gripping device 230a will be described as an example with reference to FIG. 5, the second gripping device 230b illustrated in FIG. 5 is denoted by the same reference numeral, and the description thereof will be omitted.

As illustrated in FIG. 5, the first gripping device 230a has a main body 231 attached to the link mechanism 270, and an upper branch portion 232 attached to the distal end side of the main body 231 and provided with a pair of claws 232g1 and 232g2.

The main body 231 is a bar-shaped member having a rectangular cross-section, and is provided with two slide guides 231a arranged in a radial direction in a recessed shape in which the bottom surfaces are engaged with the slide rail 222, a weight portion 231b provided on the upper surface of the proximal end side to match the weight balance of the gripping device 230a, a roller 231c provided at the upper end portion of the weight portion 231b, a spring post 231d closer to the distal end side than the weight portion 231b, a rotating shaft 231e extending upward from the upper surface of the distal end side in parallel to the center axis C1 of the annular shape, a bush 231f disposed between the spring post 231d and the rotating shaft 231e to define a movable range of the upper branch portion 232. The spring post 231d has a fixed piece 231d1 which extends leftward with respect to the center axis C1 and in a distal end direction and fixes a spring 233.

The upper branch portion 232 is attached to the upper end of the rotating shaft 231e and extends to the distal end side. The upper branch portion 232 is provided with a spring post 232a disposed on the proximal end side, a hole 232b provided at the lower surface, which is larger than the diameter of the bush 231f so as to cause the bush 231f to be loosely fitted thereto, a pin 232c which extends downward from the lower surface of the distal end side in a vertically slidable manner and is positioned on a movement path of the gripping device 230a, a lever 232d which is rotatably held on the upper surface of the proximal end side and is bent at an obtuse angle, an L-shaped member 232e which is held on the upper surface on the distal end side of the lever 232d so as to advance and retreat in the radial direction, a spring 232f which biases the L-shaped member 232e toward the proximal end side, and the pair of claws 232g1 and 232g2.

The spring 233 is interposed between the main body 231 and the upper branch portion 232. The spring 233 is held between the spring post 232a of the upper branch portion 232 and the spring post 231d of the main body 231 and biases the upper branch portion 232 toward the right with respect to the center axis C1 so as to be biased in a direction opposite to a direction in which the gripped coil element 40 is turned by a predetermined angle with respect to the rotating shaft 231e parallel to the center axis C1 of the annular shape. Accordingly, the upper branch portion 232 is inclined toward the center axis C1 right by 10° with respect to the rotating shaft 231e parallel to the center axis C1 of the annular shape (see FIG. 24). The pin 232c is constituted by a vertically slidable shaft portion 232c1, a holder 232c2 which surrounds the outer circumference of the shaft portion 232c1 and has its upper end fixed to the upper branch portion 232, and a spring (not illustrated) which biases the shaft portion 232c1 downward.

The lever 232d is attached to the upper branch portion 232 via a shaft fixed to two protruding pieces provided apart from each other in a circumferential direction of the upper branch portion 232 at a center portion 232d1 bent at an obtuse angle. The lever 232d has rotatable rollers each at a proximal end portion 232d2 and a distal end portion 232d3. In the lever 232d, when the distal end portion 232d3 is lifted higher than the center portion 232d1, the distal end portion 232d3 retreats toward the proximal end side, and when the distal end portion 232d3 is lowered lower than the center portion 232d1, the distal end portion 232d3 advances toward the distal end side.

The L-shaped member 232e is constituted by a main piece 232e1 which is disposed on the upper surface of the upper branch portion 232 and moves in the radial direction along the upper branch portion 232, and a short piece 232e2 which protrudes upward from the proximal end portion of the main piece 232e1 and moves the main piece 232e1 by receiving an action of the lever 232d transmitted from the switch device 240. The main piece 232e1 has two holes into which bolts fixed to the upper branch portion 232 are inserted to define a movable range of the main piece 232e1 in the radial direction. Between the two holes of the main piece 232e1, a spring post which protrudes downward and is disposed in a recessed portion of the upper branch portion 232 is provided. Accordingly, the spring 232f pulls the spring post toward the proximal end side such that the L-shaped member 232e is biased toward the proximal end side. The lower surface of the distal end side of the main piece 232e1 has a long hole 232h inclined toward the right with respect to the center axis C1 in a direction from the proximal end side toward the distal end side.

The wall surface of the radially outward side of the short piece 232e2 includes a flat surface portion 232e31, a radially outward side protruding curved portion 232e32, a radially outward side flat surface portion 232e33, and a distal end curved surface portion 232e34. As illustrated in FIG. 5 and the like, the flat surface portion 232e31 is formed by a flat surface extending upward from the vicinity of the lower end of the short piece 232e2. The radially outward side protruding curved portion 232e32 is formed by a curved surface which is curved upward from the upper end of the flat surface portion 232e31 toward the radially outward side of the short piece 232e2. The radially outward side flat surface portion 232e33 is formed by a flat surface extending upward from the upper end of the radially outward side protruding curved portion 232e32. The distal end curved surface portion 232e34 is formed by a curved surface which is curved upward from the radially outward side flat surface portion 232e33 toward the radially outward side of the short piece 232e2.

The pair of claws 232g1 and 232g2 are constituted by a fixed claw 232g1 integrated with the upper branch portion 232 and a movable claw 232g2 separated from the upper branch portion 232. The movable claw 232g2 is disposed in a recessed portion which is cut out into a shape further larger than the movable claw 232g2 at the distal end of the upper branch portion 232. The fixed claw 232g1 and the movable claw 232g2 are connected by disposing two shafts extending in the circumferential direction and in the horizontal direction in holes of the fixed claw 232g1 and the movable claw 232g2 extending in the circumferential direction and the horizontal direction. In the movable claw 232g2, a protrusion 232i which has a circular cross-section and is movably disposed in the long hole 232h of the L-shaped member 232e is provided.

In the movable claw 232g2, when the distal end portion 232d3 of the lever 232d is lifted to cause the L-shaped member 232e to be biased toward the proximal end side by the spring 232f, the long hole 232h of the L-shaped member 232e is moved toward the proximal end side such that the protrusion 232i of the movable claw 232g2 is disposed on the distal end side toward the right of the long hole 232h with respect to the center axis C1. Accordingly, the movable claw 232g2 is pressed against the left wall surface of the long hole 232h such that a chuck mechanism of the pair of claws 232g1 and 232g2 enters a pinching state to pinch one leg portion 41 of the coil element 40. At this time, since the gripping device 230 is fixed to the short piece 232e2 of the L-shaped member 232e in a state in which the lever 232d causes the distal end side 232d3 to be lifted higher than the center portion 232d1, the pinching state of the chuck mechanism can be maintained.

On the other hand, in the movable claw 232g2, when the distal end portion 232d3 of the lever 232d is lowered to cause the L-shaped member 232e to be moved toward the distal end side against the spring 232f, the long hole 232h of the L-shaped member 232e is moved toward the distal end side such that the protrusion 232i of the movable claw 232g2 is disposed on the distal end side closer to the left of the long hole 232h with respect to the center axis C1. Accordingly, the movable claw 232g2 is pressed against the right wall surface of the long hole 232h such that the chuck mechanism of the pair of claws 232g1 and 232g2 enters a releasing state to release one leg portion 41 of the coil element 40. At this time, since the gripping device 230a is fixed to the short piece 232e2 of the L-shaped member 232e in a state in which the lever 232d causes the distal end side 232d3 to be lowered lower than the center portion 232d1, the releasing state of the chuck mechanism can be maintained.

The movable claw 232g2 as the other claw is formed to be longer than the fixed claw 232g1 as one claw. The fixed claw 232g1 has a length (a length equal to or more than the width of the four coil rectangular wire rods) capable of gripping one leg 41 of the coil element 40 constituted by end portions of the four coil rectangular wire rods. The movable claw 232g2 has a length (a length equal to or more than the width of a total of eight coil rectangular wire rods, that is, the four coil rectangular wire rods of one leg portion 41 and the four coil rectangular wire rods of the other leg portion 41) capable of gripping one leg portion 41 and supporting the other leg portion 44.

As illustrated in FIG. 4(A), the link mechanism 270 is constituted by plate-shaped members 271 having a bar shape, and bolts 272. In the link mechanism 270, one ends of the two plate-shaped members 271 are rotatably connected to the rear end of the gripping device 230. In addition, the other end of the plate-shaped member 271 have a hole larger than the bolt 272. The shaft portion of the bolt 272 is inserted through the hole, and in a state in which a gap is secured between the hole of the plate-shaped member 271 and the head portion of the bolt 272, the bolt 272 is also inserted through the hole of the plate-shaped member 271 connected to the adjacent gripping device 230. Accordingly, the link mechanism 270 in which a plurality of the plate-shaped members 271 are connected in a jagged manner to make an annular turn is formed. Therefore, the plurality of gripping devices 230 are movable in the radial direction via the link mechanism 270 by following radial movements of the four gripping devices 230 which each receive the driving forces of the four driving mechanisms 250. More specifically, in a case where the four driving mechanisms 250 move the gripping devices 230 which receive the driving forces in a radially outward direction, the plate-shaped member 271 of the link mechanism 270 is inclined in the circumferential direction, so that the plurality of gripping devices 230 are moved in the radially outward direction. In addition, in a case where the four driving mechanisms 250 move the gripping devices 230 which receive the driving forces in the radially inward direction, the plate-shaped member 271 is inclined in the radial direction, so that the plurality of gripping devices 230 are moved in the radially inward direction. Accordingly, while the link mechanism 270 maintain its connected state, the driving forces of the four driving mechanisms 250 are transmitted to the plurality of gripping devices 230.

Figure 7:
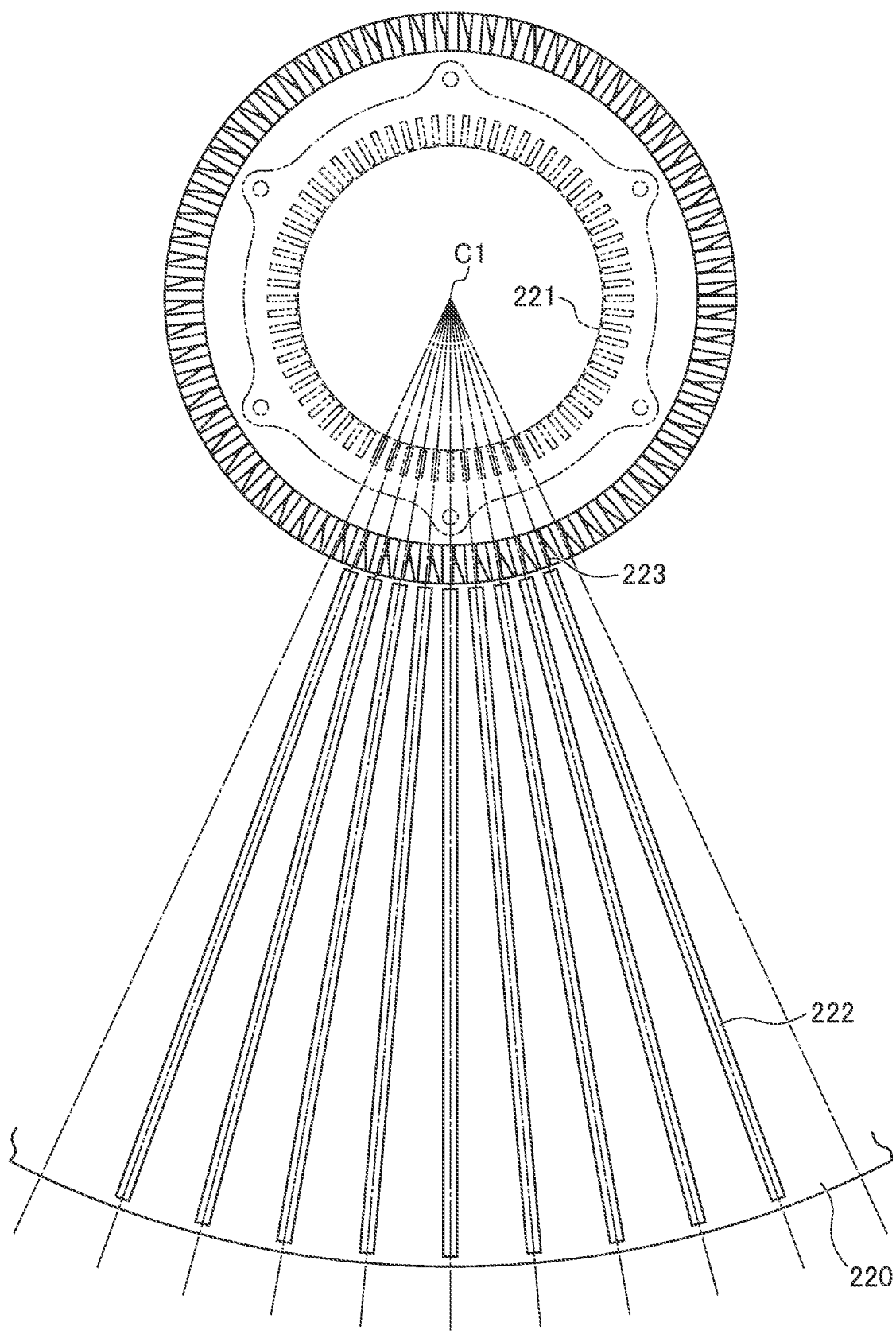
FIG. 7 is a view illustrating a state of the upper surface of a rotating table according to the embodiment.

FIG. 7 is a view illustrating a state of the upper surface of the rotating table 220 according to the embodiment. On the upper surface of the rotating table 220, a plurality of the slide rails 222 and a plurality of correction grooves 223 are formed.

The plurality of slide rails 222 are laid on the upper surface of the rotating table 220 and extend radially in the radial direction, the number of slide rails 222 being the same as the number of the plurality of gripping devices 230. Here, as illustrated in FIG. 5(B), the two slide guides 231a engaged with the slide rails 222 of the first gripping device 230a are separated from each other. On the other hand, as illustrated in FIG. 6(B), the two slide guides 231a engaged with the slide rails 222 of the second gripping device 230b are adjacent to each other. Accordingly, in a case where the plurality of gripping devices 230 are moved in the radially inward direction, the slide guides 231a of the adjacent gripping devices 230 do not interfere with each other, and it is possible to densely assemble the plurality of gripping devices 230 (see FIG. 27).

Figure 8:
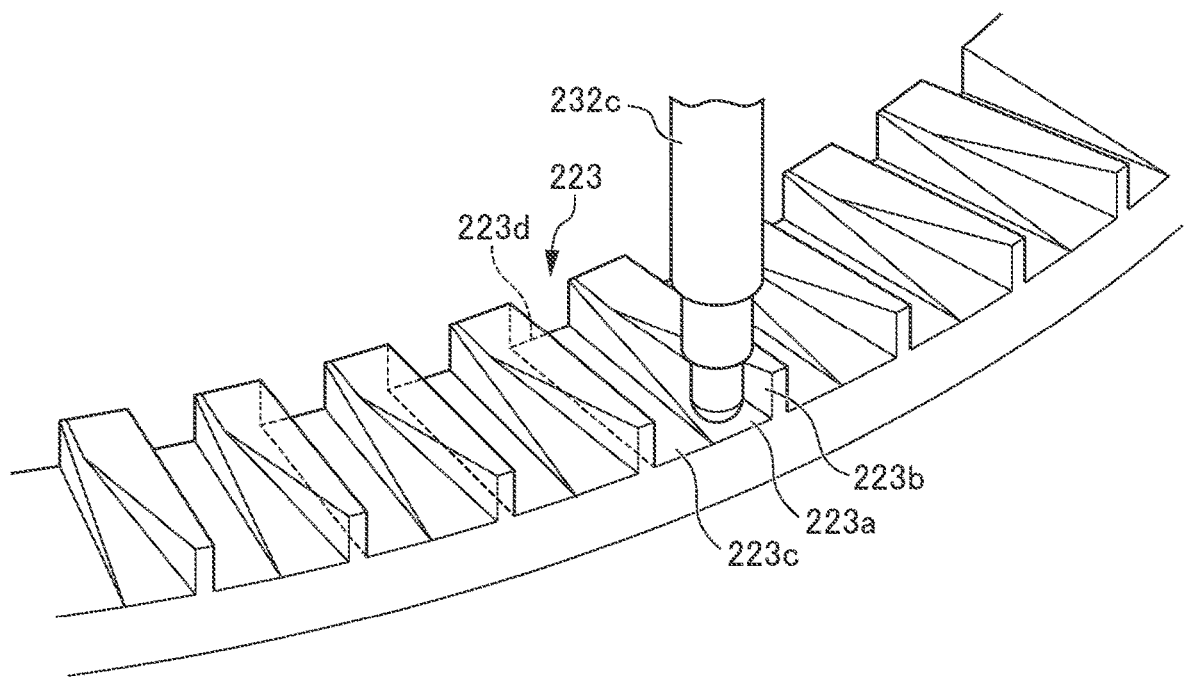
FIG. 8 is a perspective view of correction grooves according to the embodiment when viewed from a radially outward side.

The plurality of correction grooves 223 are formed on the upper surface of the rotating table 220 on the radially inward sides of the plurality of slide rails 222, respectively, so that the pins 232c of the upper branch portions 232 of the gripping devices 230 are guided before the plurality of gripping devices 230 are assembled in the radially inward direction. That is, the plurality of correction grooves 223 correct the upper branch portions 232 to the left side by 10° with respect to the center axis C1 at positions at which the adjacent gripping devices 230 do not interfere with each other in a case where the plurality of gripping devices 230 are assembled in the radially inward direction. The plurality of correction grooves 223 are arranged in the circumferential direction and are formed in an annular shape, the number of correction grooves 223 being the same as the number of the plurality of slide rails 222. FIG. 8 is a perspective view of the correction grooves 223 according to the embodiment when viewed from the radially outward side. The correction groove 223 is constituted by an inclined surface 223a which is formed on an extension line of the slide rail 222 toward the center axis C1, rises toward the center axis C1, and has a width narrowing toward the center axis C1, a restriction wall surface 223b which is a side wall on the right side of the inclined surface 223a with respect to the center axis C1, is inclined with respect to the radial direction toward the center axis C1 to narrow the width of the inclined surface 223a toward the center axis C1, and corrects the upper branch portion 232 of the gripping device 230 toward the left by 10° with respect to the center axis C1, and a bottom surface 223c having an equal width, which is formed on the left side of the inclined surface 223a with respect to the center axis C1 and is formed closer to the center axis C1 than the restriction wall surface 223b at the same height as the lowest position of the inclined surface 223a. Here, on the left side of the bottom surface 223c with respect to the center axis C1, a raised portion 223d which is raised to form the restriction wall surface 223b of another correction groove 223 positioned on the left side with respect to the center axis C1. The bottom surface 223c has a radial length such that the adjacent gripping devices 230 do not interfere with each other when the plurality of gripping devices 230 are caused to retreat in the radially outward direction to release the biasing force of the spring 233 from the restriction of the inclined surface 223a which is inclined while being raised and thus the upper branch portion 232 is biased toward the right by 10° with respect to the center axis C1. By providing the plurality of correction grooves 223, the plurality of gripping devices 230 are more easily assembled in the radially inward direction, so that miniaturization of the coil element alignment device 20 can be achieved.

As illustrated in FIG. 2, the two switch devices 240 press the proximal end portions 232d2 of the levers 232d of the gripping devices 230. The switch device 240 is a separate member from the gripping device 230, and includes a pressing member 241, a driving portion 242, and a support frame 243. The pressing members 241 are separated upward from the rotating table 220, and are disposed immediately above the proximal end portions 232d2 of the levers 232d of the first gripping device 230a and the second gripping device 230b gripping the coil elements 40 at the two disposition points P1 and P2 at which the coil elements 40 are disposed by the two robot arms 210a and 210b. The driving portion 242 lowers the pressing member 241 using a piston (not illustrated). The support frame 243 supports the pressing member 241 to be vertically slidable, and includes a spring which biases the pressing member 241 upward so as to be held at an upper position. When the two robot arms 210a and 210b respectively grip the coil elements 40 from the two coil forming devices 270a and 270b and dispose the coil elements 40 at the two disposition points P1 and P2 on the rotating table 220, the two switch devices 240 press the proximal end portions 232d2 of the levers 232d of the first gripping device 230a and the second gripping device 230b so that the coil elements 40 are respectively gripped by the first gripping device 230a and the second gripping device 230b. Accordingly, the two switch devices 240 operate the lever 232d and the L-shaped member 232e following the lever 232d such that the first gripping device 230a and the second gripping device 230b positioned at the disposition points P1 and P2 grip the coil elements 40. Since the switch device 240 is a separate member from the gripping device 230 and operates the L-shaped member 232e, the gripping device 230 can grip the coil element 40 without individually having a driving source. Therefore, the gripping device 230 has a cheap, simple, and small configuration.

The four driving mechanisms 250 apply driving forces to the plurality of gripping devices 230. As illustrated in FIG. 3, the four driving mechanisms 250 are disposed outward of the rotating table 220 at four corners of a support table 103 provided on the flat plate portion 102 of the base 100.

Figure 9:
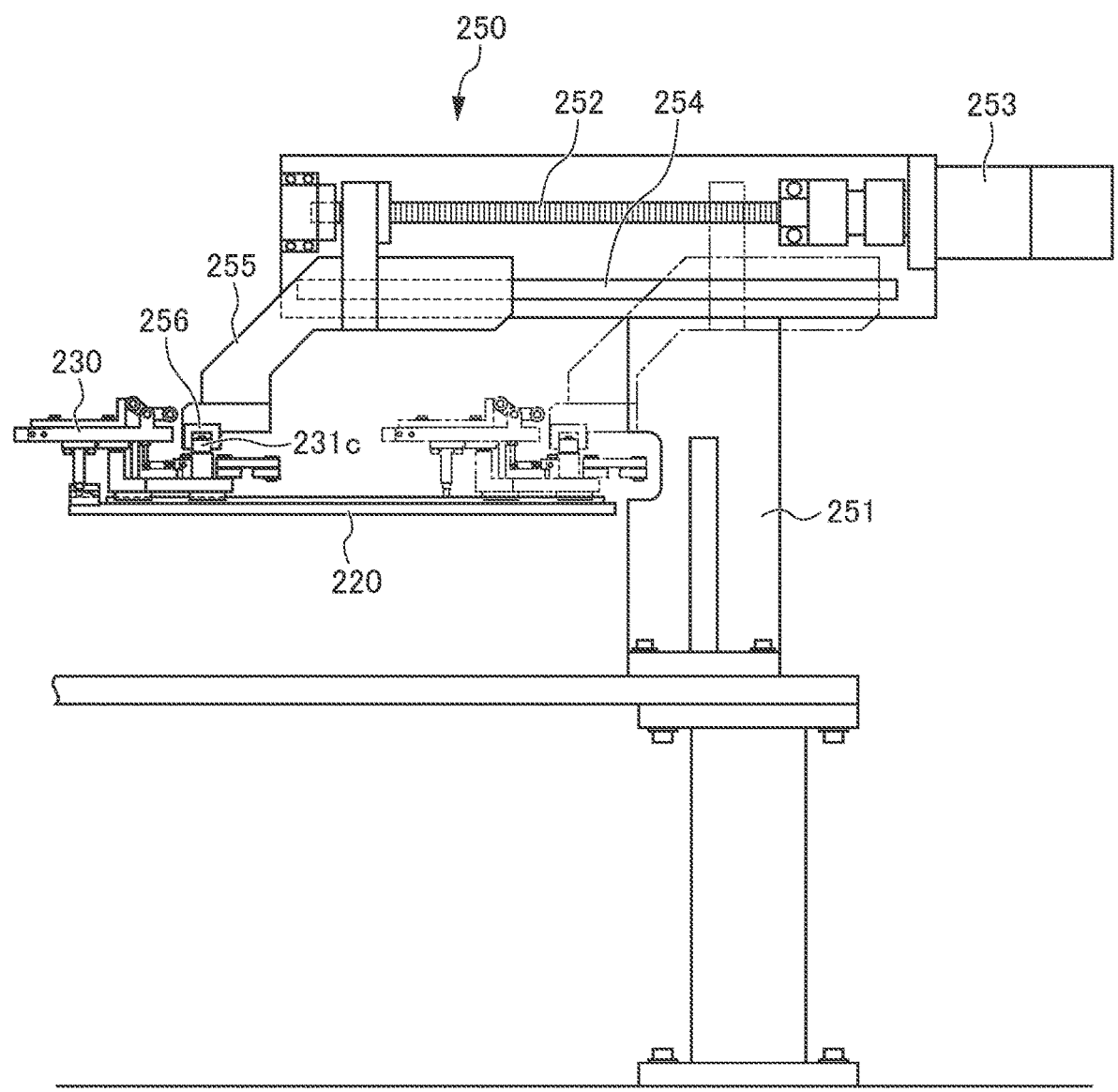
FIG. 9 is a side view illustrating a driving mechanism according to the embodiment.

FIG. 9 is a side view illustrating the driving mechanism 250 according to the embodiment. As illustrated in FIG. 9, the driving mechanism 250 includes a support 251, a ball screw mechanism 252 supported by the support 251, a servomotor 253 which drives the ball screw mechanism 252, a slide rail 254 disposed parallel to the ball screw mechanism 252, and a plate 255 attached to the ball screw mechanism 252 and the slide rail 254. The plate 255 includes a recessed portion 256 recessed downward. The recessed portion 256 has a continuous recess in the circumferential direction to open both ends. The recessed portion 256 is fitted to the roller 231c provided at the upper end portion of the weight portion 231b of the retreated gripping device 230 such that the gripping device 230 and the driving mechanism 250 are connected. Accordingly, the driving forces of the driving mechanisms 250 are transmitted to the plurality of gripping devices 230. In this manner, the driving mechanism 250 performs only a linear motion in the radial direction.

Figure 10:
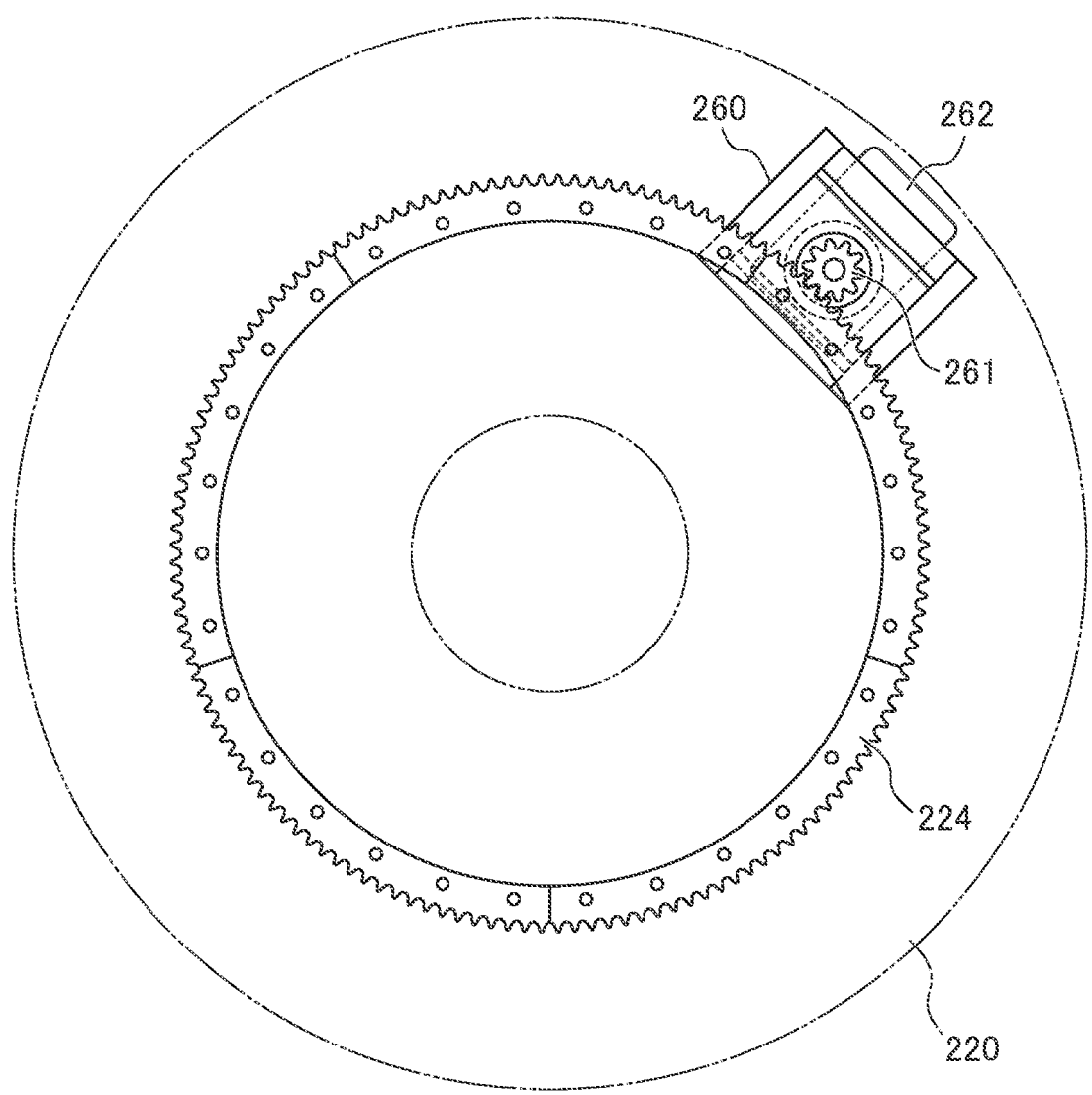
FIG. 10 is a view illustrating a table driving device according to the embodiment.

FIG. 10 is a view illustrating the table driving device 260 according to the embodiment. As illustrated in FIG. 10, the table driving device 260 is installed on the lower surface of the rotating table 220. The rotating table 220 has teeth 224 formed on the lower surface in the circumferential direction according to the number of the plurality of gripping devices 230. The table driving device 260 has a gear mechanism 261 having teeth meshing with the plurality of teeth 224 on the lower surface of the rotating table 220, and a servomotor 262 which drives the gear mechanism 261. When the delivery of the coil elements 40 from the two robot arms 210a and 210b to the first gripping device 230a and the second gripping device 230b is completed, the table driving device 260 causes the teeth 224 on the lower surface of the rotating table 220 to be shifted by two by driving the servomotor 262.

Accordingly, at the two disposition points P1 and P2 of the rotating table 220, the same type of gripping devices 230a and 230b which are skipped by one from the first gripping device 230a and the second gripping device 230b, which have completed the gripping of the coil elements 40, and are yet to grip the coil elements 40 are disposed. As described above, at one of the two disposition points P1 and P2, the first gripping device 230a grips the coil element 40, and at the other, the second gripping device 230b grips the coil element 40.

Here, whenever the teeth 224 on the lower surface of the rotating table 220 are shifted by one by driving the servomotor 262, the rollers 231c fitted to the recessed portions 256 of the plates 255 of the four driving mechanisms 250 are moved in the circumferential direction from the recessed portions 256 according to the circumferential movement of the gripping devices 230 following the rotation of the rotating table 220 such that the fitting between the rollers 231c and the recessed portions 256 is released. In addition, the gripping devices 230 having the rollers 231c are moved from the four driving mechanisms 250. Furthermore, the gripping devices 230 adjacent to the gripping devices 230 moved from the four driving mechanisms 250 are moved to the four driving mechanisms 250. In addition, the rollers 231c of the gripping devices 230 moved to the four driving mechanisms 250 are inserted into the recessed portions 256 in the circumferential direction according to the circumferential movement of the gripping devices 230 following the rotation of the rotating table 220 such that the rollers 231c and the recessed portions 256 are fitted to each other.

<Configuration of Coil Element Inserting Device>

Figure 11:
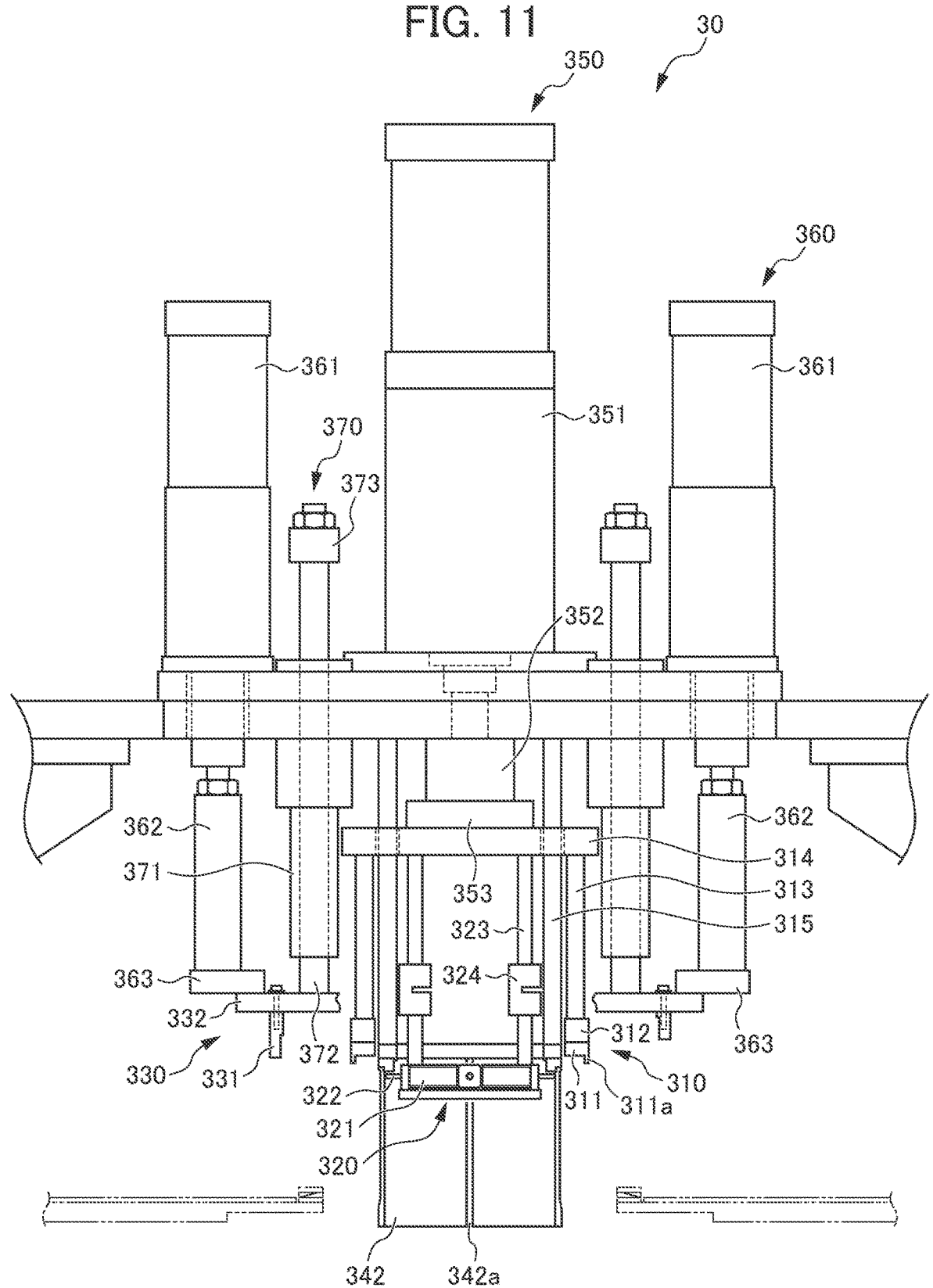
FIG. 11 is a front view illustrating a coil element inserting device according to the embodiment.

The coil element inserting device 30 inserts the leg portions 41 of each of the coil elements 40 in the assembly 50 into each of the slots 61 of the stator core 60. FIG. 11 is a front view illustrating the coil element inserting device 30 according to the embodiment. The coil element inserting device 30 includes a coil element pressing mechanism 310, a pin protruding mechanism 320, a lever pressing mechanism 330, and a guiding device 340. Furthermore, the coil element inserting device 30 includes a coil element pressing mechanism cylinder mechanism 350, two lever pressing mechanism cylinder mechanisms 360, and four lever pressing mechanism guide mechanisms 370.

The coil element pressing mechanism 310 presses assembly 50 into which the plurality of coil elements 40 are assembled by the coil element alignment device 20 downward to the position where the stator core 60 is located. The coil element pressing mechanism 310 includes a pressing member 311, a lower annular portion 312 fixed to the upper surface of the pressing member 311, a plurality of support columns 313 extending upward from the upper surface of the lower annular portion 312, an upper disk portion 314 connected to the upper ends of the plurality of support columns 313, and a guide column 315 inserted through the upper disk portion 314 to guide the press member from the inner circumferential side. The pressing member 311 has an annular shape including the same diameter as the assembly 50, and includes an annular protrusion 311a which protrudes downward on the outer circumferential side of the lower surface to support the outer circumferential side of the turn portion 42 of each of the coil elements 40 in the assembly 50 from the radially outward side. The coil element pressing mechanism 310 is connected to the coil element pressing mechanism cylinder mechanism 350.

The coil element pressing mechanism cylinder mechanism 350 includes a cylinder 351 having a cylindrical shape disposed at the center of the stator manufacturing apparatus 1, a piston (not illustrated) provided so as to reciprocate in the cylinder 351, a rod 352 connected to the piston, and a disk portion 353 provided at the distal end of the rod 352. The lower surface of the disk portion 353 is connected to the upper surface of the upper disk portion 314 of the coil element pressing mechanism 310.

After the assembly 50 is formed by assembling the plurality of coil elements 40 by the coil element alignment device 20, the coil element pressing mechanism 310 moves the rod 352 downward by driving the piston of the coil element pressing mechanism cylinder mechanism 350 to lower the pressing member 311. Accordingly, the lower surface of the lowered pressing member 311 comes into contact with the turn portion 42 of each of the coil elements 40 in the assembly 50 and presses the assembly 50.

Figure 12:
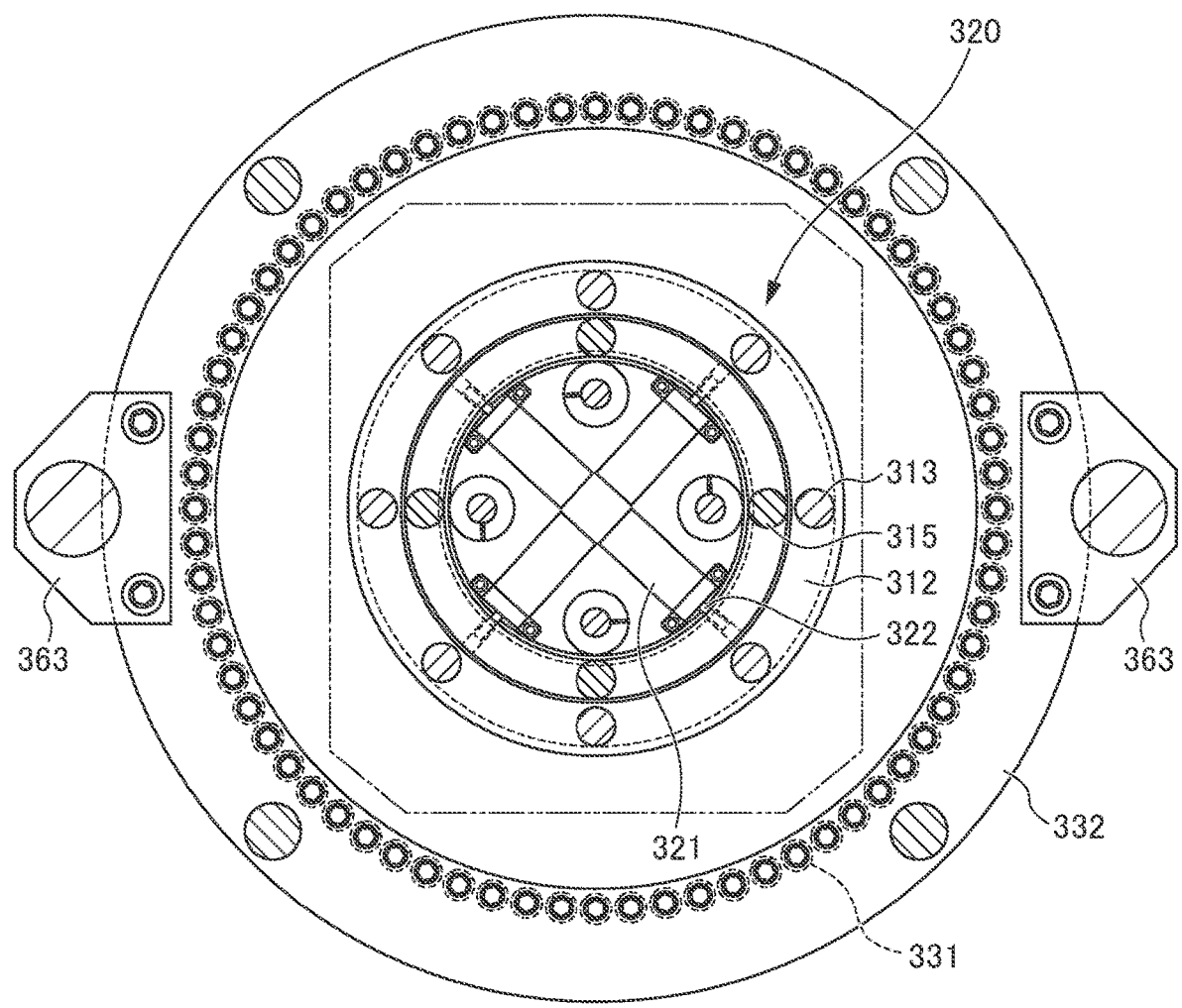
FIG. 12 is a plan view illustrating a pin protruding mechanism according to the embodiment.

FIG. 12 is a plan view illustrating the pin protruding mechanism 320 according to the embodiment. The pin protruding mechanism 320 prevents the assembly 50 pressed by the coil element pressing mechanism 310 from falling after the plurality of gripping devices 230 release the gripping. The pin protruding mechanism 320 includes a disk-shaped pin protruding portion 321 having a diameter smaller than the diameter of the assembly 50, four pins 322 which are separated from the pin protruding portion 321 by 90° with respect to the center and are able to protrude and retract, a plurality of support columns 323 extending upward from the upper surface of the pin protruding portion 321 to the upper disk portion 314 of the coil element pressing mechanism 310, and guide members 324 which are provided in the middle of the plurality of support columns 323 to guide the outer periphery to the guide columns 315 of the coil element pressing mechanism 310. When the four pins 322 protrude in the radially outward direction, the four pins 322 abut the lower side of the turn portion 42 in a predetermined coil element 40 in the assembly 50 and support lower side thereof using the shape of the turn portion 42 by pinching the turn portion 42 with the pressing member 311, thereby supporting the assembly 50. The relative position of the pin protruding portion 321 to the pressing member 311 of the coil element pressing mechanism 310 is adjusted so that the pin 322 protrudes at a predetermined timing at which the pin 322 abuts the lower side of the turn portion 42 in the predetermined coil element 40 in the assembly 50, and the pin protruding portion 321 is disposed lower than the lower surface of the pressing member 311 in accordance with the longitudinal width of the turn portion 42 of the coil element 40 in the assembly 50. In a case where the assembly 50 is pressed by the coil element pressing mechanism 310, the pin protruding mechanism 320 cause the four pins 322 to simultaneously protrude in the radially outward direction from the lowered pin protruding portion 321 at a predetermined timing. Accordingly, the four pins 322 are inserted between the leg portions 41 of the plurality of coil elements 40 in the assembly 50, and abut the lower side of the turn portion 42 of the predetermined coil element 40 to support the assembly 50 from below.

The lever pressing mechanism 330 simultaneously press the distal end portions 232d3 of the levers 232d of the plurality of gripping devices 230 and simultaneously release the gripping of the coil elements 40 by the plurality of gripping devices 230. The lever pressing mechanism 330 includes a plurality of pressing pins 331, and an annular portion 332 of which the lower surface supports the plurality of pressing pins 331 in a state of being directed downward. The plurality of pressing pins 331 are provided on the lower surface of the annular portion 332 in the same number as the number of the plurality of gripping devices 230, and are arranged in the circumferential direction immediately above the distal end portions 232d3 of the levers 232d of the plurality of gripping devices 230 positioned while being assembled toward the inner circumferential side on the rotating table 220. In the plurality of pressing pins 331, the pressing pin pressing the distal end portion 232d3 of the lever 232d of the first gripping device 230a is short from the annular portion 332, the pressing pin 331 pressing the distal end portion 232d3 of the lever 232d of the second gripping device 230b is long from the annular portion 332, and the plurality of pressing pins 331 are arranged alternately in the circumferential direction. The pressing pin 331 is formed so that the radially inward side wall is flat with respect to the wall surface of the radially outward side of the short piece 232e2 so as not to collide with the short piece 232e2 of the L-shaped member 232e of each of the gripping devices 230 during the pressing of the distal end portion 232d3 of the lever 232d.

The lever pressing mechanism 330 is connected to the two lever pressing mechanism cylinder mechanisms 360 and the four lever pressing mechanism guide mechanisms 370. The two lever pressing mechanism cylinder mechanisms 360 are each disposed on the left and right with respect to the front surface of the stator manufacturing apparatus 1. The lever pressing mechanism cylinder mechanism 360 includes a cylinder 361 having a cylindrical shape, a piston (not illustrated) provided so as to reciprocate in the cylinder 361, a rod 362 connected to the piston, and a pressing portion 363 provided at the distal end of the rod 362. The four lever pressing mechanism guide mechanisms 370 are disposed with the lever pressing mechanism cylinder mechanisms 360 interposed therebetween at both side surfaces of the stator manufacturing apparatus 1 on a side closer to the center than the two lever pressing mechanism cylinder mechanisms 360. By disposing the four lever pressing mechanism guide mechanisms 370 as described above, the annular portion 332 does not rattle by the driving force from the two lever pressing mechanism cylinder mechanisms 360, and the plurality of pressing pins 331 are set to simultaneously press the distal end portions 232d3 of the levers 232d of the plurality of gripping devices 230. The lever pressing mechanism guide mechanism 370 includes a cylindrical holder 371, a rod 372 provided so as to reciprocate in the holder 371, and a cushion 373 provided at the upper end of the rod 372. The pressing portions 363 of the two lever pressing mechanism cylinder mechanisms 360 and the rods 372 of the four lever pressing mechanism guide mechanisms 370 are connected to the upper surface of the annular portion 332 of the lever pressing mechanism 330.

In the lever pressing mechanism 330, after the pins 322 are caused to protrude by the pin protruding mechanism 320 and thus the assembly 50 is supported by the pins 322, the lever pressing mechanism 330 moves the rod 362 downward by driving the piston of the lever pressing mechanism cylinder mechanism 360, and the distal end portions 232d3 of the levers 232d of the plurality of gripping devices 230 are pressed by the plurality of pressing pins 331 which are lowered. Accordingly, the plurality of gripping devices 230 simultaneously release the gripping of the coil elements 40.

Figure 13:
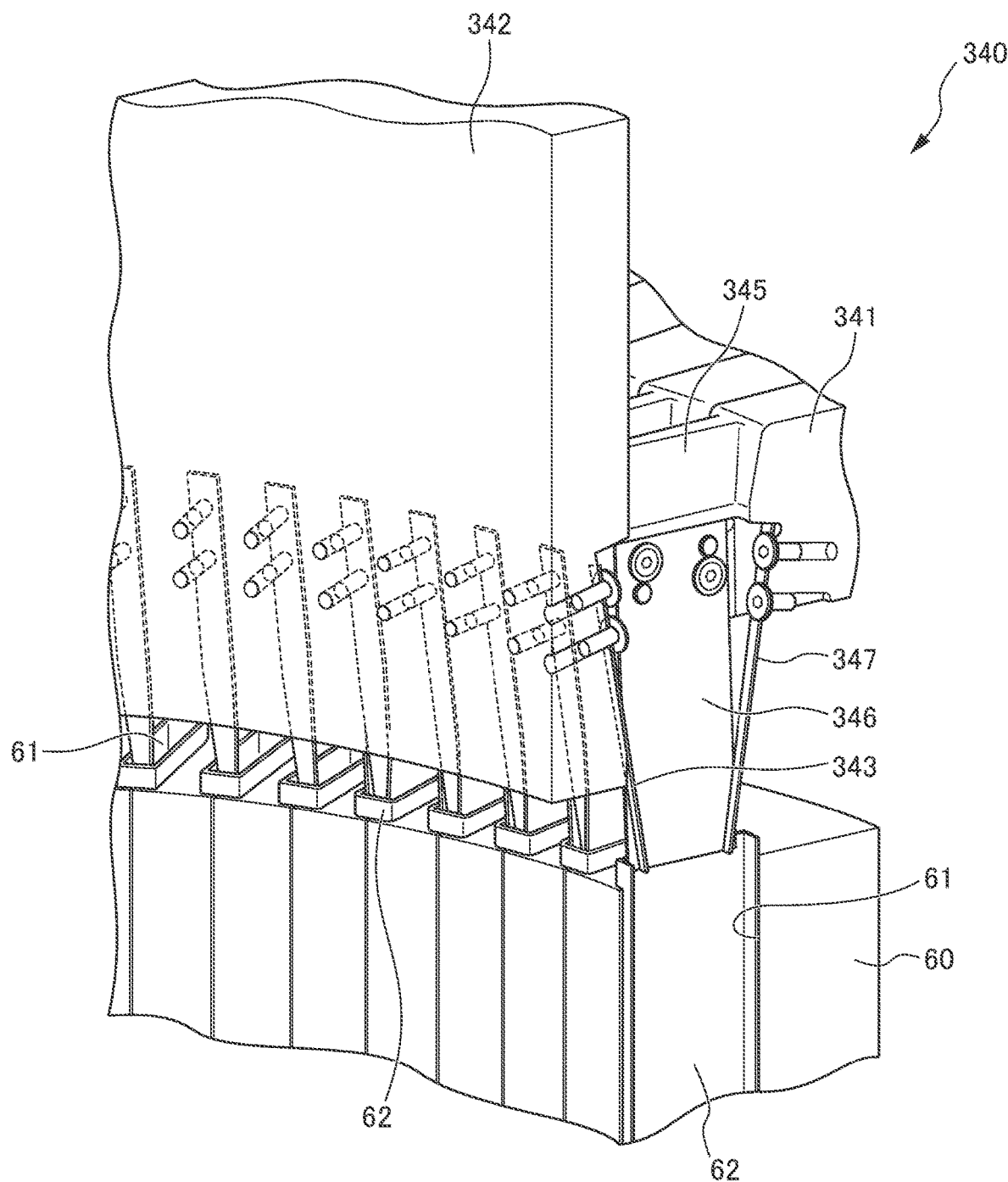
FIG. 13 is a perspective view illustrating a guiding device according to the embodiment.

FIG. 13 is a perspective view illustrating the guiding device 340 according to the embodiment. The guiding device 340 inserts the leg portions 41 of the coil elements 40 in the assembly 50 pressed by the coil element pressing mechanism 310 into each of the slots 61 of the stator core 60. The guiding device 340 is disposed continuously on the radially inward side of the rotating table 220 and below the rotating table 220. The guiding device 340 includes a support portion 341, an inner circumferential guide 342, a guide plate 343, a slide mechanism 344, a guiding portion 345, a pair of first expansion plates 346, a second expansion plate 347, and an arcuate guide 348.

The support portion 341 is formed of an annular frame and supports the slide mechanism 344 that supports the guiding portion 345.

As illustrated in FIG. 11, the inner circumferential guide 342 has a slit 342a which extends downward from the guide columns 315 to cause the pin 322 to be vertically movable in a state of being inserted therethrough, and is formed in a cylindrical shape at the center portion of the support portion 341. The lower end of the inner circumferential guide 342 also serves as a stopper which abuts and fix the stator core 60 lifted by the elevating mechanism 120 of the stator core transporting device 10. The assembly 50 into which the plurality of coil elements 40 aligned in the annular shape are assembled abut the outer circumference of the inner circumferential guide 342.

As illustrated in FIG. 13, the guide plate 343 is provided on the outer circumference of the inner circumferential guide 342, and is inserted to each of the slots 61 of the stator core 60 lifted by the elevating mechanism 120 of the stator core transporting device 10 together with the pair of first expansion plates 346 and the second expansion plate 347. The guide plate 343 is connected to an inclined surface (a surface inclined downward in the radially outward direction) formed at the lower portion of the inner circumferential guide 342. Accordingly, the guide plate 343 extends obliquely downward from the lower end of the inner circumferential guide 342. The guide plate 343 is provided corresponding to the inner short side of the slot 61.

As illustrated in FIGS. 1 and 2, the slide mechanism 344 moves, in the radial direction, each of a plurality of divided guiding portions which constitute the guiding portion 345 divided into four and are divided in the circumferential direction. The slide mechanism 344 includes four cylinder mechanisms, two slide pins provided for each of the plurality of divided guiding portions, connecting portions connecting the proximal ends (radially outer ends) of the slide pins, and a link mechanism which is provided on the lower surface side of the connecting portion to connect the adjacent connecting portions.

The four cylinder mechanisms are disposed at equal intervals in the circumferential direction. The cylinder mechanism includes a cylinder having a cylindrical shape supported by a support portion, a piston provided so as to reciprocate in the cylinder, a rod connected to the piston, and a connected portion connected to the connecting portion provided at the distal end of the rod. The driving force of the cylinder mechanism is transmitted to the two slide pins via the connected portion, the connecting portion, and the link mechanism.

The two slide pins are provided for each of the plurality of divided guiding portions, and the distal ends thereof are connected to each of the divided guiding portions. The slide pins are arranged vertically. The proximal ends (radially outer ends) of the slide pins are connected at the connecting portion. The two slide pins move each of the divided guiding portions in the radial direction by receiving the driving force of the cylinder mechanism and sliding in the radial direction.

More specifically, each of the slide pins slides in the radially inward direction when receiving the driving force of the slide mechanism 344 directed toward the center axis C1. Accordingly, the divided guiding portions advance in the radially inward direction to be assembled. In addition, each of the slide pins slides in the radially outward direction against the biasing force of the spring when receiving the driving force of the slide mechanism 344 directed in the radially outward direction. Accordingly, the divided guiding portions retreat in the radially outward direction to be disassembled. Since the guiding portion 345 is slidable only in the radially inward and outward directions in the horizontal direction by the slide mechanism 344, the configuration of the guiding portion 345 is simplified.

Figure 14:
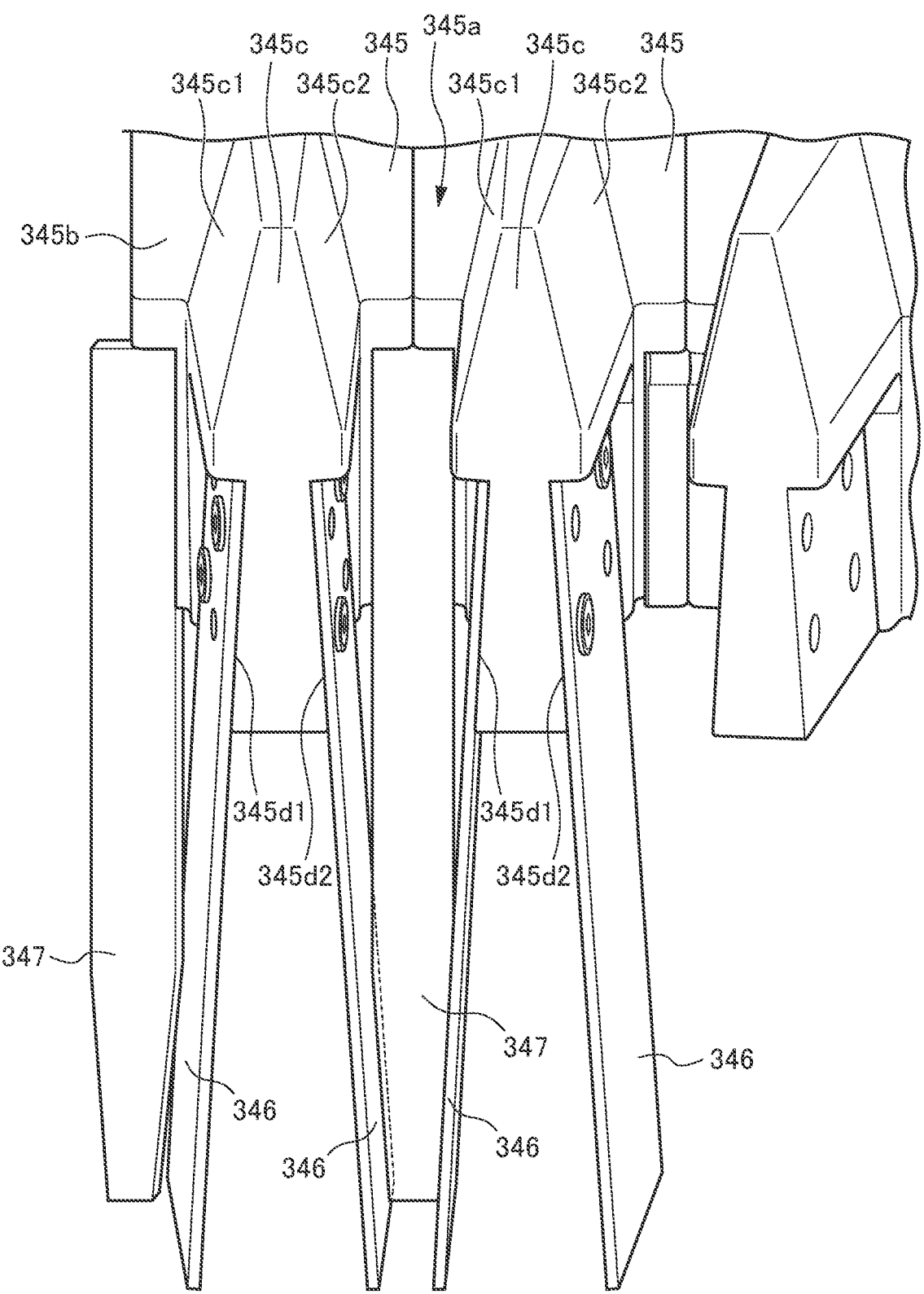
FIG. 14 is a perspective view illustrating a guiding portion, a pair of first expansion plates, and a second expansion plate according to the embodiment.

The guiding portion 345 guides the leg portion 41 of each of the coil elements 40 in the assembly 50 lowered by the coil element pressing mechanism 310 to each of the slots 61 of the stator core 60. The guiding portion 345 is provided in an annular shape and is divided into four in the circumferential direction. The guiding portion 345 is provided with a support portion which shifts the position of the divided guiding portion upward from the position of the slide mechanism 344. FIG. 14 is a perspective view illustrating the guiding portion 345, the pair of first expansion plates 346, and the second expansion plate 347. The guiding portion 345 has tapered structures 345a on the distal end side (radially inward direction), which expand in a direction opposite to the insertion direction (downward). In addition, below the tapered structures 345a of the guiding portion 345, for each of the tapered structures 345a, the pair of first expansion plates 346 and the second expansion plate 347 are provided. The pair of first expansion plates 346 are provided corresponding to the long sides of the slot 61 having a rectangular cross section of the stator core 60. In addition, the second expansion plate 347 is provided corresponding to the outer short side of the slot 61.

The tapered structure 345a of the guiding portion 345 is formed by adjacent protruding portions 345c having an arrow-shaped cross-section protruding from a distal end portion 345b of the divided guiding portion. More specifically, upper side surfaces 345c1 and 345c2 of the protruding portions 345c are inclined to be distant from each other toward the lower side, and the tapered structure 345a is formed by the upper side surfaces 345c1 and 345c2 of the protruding portions 345c.

The pair of first expansion plates 346 and the second expansion plate 347 extend in the insertion direction (downward) from the distal end of the guiding portion 345. Here, since lower side surfaces 345d1 and 345d2 of the protruding portions 345c are inclined to be distant from each other toward the lower side, even in a lower portion of the protruding portion 345c, a tapered structure which expands in the direction opposite to the insertion direction (downward) is formed by the lower side surfaces 345d1 and 345d2 of the adjacent protruding portions 345c.

The pair of first expansion plates 346 are connected to the lower side surfaces 345d1 and 345d2 of the protruding portions 345c, and extend downward along the lower side surfaces 345d1 and 345d2. That is, the pair of first expansion plates 346 extend obliquely with respect to the insertion direction so as to be close to each other toward the lower end side (downward). Similarly, the second expansion plate 347 also extends obliquely with respect to the insertion direction so as to approach the center of the slot toward the lower end side (downward). The second expansion plate 347 is connected to an inclined surface (a surface inclined downward in the radially inward direction) formed at the lower portion of the distal end surface of the guiding portion 345. As illustrated in FIG. 13, the second expansion plate 347 and the guide plate 343 of the inner circumferential guide 342 form a pair and become close to each other toward the lower end side (downward).

In addition, the guide plate 343 and the expansion plates 346 and 347 are bent such that the lower end sides thereof are formed to expand. The interval therebetween is formed to be narrower than the width of the insulation paper 62 disposed in each of the slots 61 of the stator core 60 on the lower end side and is formed to be wider than the width of the leg portion 41 of the coil element 40 on the upper end side. The guide plate 343 and the expansion plates 346 and 347 are formed into lengths such that the lower end portions can be inserted into the slots 61 of the stator core 60 when the stator core 60 lifted by the elevating mechanism 120 of the stator core transporting device 10 is caused to abut the lower end of the inner circumferential guide 342 (see FIG. 16).

As illustrated in FIGS. 1 and 2, the arcuate guide 348 is provided for each of the guiding portions 345 divided into four on the lower side of the support portion 341 of the guiding portion 345. In the arcuate guide 348, when the jig 70 to which the stator core 60 is fixed is lifted by the elevating mechanism 120 of the stator core transporting device 10, the rod is moved in the radially inward direction by driving the piston so that the arcuate guide 348 abuts the outer circumference of the stator core 60. Accordingly, the positions of the divided guiding portions are finely adjusted so that the pair of first expansion plates 346 and the second expansion plate 347 are inserted into the slots 61 of the stator core 60.

<Operation of Stator Manufacturing Apparatus 1>

Figure 15:
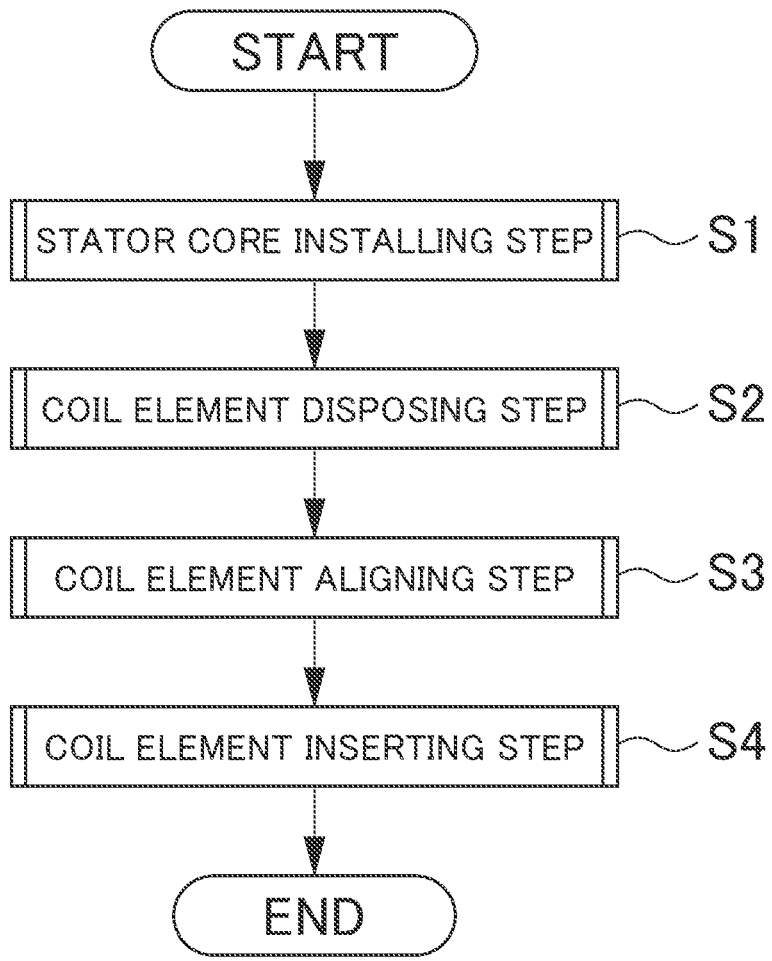
FIG. 15 is a flowchart showing operations of the stator manufacturing apparatus according to the embodiment.

Next, the operation of the stator manufacturing apparatus 1 according to the embodiment will be described. FIG. 15 is a flowchart showing the operations of the stator manufacturing apparatus 1 according to the embodiment. As illustrated in FIG. 15, the stator manufacturing apparatus 1 performs a stator core installing step S1, a coil element disposing step S2, a coil element aligning step S3, and a coil element inserting step S4.

Next, each step will be described.

<Stator Core Installing Step S1>

In the stator core installing step S1, the jig 70 to which the stator core 60 is fixed is installed at a predetermined position of the stator manufacturing apparatus 1. First, the operator places the jig 70 to which the stator core 60 is fixed on the transporting table 112 at the front left side end portion of the stator manufacturing apparatus 1, and presses a manufacturing start button (not illustrated). After pressing the manufacturing start button, the stator manufacturing apparatus 1 is started. In addition, the stator manufacturing apparatus 1 moves the transporting table 112 in the horizontal direction by driving the ball screw mechanism 113 using the servomotor 114 of the horizontal direction transporting mechanism 110. Accordingly, the transporting table 112 on which the jig 70 having the stator core 60 fixed thereto is placed is moved on the slide rail 111 from the front left side end portion to the center of the stator manufacturing apparatus 1.

Figure 16:
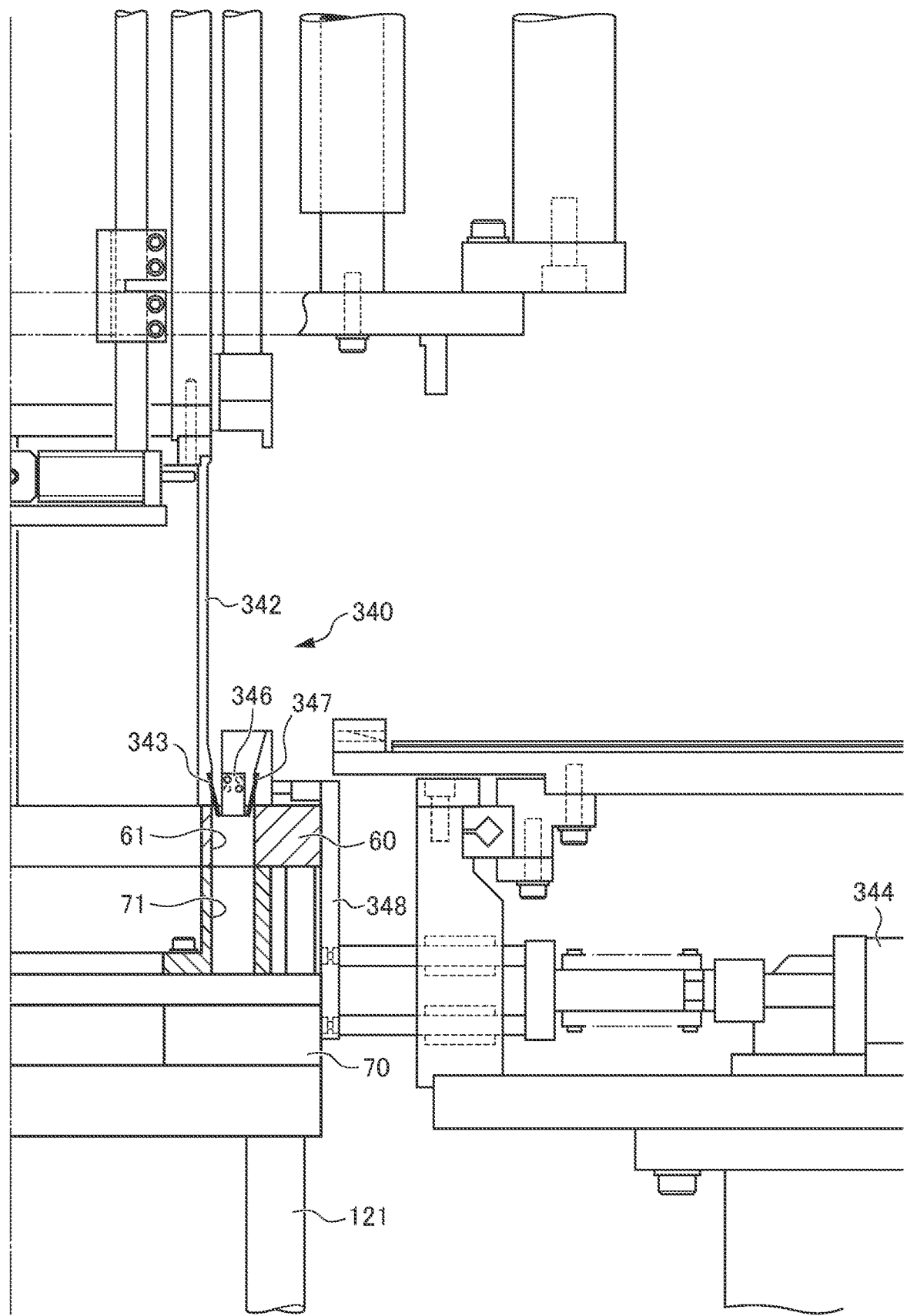
FIG. 16 is a view illustrating a state in which a stator core according to the embodiment is installed.

FIG. 16 is a view illustrating a state in which the stator core 60 according to the embodiment is installed. Next, the stator manufacturing apparatus 1 causes the four rods 121 to be lifted by driving the ball screw mechanism 123 using the servomotor 124 of the elevating mechanism 120. Accordingly, the jig 70 to which the stator core 60 is fixed is pushed upward by the four rods 121. The four rods 121 which push upward the jig 70 to which the stator core 60 is fixed are stopped at a position at which the upper surface of the stator core 60 abuts the lower end of the inner circumferential guide 342 of the guiding device 340.

Here, while the jig 70 to which the stator core 60 is fixed is pushed upward by the four rods 121, the stator manufacturing apparatus 1 causes the rods to be moved in the radially inward direction by driving the piston of the stator core transporting device of the guiding device 340, so that the arcuate guide 348 abuts the outer circumference of the stator core 60. Accordingly, the positions of the pair of first expansion plates 346 and the second expansion plate 347 are finely adjusted, and the guide plate 343, the pair of first expansion plates 346, and the second expansion plate 347 are positioned. In addition, the lower end portions of the guide plate 343, the pair of first expansion plates 346, and the second expansion plate 347 of the guiding device 340 are inserted into the slots 61 of the stator core 60 in which the insulation paper 62 is disposed.

As illustrated in FIG. 13, the end portion of the insertion side (upper side) of the insulation paper 62 disposed in the slot 61 of the stator core 60 slightly protrudes from the slot 61. Therefore, by pushing upward the jig 70 to which the stator core 60 is fixed using the four rods 121 and causing the arcuate guide 348 to abut the outer circumference of the stator core 60, the lower end portions of the guide plate 343, the pair of first expansion plates 346, and the second expansion plate 347 enter a state of being inserted between the insulation papers 62 disposed in the slot 61 of the stator core 60.

<Coil Element Disposing Step S2>

In the coil element disposing step S2, the plurality of coil elements 40 are arranged in the circumferential direction and are disposed in the annular shape. FIG. 17 is a flowchart showing the operations of the coil element disposing step S2 according to the embodiment.

As illustrated in FIG. 17, in Step S21, the stator manufacturing apparatus 1 causes the coil element 40 to be gripped by the first robot arm 210a from the coil forming device 270a and disposed at the disposition point P1 on the rotating table 220 (see FIG. 3). At the disposition point P1, the coil element 40 is inserted into the chuck mechanism of the pair of claws 232g1 and 232g2 of the first gripping device 230a in the releasing state.

Figure 18A:
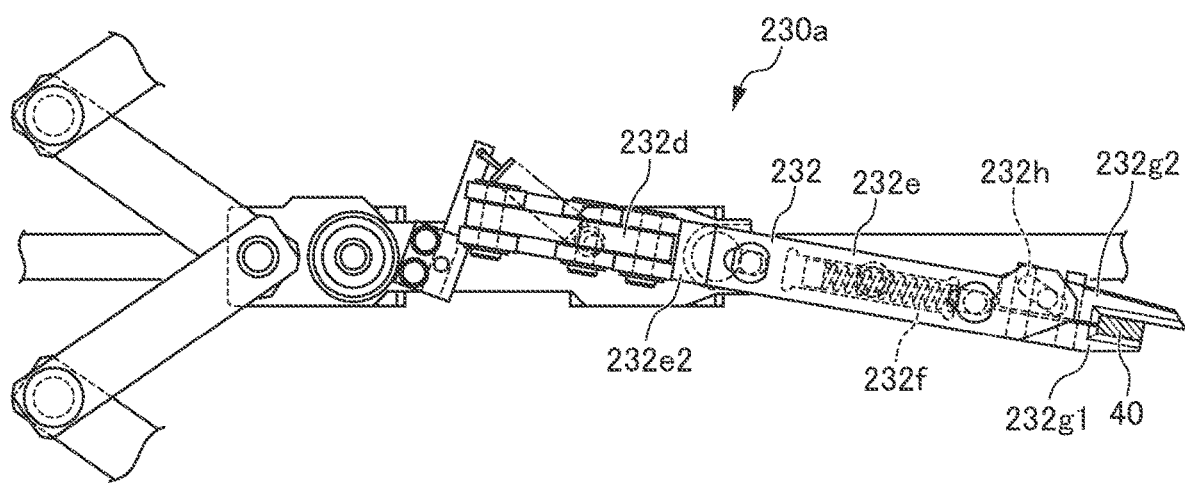
FIG. 18 is a view illustrating a state in which the first gripping device according to the embodiment grips a coil element.
Figure 18B:
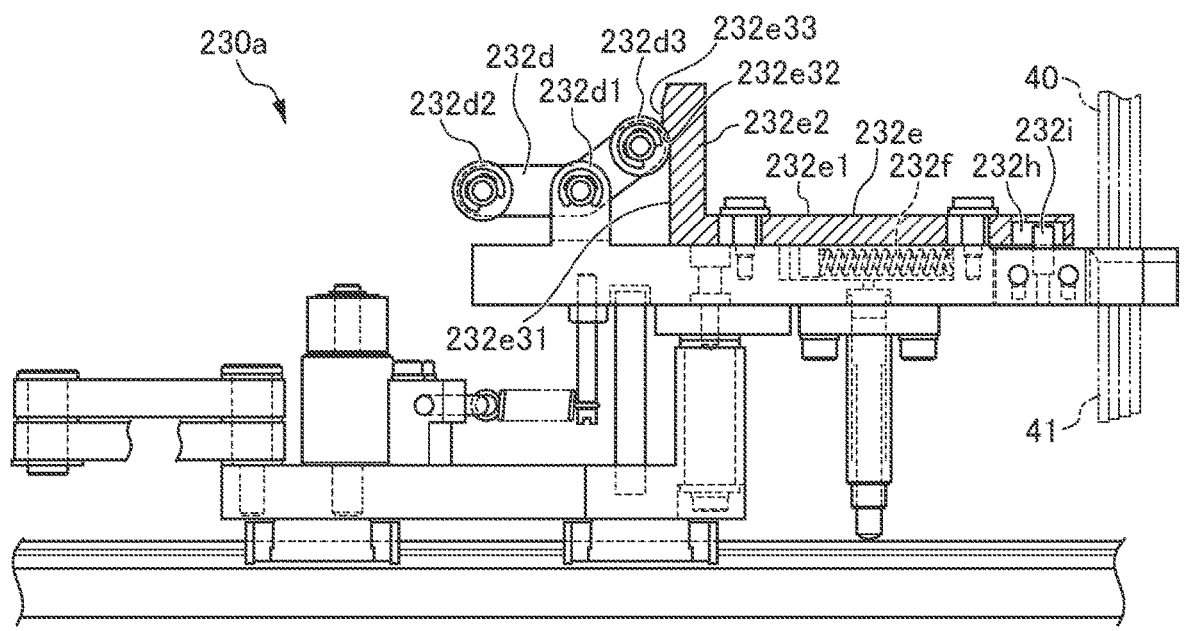

FIG. 18 is a view illustrating a state in which the first gripping device 230a according to the embodiment grips the coil element 40. In Step S22, the stator manufacturing apparatus 1 causes the pressing member 241 to press the proximal end portion 232d2 of the lever 232d of the first gripping device 230a present at the disposition point P1 by driving the piston of the switch device 240. Accordingly, as illustrated in FIGS. 18(A) and 18(B), the first gripping device 230a grips the coil element 40. More specifically, when the pressing member 241 of the switch device 240 presses the proximal end portion 232d2 of the lever 232d of the first gripping device 230a, the distal end portion 232d3 of the lever 232d is lifted and the L-shaped member 232e is biased toward the proximal end side by the spring 232f. Accordingly, the long hole 232h of the L-shaped member 232e is moved toward the proximal end side such that the protrusion 232i of the movable claw 232g2 is disposed on the distal end side closer to the right of the long hole 232h with respect to the center axis C1. In addition, the movable claw 232g2 is pressed against the left wall surface of the long hole 232h with respect to the center axis C1 such that the chuck mechanism of the pair of claws 232g1 and 232g2 enters the pinching state and grips one leg portion 41 of the coil element 40. Furthermore, the pressing member 241 of the switch device 240 is caused to retreat upward by the biasing force of spring after pressing the proximal end portion 232d2 of the lever 232d. After the retreat of the pressing member 241, the first gripping device 230a is fixed to the short piece 232e2 of the L-shaped member 232e in a state in which the lever 232*d* causes the distal end portion 232*d*3 to be lifted higher than the center portion 232*d*1, the chuck mechanism is maintained in the pinching state.

As described above, by receiving the action of the switch device 240 by the short piece 232*e*2 to move the main piece 232*e*1, the main piece 232*e*1 is moved along the fixed claw 232*g*1 and moves the movable claw 232*g*2. As described above, the linear motion of the main piece 232*e*1 can be converted into the gripping force of the pair of claws 232*g*1 and 232*g*2. Therefore, the stator manufacturing apparatus 1 can arrange and dispose the coil elements 40 in the annular shape only by repeating a simple operation. In addition, the first gripping device 230*a* and the switch device 240 have cheap, simple, and small configurations.

In Step S23, the stator manufacturing apparatus 1 causes the coil element 40 to be gripped by the second robot arm 210*b* from the coil forming device 270*b* and disposed at the disposition point P2 on the rotating table 220 (see FIG. 3). At the disposition point P2, the coil element 40 is inserted into the chuck mechanism of the pair of claws 232*g*1 and 232*g*2 of the second gripping device 230*b* in the releasing state.

Figure 19A:
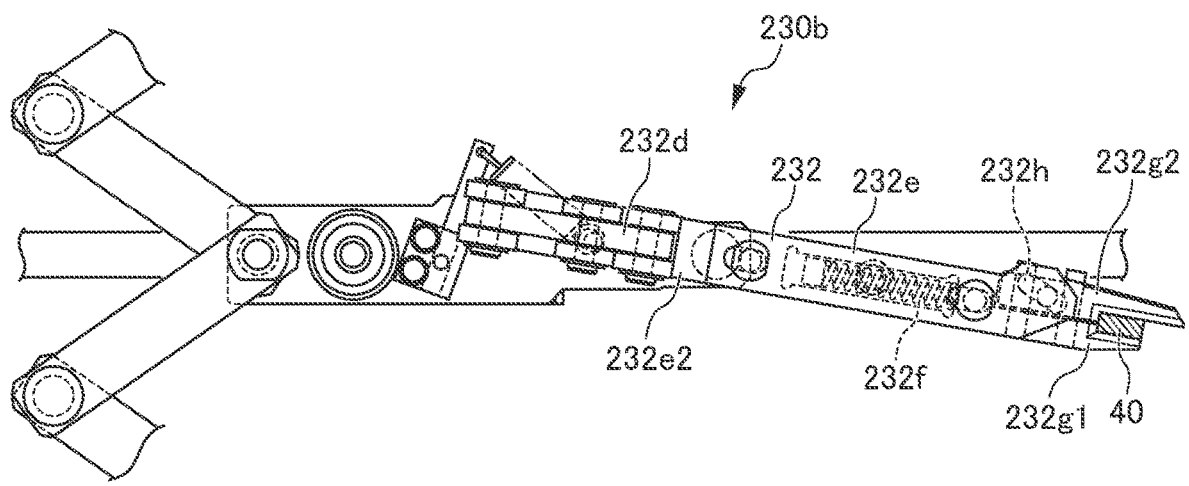
FIG. 19 is a view illustrating a state in which the second gripping device according to the embodiment grips a coil element.
Figure 19B:
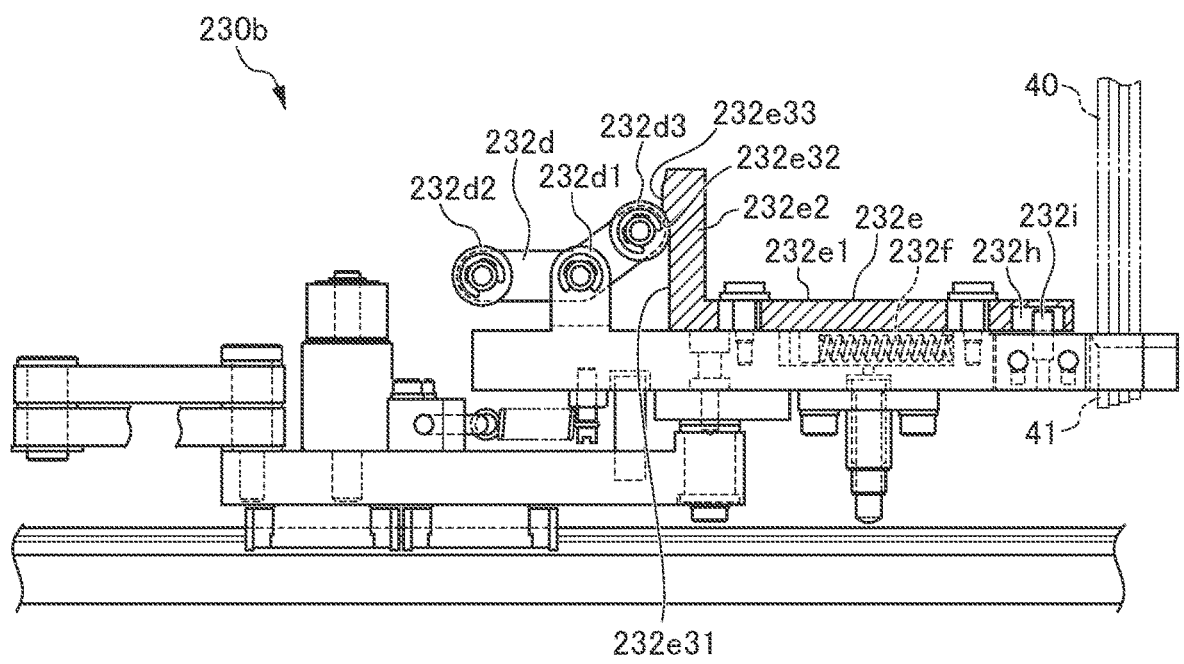

FIG. 19 is a view illustrating a state in which the second gripping device 230*b* according to the embodiment grips the coil element 40. In Step S24, the stator manufacturing apparatus 1 causes the pressing member 241 to press the proximal end portion 232*d*2 of the lever 232*d* of the second gripping device 230*b* present at the disposition point P2 by driving the piston of the switch device 240. Accordingly, as illustrated in FIGS. 19(A) and 19(B), the second gripping device 230*b* grips the coil element 40.

More specifically, when the pressing member 241 of the switch device 240 presses the proximal end portion 232*d*2 of the lever 232*d* of the second gripping device 230*b*, the distal end portion 232*d*3 of the lever 232*d* is lifted and the L-shaped member 232*e* is biased toward the proximal end side by the spring 232*f*. Accordingly, the long hole 232*h* of the L-shaped member 232*e* is moved toward the proximal end side such that the protrusion 232*i* of the movable claw 232*g*2 is disposed on the distal end side closer to the right of the long hole 232*h* with respect to the center axis C1. In addition, the movable claw 232*g*2 is pressed against the left wall surface of the long hole 232*h* with respect to the center axis C1 such that the chuck mechanism of the pair of claws 232*g*1 and 232*g*2 enters the pinching state and grips one leg portion 41 of the coil element 40. Here, since the height of the second gripping device 230*b* is lower than the first gripping device 230*a* in the axial direction of the center axis C1, the second gripping device 230*b* grips an end portion lower than one left portion 41 of the coil element 40. Furthermore, the pressing member 241 of the switch device 240 is caused to retreat upward by the biasing force of spring after pressing the proximal end portion 232*d*2 of the lever 232*d*. After the retreat of the pressing member 241, the second gripping device 230*b* is fixed to the short piece 232*e*2 of the L-shaped member 232*e* in a state in which the lever 232*d* causes the distal end portion 232*d*3 to be lifted higher than the center portion 232*d*1, the chuck mechanism is maintained in the pinching state.

As described above, by receiving the action of the switch device 240 by the short piece 232*e*2 to move the main piece 232*e*1, the main piece 232*e*1 is moved along the fixed claw 232*g*1 and moves the movable claw 232*g*2. As described above, the linear motion of the main piece 232*e*1 can be converted into the gripping force of the pair of claws 232*g*1 and 232*g*2. Therefore, the stator manufacturing apparatus 1 can arrange and dispose the coil elements 40 in the annular shape only by repeating a simple operation. In addition, the second gripping device 230*b* and the switch device 240 have cheap, simple, and small configurations.

After the process of Step S24, by the spring 233, each of the plurality of gripping devices 230 is biased to enter the state before the coil element 40 is rotated toward the right by 10° with respect to the center axis C1 about the rotating shaft 231*e* parallel to the center axis C1 of the annular shape. Therefore, each of the plurality of coil elements 40 can be rotated about the rotating shaft 231*e* parallel to the center axis C1 of the annular shape while moving toward the center of the annular shape.

In step S25, the stator manufacturing apparatus 1 causes the teeth 224 on the lower surface of the rotating table 220 to be shifted by two by driving the servomotor 262 of the table driving device 260. Accordingly, at the two disposition points P1 and P2 of the rotating table 220, the same type of gripping devices 230*a* and 230*b* which are skipped by one from the first gripping device 230*a* and the second gripping device 230*b*, which have completed the gripping of the coil elements 40, and are yet to grip the coil elements 40 are disposed.

At this time, whenever the teeth 224 on the lower surface of the rotating table 220 are shifted by one, at positions different from the two disposition points P1 and P2 of the rotating table 220, the rollers 231*c* fitted to the recessed portions 256 of the plates 255 of the four driving mechanisms 250 are moved in the circumferential direction from the recessed portions 256 according to the circumferential movement of the gripping devices 230 following the rotation of the rotating table 220 such that the fitting between the rollers 231*c* and the recessed portions 256 is released. In addition, the gripping devices 230 having the rollers 231*c* are moved from the four driving mechanisms 250. Furthermore, the gripping devices 230 adjacent to the gripping devices 230 moved from the four driving mechanisms 250 are moved to the four driving mechanisms 250. In addition, the rollers 231*c* of the gripping devices 230 moved to the four driving mechanisms 250 are inserted into the recessed portions 256 in the circumferential direction according to the circumferential movement of the gripping devices 230 following the rotation of the rotating table 220 such that the rollers 231*c* and the recessed portions 256 are fitted to each other.

In Step S26, the stator manufacturing apparatus 1 determines whether or not the rotating table 220 made one revolution. In a case where an affirmative determination is made in Step S26 that the rotating table 220 made one revolution, since the plurality of coil elements 40 are disposed in the annular shape, the coil element disposing step S2 is ended. In a case where a negative determination is made in Step S26 that the rotating table 220 has not made one revolution yet, the process proceeds to Step S21.

As described above, in the coil element disposing step S2, by repeating Steps S21 to S24 of causing the first gripping devices 230*a* and the second gripping devices 230*b* to grip the coil elements 40 and Step S25 of disposing the other gripping devices 230 which are yet to grip the coil elements 40 at the disposition points P1 and P2 where the coil elements 40 are gripped by integrally rotating the plurality of gripping devices 230, the plurality of coil elements 40 are disposed in the annular shape. Accordingly, by rotating the gripping devices 230 with the rotating table 220 on which the plurality of gripping devices 230 are arranged in the annular shape, while the coil elements 40 are supplied to the same disposition points P1 and P2 by the robot arms 210*a* and 210*b* and are gripped by the gripping devices 230, the plurality of coil elements 40 can be arranged and disposed in the annular shape. Therefore, due to the cheap, simple, and small configuration, only by repeating the simple operation, the plurality of coil elements 40 can be each gripped by the plurality of gripping devices 230.

<Coil Element Aligning Step S3>

Figure 20:
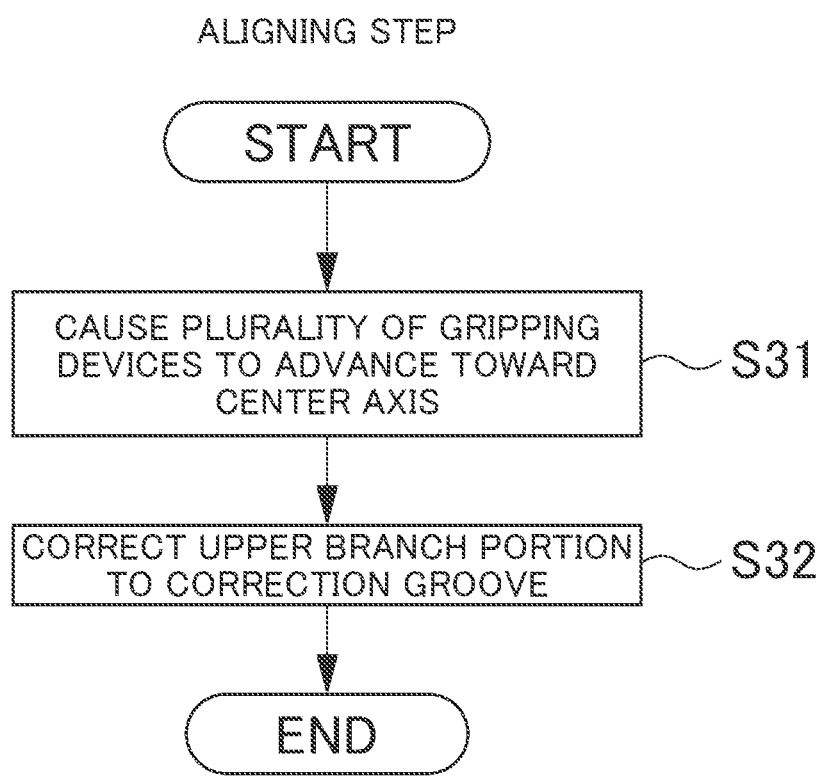
FIG. 20 is a flowchart showing operations of a coil element aligning step according to the embodiment.
Figure 21A:
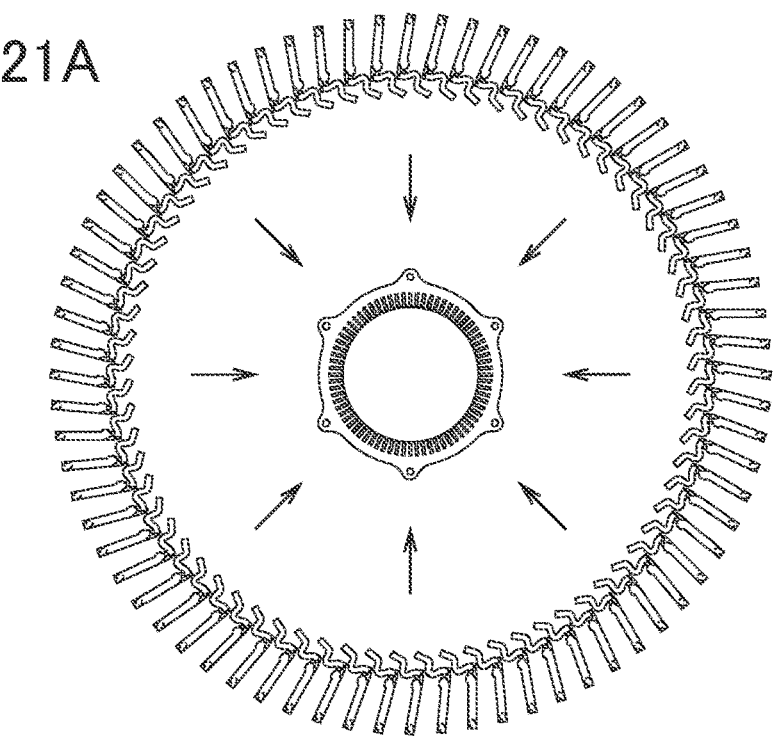
FIG. 21 is a view of an assembly formed by assembling a plurality of coil elements according to the embodiment.
Figure 21B:
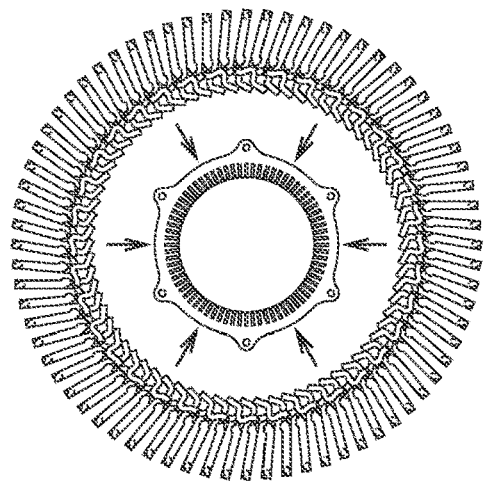

In the coil element aligning step S3, the assembly 50 is formed by assembling the plurality of coil elements 40. FIG. 20 is a flowchart showing the operations of the coil element aligning step S3 according to the embodiment. FIG. 21 is a view of the assembly formed by assembling the plurality of coil elements 40 according to the embodiment.

As illustrated in FIG. 20, in Step S31, the stator manufacturing apparatus 1 causes the plates 255 attached to the slide rails 254 to be moved in the radially inward direction by driving the servomotors 253 of the four driving mechanisms 250. Accordingly, the driving force is applied to the plurality of gripping devices 230 and the plurality of gripping devices 230 advance toward the center axis C1 of the annular shape. As a result, the plurality of coil elements 40 disposed in the annular shape are decreased in the diameter of the annular shape as in the state in FIG. 21(B) from the state in FIG. 21(A).

Figure 21C:
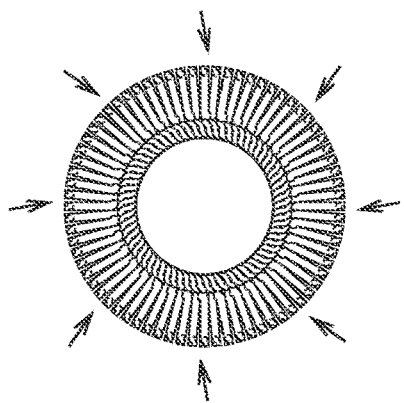

In Step S32, the stator manufacturing apparatus 1 causes the plates 255 attached to the slide rails 254 to be further moved in the radially inward direction by driving the servomotors 253 of the four driving mechanisms 250. At this time, before the plurality of gripping devices 230 are assembled toward the center axis C1 of the annular shape, the pins 232c of the upper branch portions 232 of the gripping devices 230 are guided to the correction grooves 223. Accordingly, while the plurality of gripping devices 230 advance toward the center axis C1 of the annular shape, the upper branch portions 232 of the plurality of gripping devices 230 are corrected to the left by 10° with respect to the center axis C1 about the rotating shaft 231e parallel to the center axis C1 of the annular shape. As illustrated in FIG. 21(C), the corrected upper branch portions 232 cause the gripped coil elements 40 to be corrected to the left by 10° with respect to the center axis C1 about the rotating shaft 231e parallel to the center axis C1 of the annular shape so as to abut the inner circumferential guides 342.

By causing the pin 232c to be guided to the correction groove 223 and rotate the upper branch portion 232 gripping the coil element 40, each of the plurality of coil elements 40 is rotated about the rotating shaft 231e parallel to the center axis C1 of the annular shape while moving toward the center of the annular shape. Accordingly, since the plurality of coil elements 40 are rotated toward the left by 10° with respect to the center axis C1 about the rotating shaft 231e parallel to the center axis C1 of the annular shape, the diameter of the annular shape in which the plurality of coil elements 40 are disposed is further decreased compared to a state in which the plurality of coil elements 40 are not rotated, and the interference between the adjacent coil elements 40 is avoided. Therefore, when the leg portions 41 of the plurality of coil elements 40 are gripped and aligned, the leg portions 41 of the coil elements 40 which are adjacent to each other immediately before the alignment do not interfere with each other.

Figure 22A:
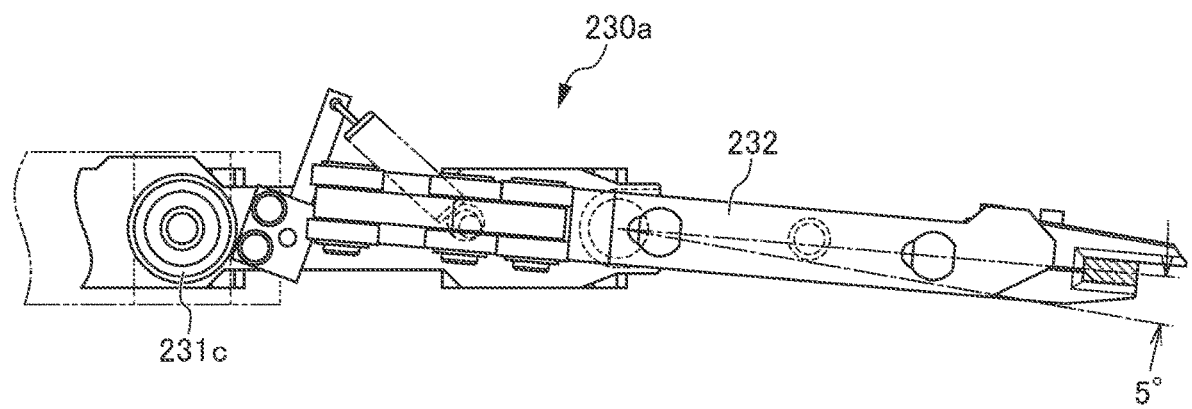
FIG. 22 is a view illustrating a state in which an upper branch portion of the first gripping device according to the embodiment is corrected to the left by 5° with respect to a center axis.
Figure 22B:
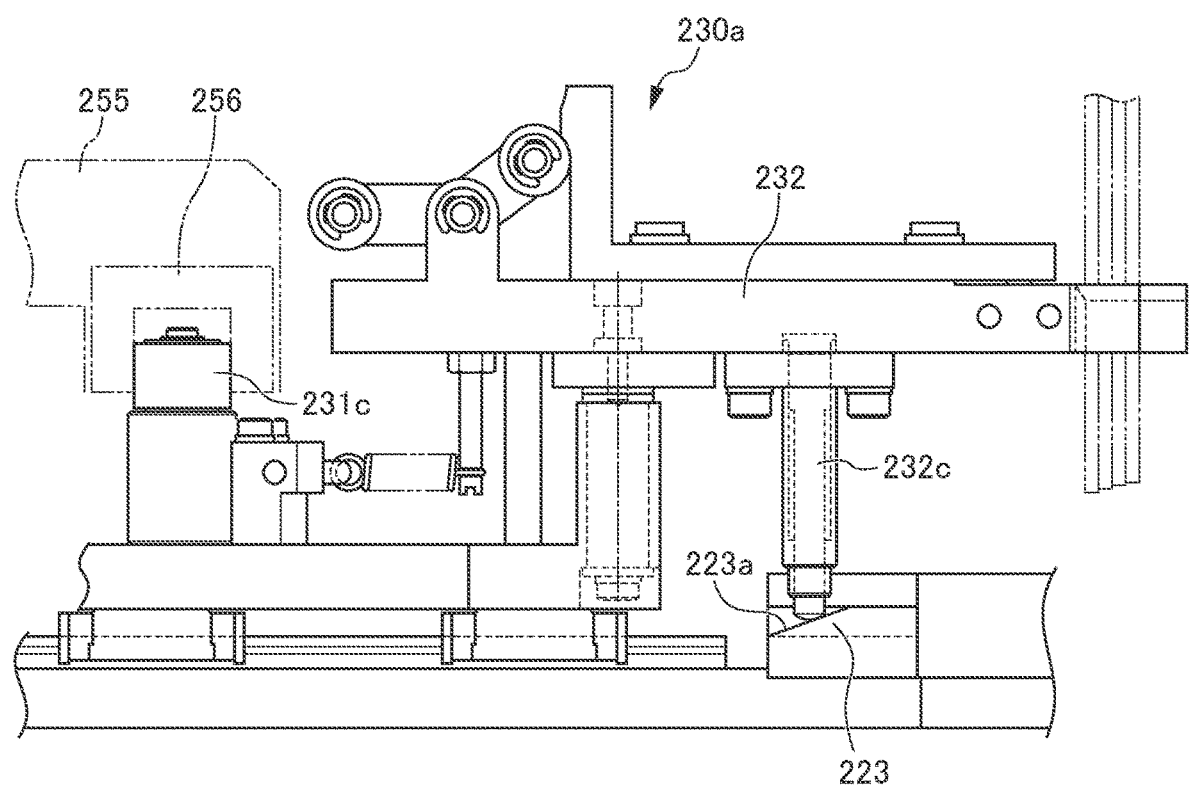
Figure 23A:
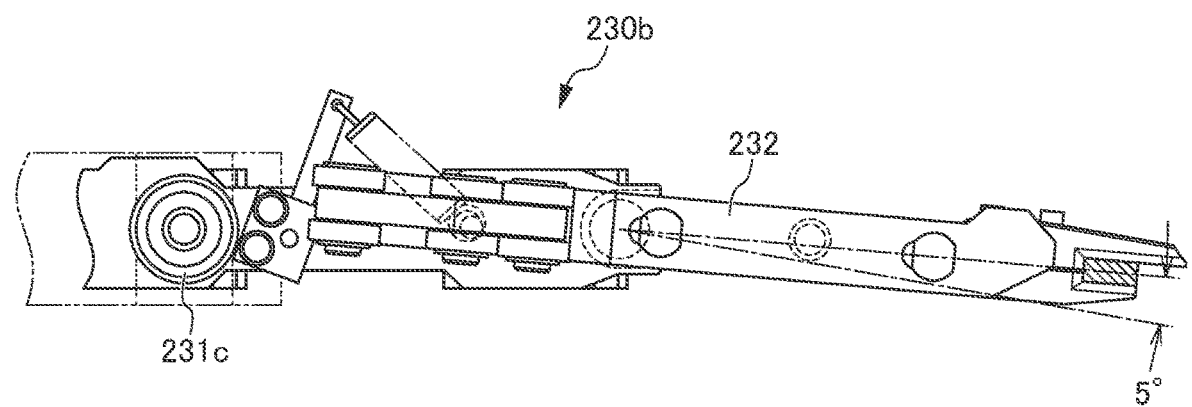
FIG. 23 is a view illustrating a state in which an upper branch portion of the second gripping device according to the embodiment is corrected to the left by 5° with respect to the center axis.
Figure 23B:
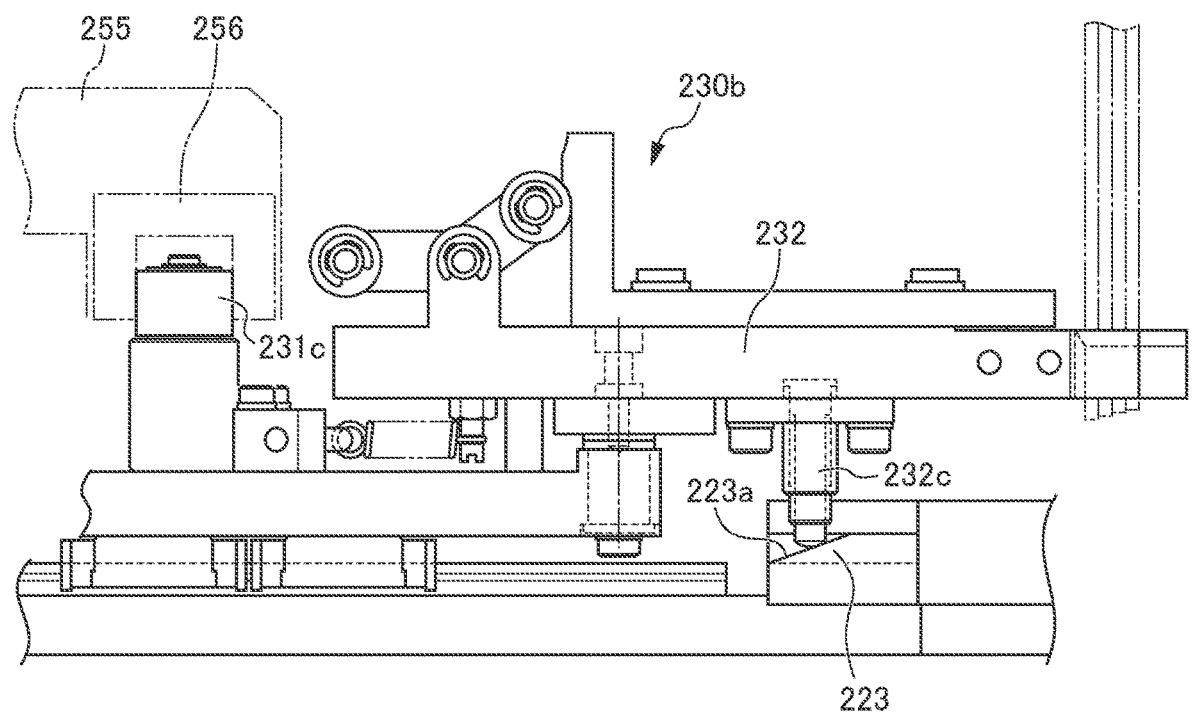

FIG. 22 is a view illustrating a state in which the upper branch portion 232 of the first gripping device 230a according to the embodiment is corrected to the left by 5° with respect to the center axis C1. FIG. 23 is a view illustrating a state in which the upper branch portion 232 of the second gripping device 230b according to the embodiment is corrected to the left by 5° with respect to the center axis C1. As illustrated in FIGS. 22 and 23, when the pins 232c of the upper branch portions 232 of the first gripping device 230a and the second gripping device 230b are guided by the correction grooves 223, the pins 232c ride on the inclined surfaces 223a and are corrected to the left with respect to the center axis C1 by the restriction wall surfaces 223b.

Figure 24A:
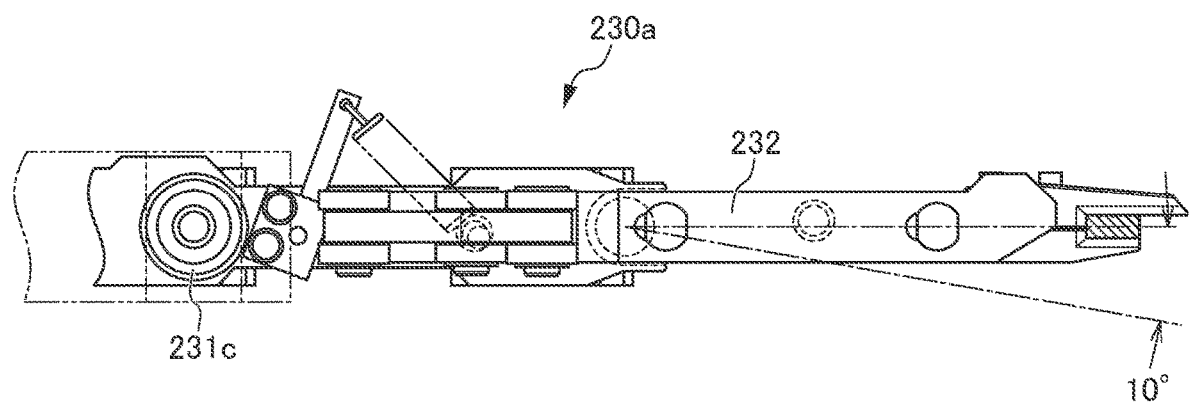
FIG. 24 is a view illustrating a state in which the upper branch portion of the first gripping device according to the embodiment is corrected to the left by 10° with respect to the center axis.
Figure 24B:
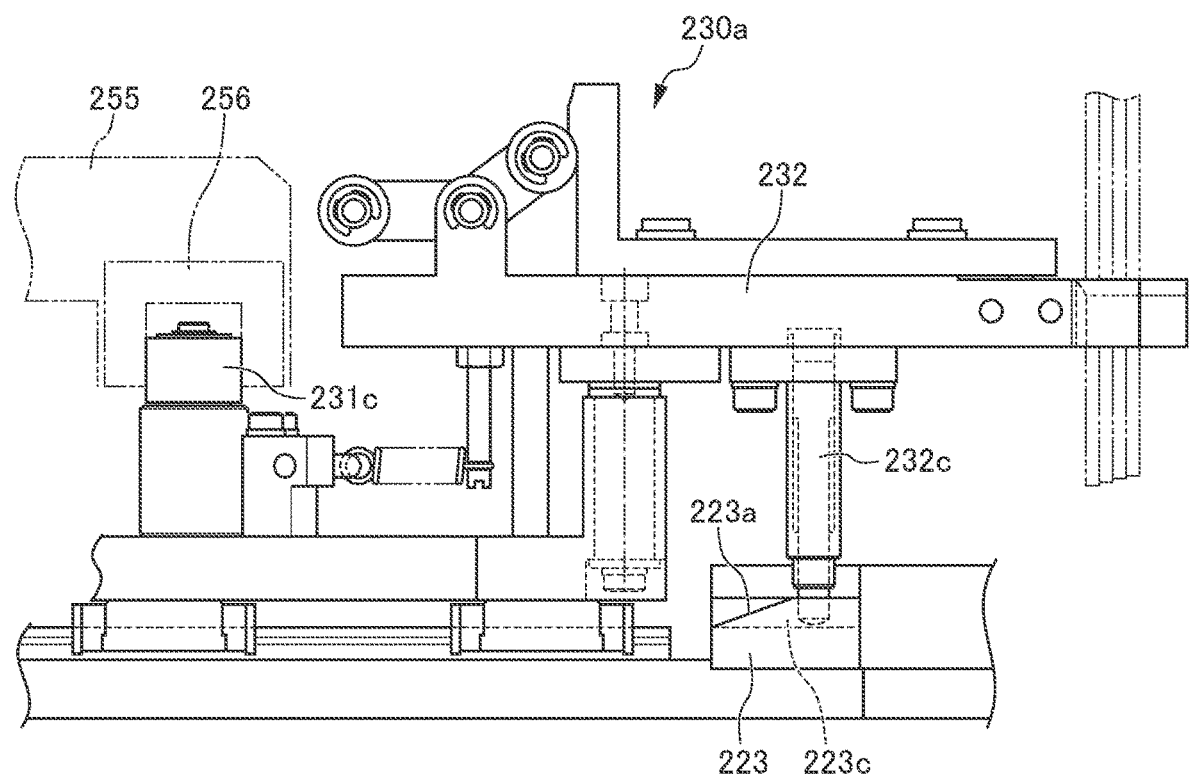
Figure 25A:
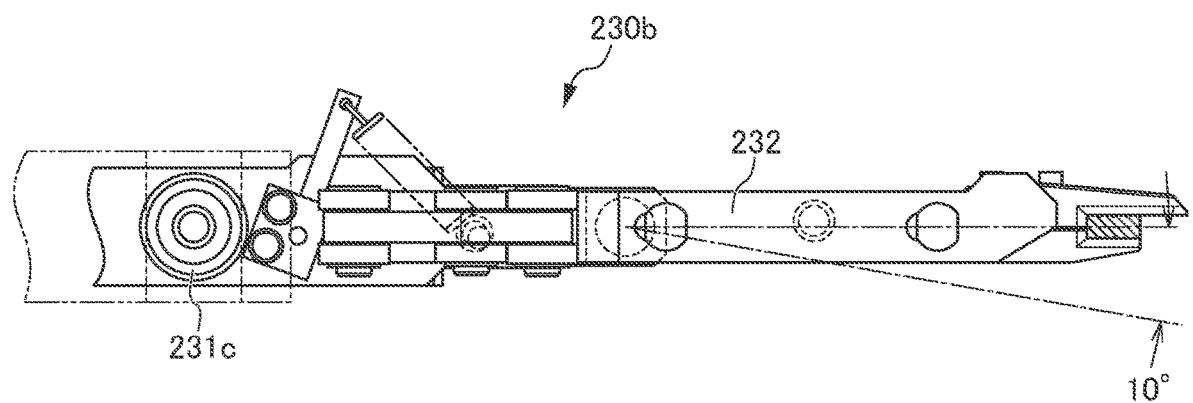
FIG. 25 is a view illustrating a state in which the upper branch portion of the second gripping device according to the embodiment is corrected to the left by 10° with respect to the center axis.
Figure 25B:
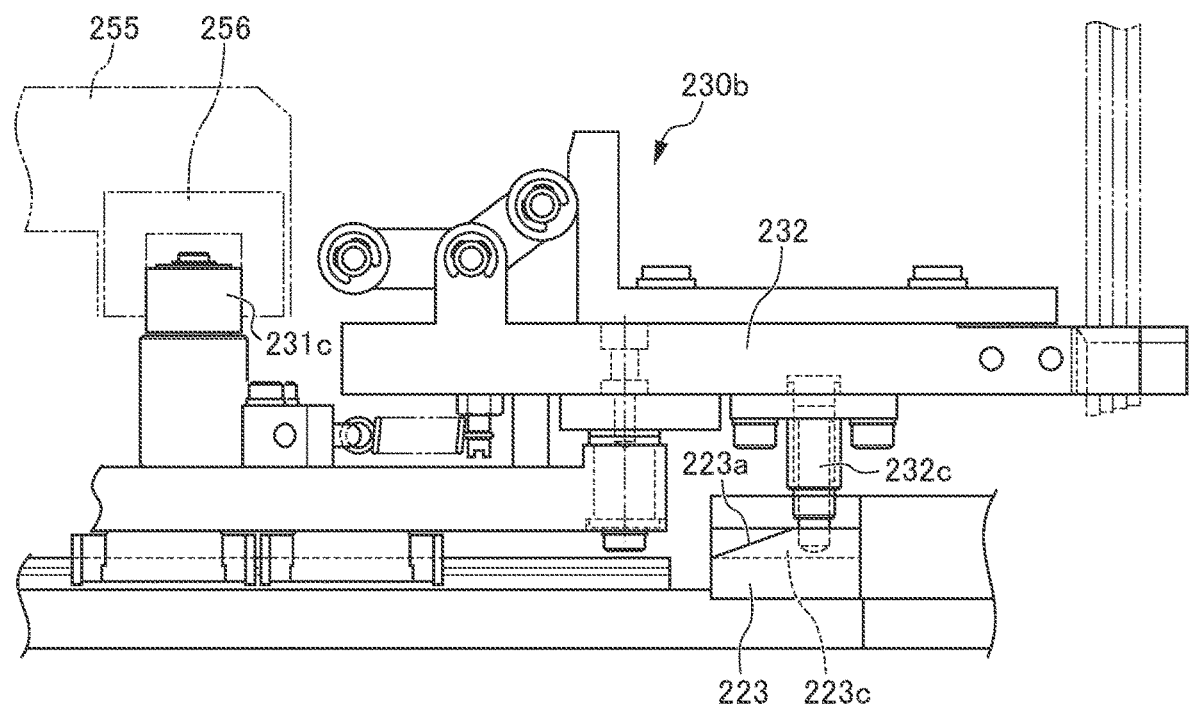

FIG. 24 is a view illustrating a state in which the upper branch portion 232 of the first gripping device 230a according to the embodiment is corrected to the left by 10° with respect to the center axis C1. FIG. 25 is a view illustrating a state in which the upper branch portion 232 of the second gripping device 230b according to the embodiment is corrected to the left by 10° with respect to the center axis C1. As illustrated in FIGS. 24 and 25, when the first gripping device 230a and the second gripping device 230b are further moved in the direction toward the center axis C1 while the pins 232c are guided by the correction grooves 223, the pins 232c are corrected to the left by 10° with respect to the center axis C1 by the restriction wall surfaces 223b and fall from the inclined surfaces 223a to the bottom surfaces 223c. Accordingly, the first gripping device 230a and the second gripping device 230b maintain the state in which the upper branch portions 232 are corrected to the left by 10° with respect to the center axis C1, and the gripped coil elements 40 are rotated by 10° with respect to the center axis C1 and are assembled. At this time, since the upper branch portions 232 and the main bodies 231 are in the state of being connected straightly along the radial direction, the adjacent gripping devices 230 can be assembled without interfering with each other.

FIG. 26 is a view illustrating a form in which the coil elements 40 according to the embodiment are rotated and one leg portion 41 of one coil element 40-1 and the other leg portion 44 of the other coil element 40-2 are aligned with each other. As described above, in each of the plurality of coil elements 40, by moving the plurality of coil elements 40 in a direction in which the diameter of the annular shape of the gripping devices 230 disposed in the annular shape decreases, the plurality of coil elements 40 are aligned in a state in which the turn portions 42 provided at the substantially vertex portions are alternately overlapped. At this time, as seen from the state before the rotation illustrated in FIG. 26(A) and the state after the rotation illustrated in FIG. 26(B), the gripping devices 230 are disposed in a state of being rotated to the left by 10° with respect to the center axis C1 about the rotating shaft 231e parallel to the center axis C1 of the annular shape. In addition, the other leg portion 44 of the other coil element 40-2 which is not held by the gripping device 230 enter a state of supported along the other claw 232g2, and one leg portion 41 of one coil element 40-1 gripped by the gripping device 230 and the other leg portion 44 of the other coil element 40-2 which is not gripped by the gripping device 230 enter a state of being aligned in substantially one row in the radial direction of the inner circumferential guide 342.

In addition, after the gripping device 230 is moved to a predetermined position (a position in the vicinity of the inner circumferential guide 342) which is an innermost position of the annular shape in which the gripping devices 230 are disposed, in a state in which the four coil rectangular wire rods constituting the other leg portion 44 of the other coil element 40-2 are suppressed from being moved in the circumferential direction of the inner circumferential guide 342 but are maintained in an overlapping state in the radial direction of the inner circumferential guide 342, the gripping device 230 is moved in the radially outward direction of the annular shape (to a position separated from the inner circumferential guide 342 by one coil rectangular wire rod) and is moved from the position to the innermost position again.

Figure 26A:
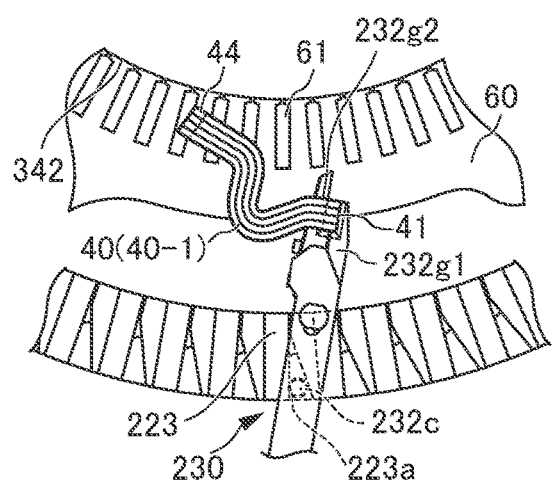
FIG. 26 is a view illustrating a form in which the coil elements according to the embodiment are rotated and one leg portion of one coil element and the other leg portion of the other coil element are aligned with each other.
Figure 26B:
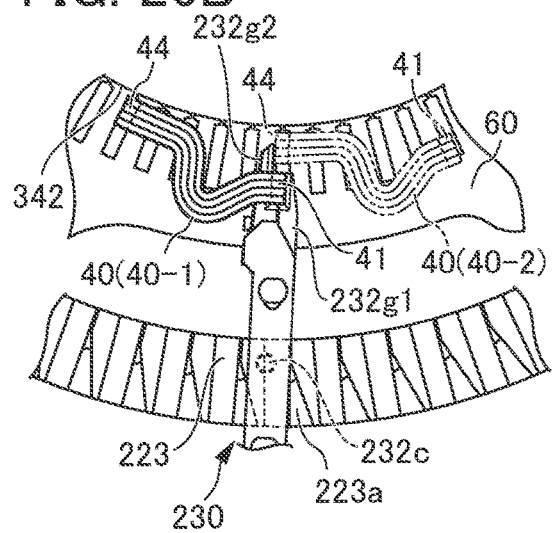
Figure 26C:
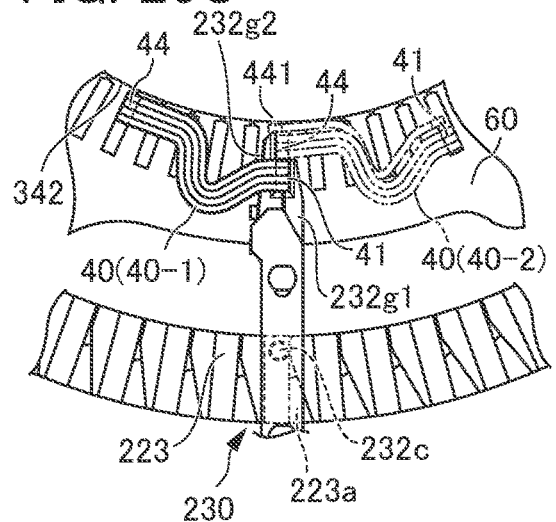

Specifically, as illustrated in FIG. 26(C), the gripping device 230 is moved radially inward to the vicinity of the inner circumferential guide 342. At this time, for example, one of the end portions of the four coil rectangular wire rods constituting the other leg portion 44 of the coil element 40 does not enter the state of being aligned in one row in the radial direction of the inner circumferential guide 342 but is pinched between the inner circumferential guide 342 and the distal end portion of the movable claw 232g2.

Figure 26D:
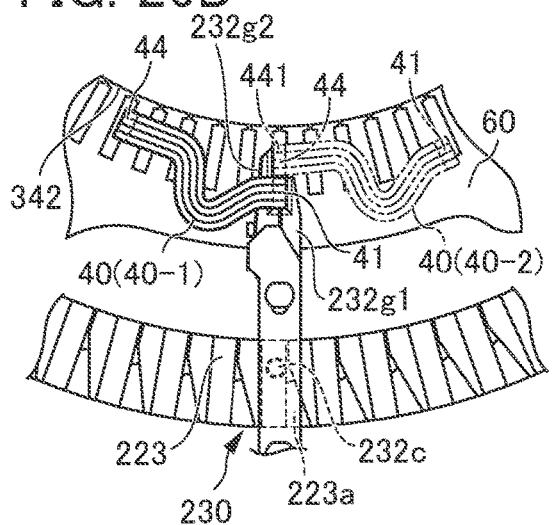

At this time, the stator manufacturing apparatus 1 causes the plate 255 attached to the slide rail 254 to be moved by the thickness of one coil rectangular wire rod in the radially outward direction of the inner circumferential guide 342 by further driving the servomotors 253 of the four driving mechanisms 250. Accordingly, as illustrated in FIG. 26(D), one of the end portions of the four coil rectangular wire rods constituting the other leg portion 44 of the coil element 40, which is pinched between the inner circumferential guide 342 and the distal end portion of the movable claw 232g2, is aligned on a straight line with the other three by the spring back force generated by being pressed against the radially inward side of the inner circumferential guide 342. Thereafter, as illustrated in FIG. 26(E), the gripping device 230 is moved radially inward to the vicinity of the inner circumferential guide 342, so that one leg portion 41 of one coil element 40-1 and the other leg portion 44 of the other coil element 40-2 enter a state of being aligned in the radial direction of the inner circumferential guide 342.

Figure 26E:
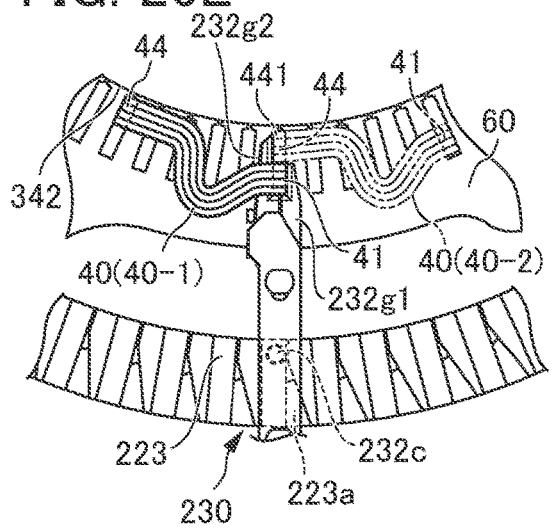

In the states illustrated in FIGS. 26(C) to 26(E), in the state in which the pin 232c is guided by the correction groove 223, the gripping device 230 moves in the radial direction of the inner circumferential guide 342, so that the coil element 40 and the gripping device 230 gripping the coil element 40 are maintained in a state of not rotating in the radial direction of the inner circumferential guide 342.

Figure 27A:
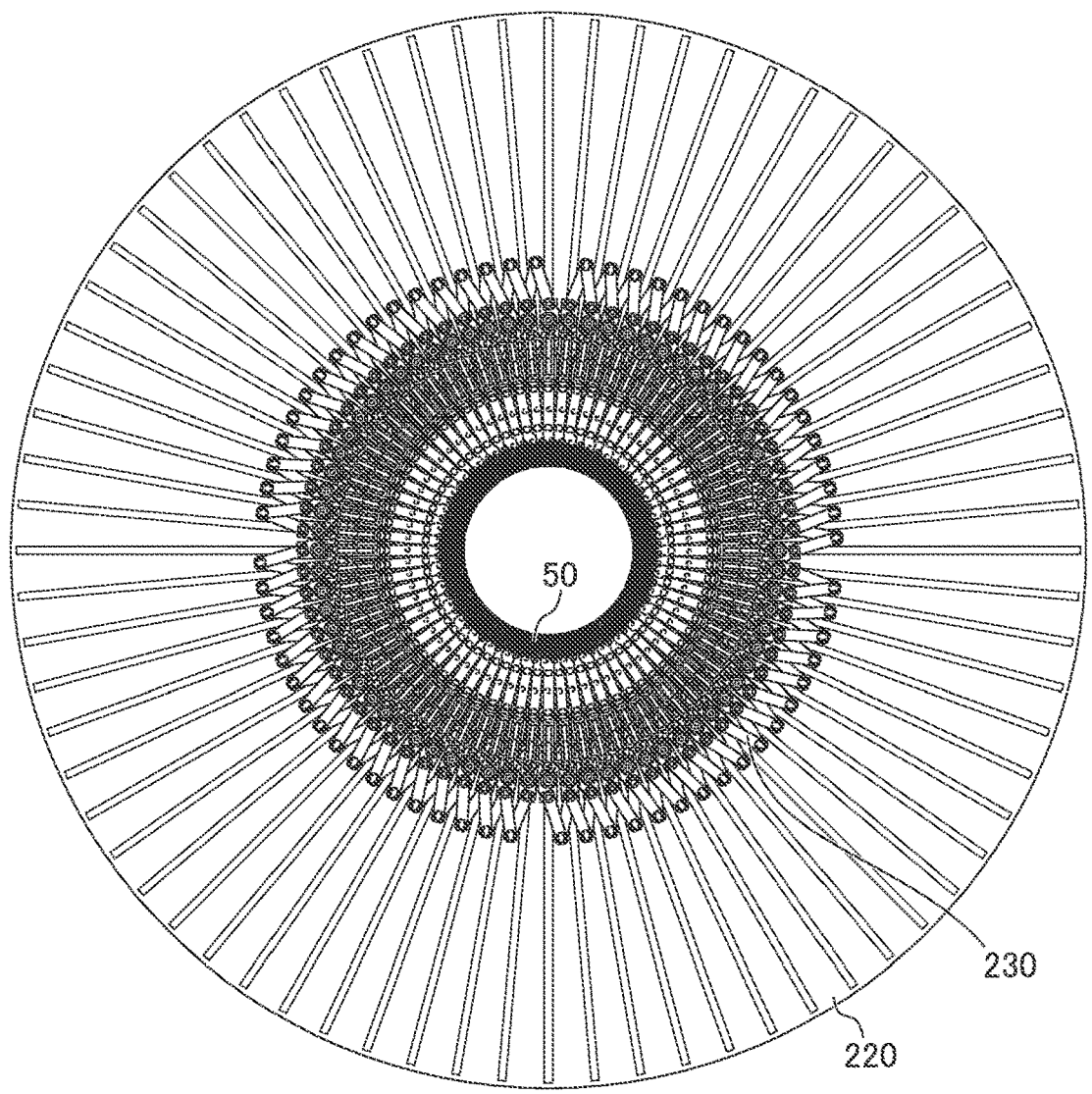
FIG. 27 is a view illustrating a state in which the assembly according to the embodiment is formed.
Figure 27B:
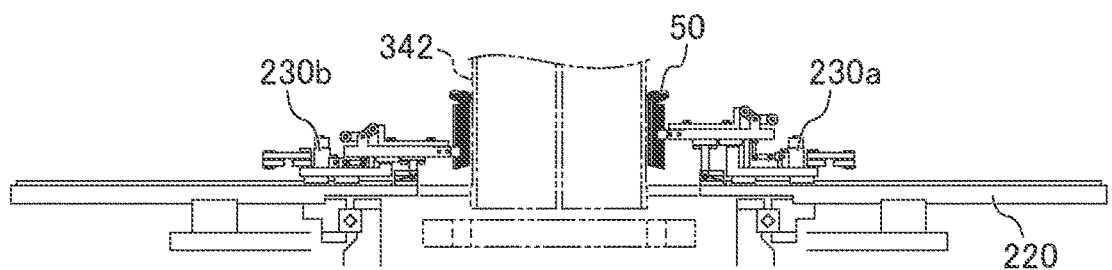

FIG. 27 is a view illustrating a state in which the assembly 50 according to the embodiment is formed. As illustrated in FIG. 27, the assembly 50 which has an annular shape in which the turn portions 42 in the plurality of coil elements 40 are in a state of being alternately overlapped and abuts the inner circumferential guide 342 on the radially inward side is formed.

<Coil Element Inserting Step>

Figure 28:
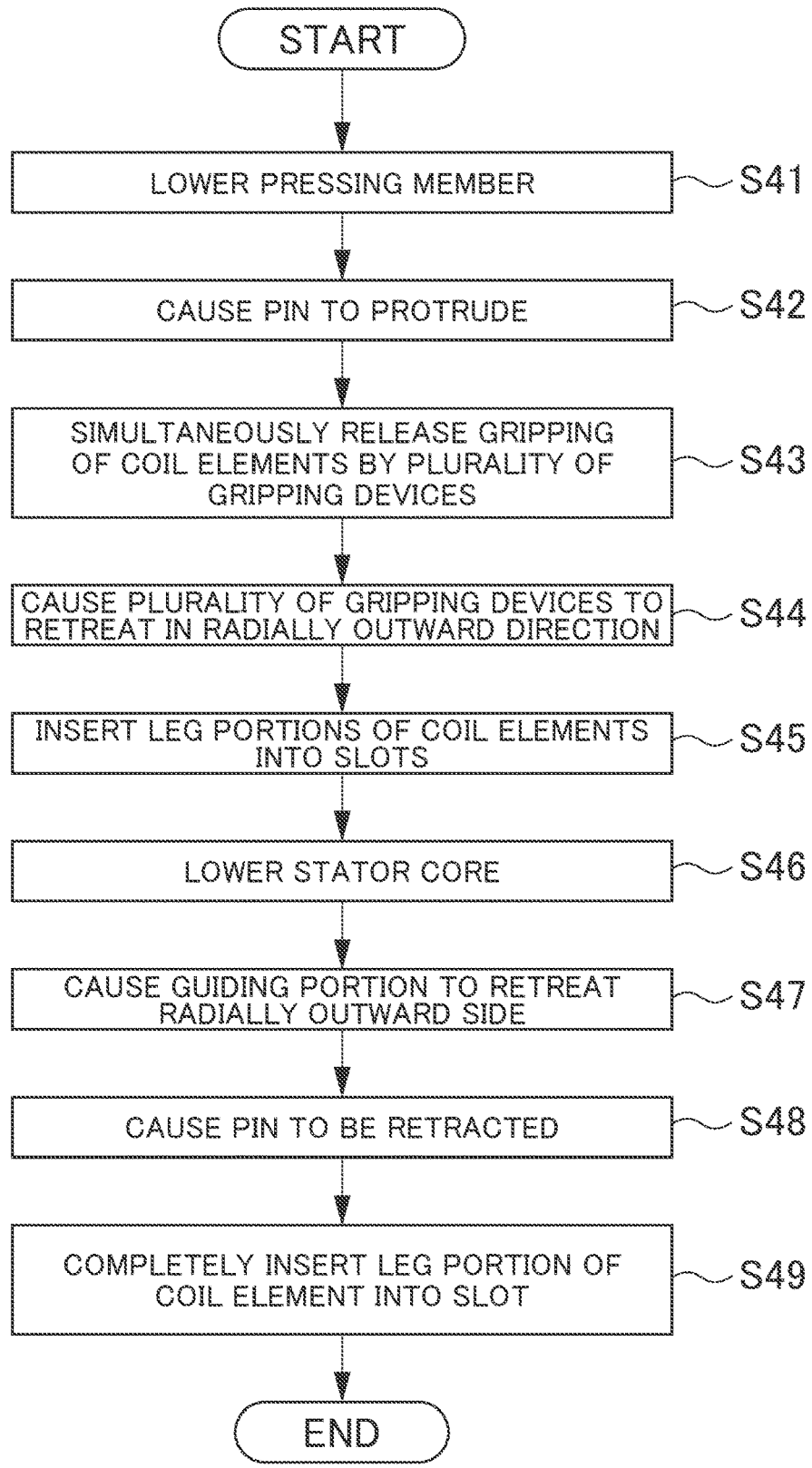
FIG. 28 is a flowchart illustrating operations of the coil element inserting step according to the embodiment.

In the coil element inserting step S4, the leg portions 41 of the coil elements 40 in the assembly 50 are each inserted into the slots 61 of the stator core 60. FIG. 28 is a flowchart illustrating the operations of the coil element inserting step S4 according to the embodiment.

Figure 29:
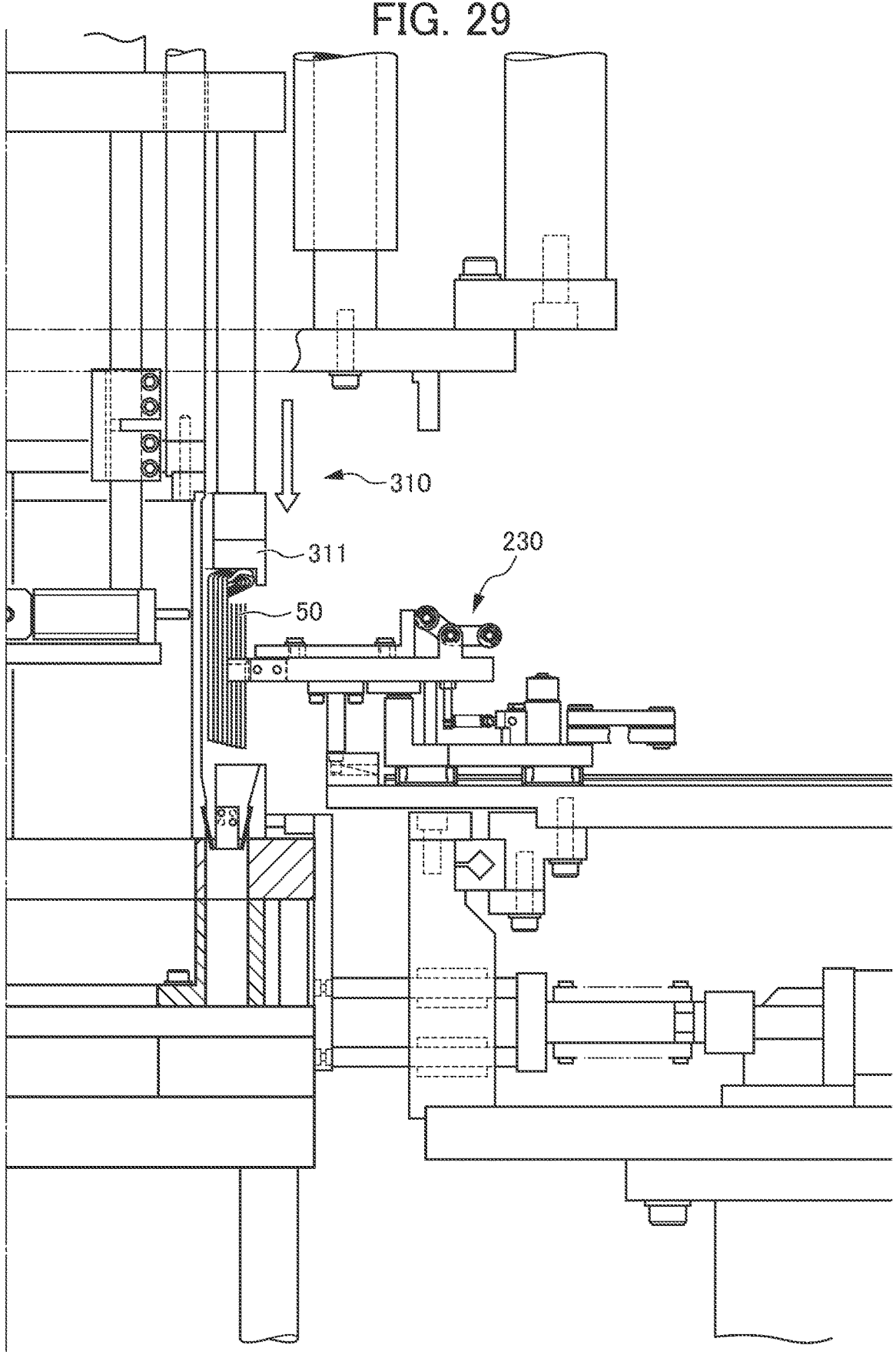
FIG. 29 is a view illustrating a state in which a pressing member according to the embodiment is lowered.

FIG. 29 is a view illustrating a state in which the pressing member 311 according to the embodiment is lowered. As illustrated in FIG. 29, in Step S41, the stator manufacturing apparatus 1 causes the lower surface of the pressing member 311 to abut the assembly 50 by lowering the pressing member 311 of the coil element pressing mechanism 310 by driving the piston of the coil element pressing mechanism cylinder mechanism 350.

Figure 30:
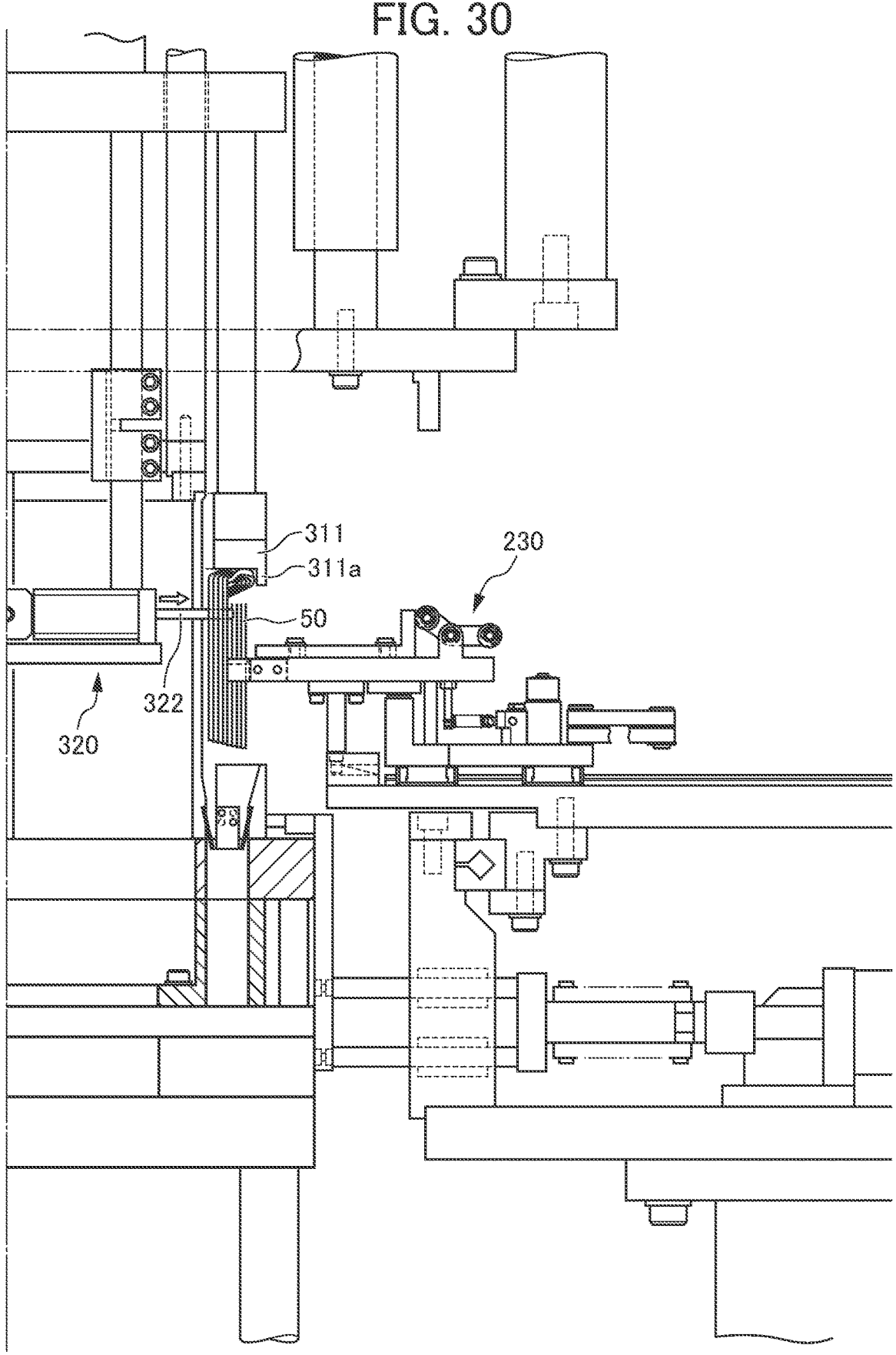
FIG. 30 is a view illustrating a state in which a pin according to the embodiment is caused to protrude.

FIG. 30 is a view illustrating a state in which the pin 322 according to the embodiment is caused to protrude. As illustrated in FIG. 30, in Step S42, the stator manufacturing apparatus 1 causes the pin 322 of the pin protruding mechanism 320 to protrude when the lower surface of the lowered pressing member 311 abuts the assembly 50. Accordingly, the four pins 322 protrude in the radially outward direction and abut the lower side of the turn portions 42 of predetermined coil elements 40 in the assembly 50, and the turn portions 42 are pinched between the pins 322 and the pressing members 311 and are supported from below using the shape of the turn portions 42, whereby the assembly 50 is supported. In addition, since the assembly 50 is supported by supporting the turn portions 42 from below, the leg portion 41 of each of the coil elements 40 of the assembly 50 enters a free state. In a case where the lower surface of the lowered pressing member 311 abuts the assembly 50, by causing the pins 322 of the pin protruding mechanism 320 to protrude, the pins 322 protrude at an optimal timing to abut the lower side of the turn portions 42 of the predetermined coil elements 40 in the assembly 50.

At this time, by causing the lower surface of the lowered pressing member 311 to abut the assembly 50, the annular protrusion 311a of the lower surface of the pressing member 311 guides the outer circumferential side of the turn portion 42 of each of the coil elements 40 of the assembly 50 from the radially outward side. As described above, in a case where the four pins 322 protrude in the radially outward direction, since the annular protrusion 311a of the lower surface of the pressing member 311 is in the state of guiding the turn portion 42 of each of the coil elements 40 in the assembly 50 from the radially outward side, even when the protruding pins 322 press the assembly 50 against the radially outward side, the shape of the assembly 50 can be maintained.

Figure 31:
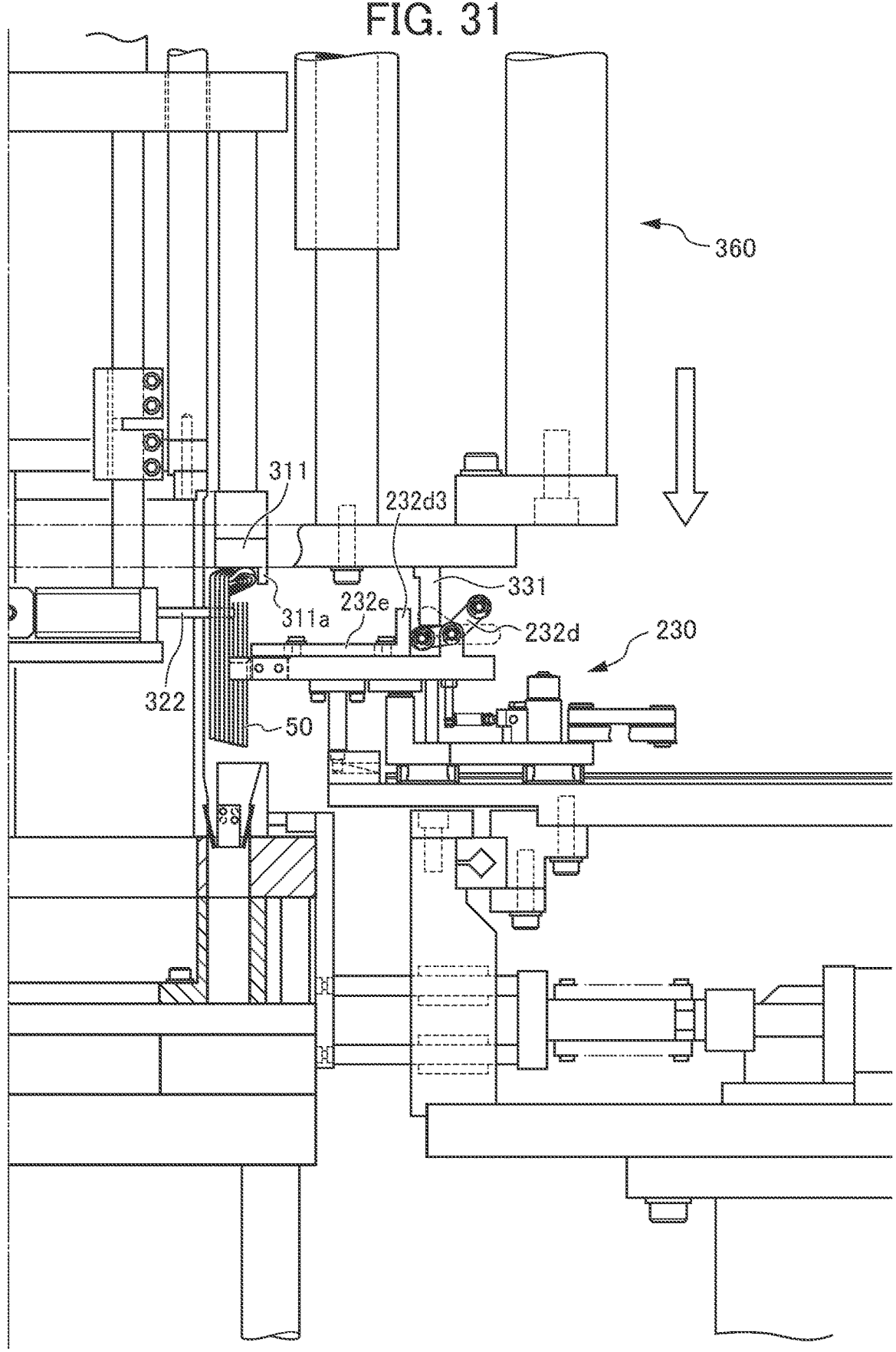
FIG. 31 is a view illustrating a state in which gripping of the coil elements by the plurality of gripping devices according to the embodiment is simultaneously released.

FIG. 31 is a view illustrating a state in which the gripping of the coil elements 40 by the plurality of gripping devices 230 according to the embodiment is simultaneously released. As illustrated in FIG. 31, in Step S43, the stator manufacturing apparatus 1 causes the distal end portions 232d3 of the levers 232d of the plurality of gripping devices 230 to be simultaneously pressed by the plurality of pressing pins 331 of the lever pressing mechanism 330 by driving the pistons of the two lever pressing mechanism cylinder mechanisms 360 and lowering the plurality of pressing pins 331. Accordingly, the plurality of gripping devices 230 simultaneously release the gripping of the coil elements 40. More specifically, when the distal end portions 232d3 of the levers 232d of the plurality of gripping devices 230 are simultaneously pressed by the plurality of pressing pins 331, the distal end portions 232d3 of the levers 232d are lowered such that the L-shaped member 232e is moved toward the distal end side against the spring 232f. Accordingly, the long hole 232h of the L-shaped member 232e is moved toward the distal end side such that the protrusion 232i of the movable claw 232g2 is disposed on the distal end side toward the left of the long hole 232h with respect to the center axis C1. In addition, the movable claw 232g2 is pressed against the right wall surface of the long hole 232h such that the chuck mechanism of the pair of claws 232g1 and 232g2 enters a releasing state to release one leg portion 41 of the coil element 40. After the plurality of pressing pins 331 simultaneously press the distal end portions 232d3 of the levers 232d of the plurality of gripping devices 230, the stator manufacturing apparatus 1 causes the plurality of pressing pins 331 of the lever pressing mechanism 330 to be lifted by driving the pistons of the two lever pressing mechanism cylinder mechanisms 360. When the plurality of pressing pins 331 are lifted, the plurality of gripping devices 230 are fixed to the short pieces 232e2 of the L-shaped members 232e in a state in which the lever 232d causes the distal end side 232d3 to be lowered lower than the center portion 232d1, the chuck mechanism is maintained in the releasing state. In addition, the turn portion 42 of each of the coil elements 40 in the assembly 50 is guided by an annular protrusion 331a of the lower surface of the pressing pin 331, and the assembly 50 is guided by the four pins 322.

Figure 32:
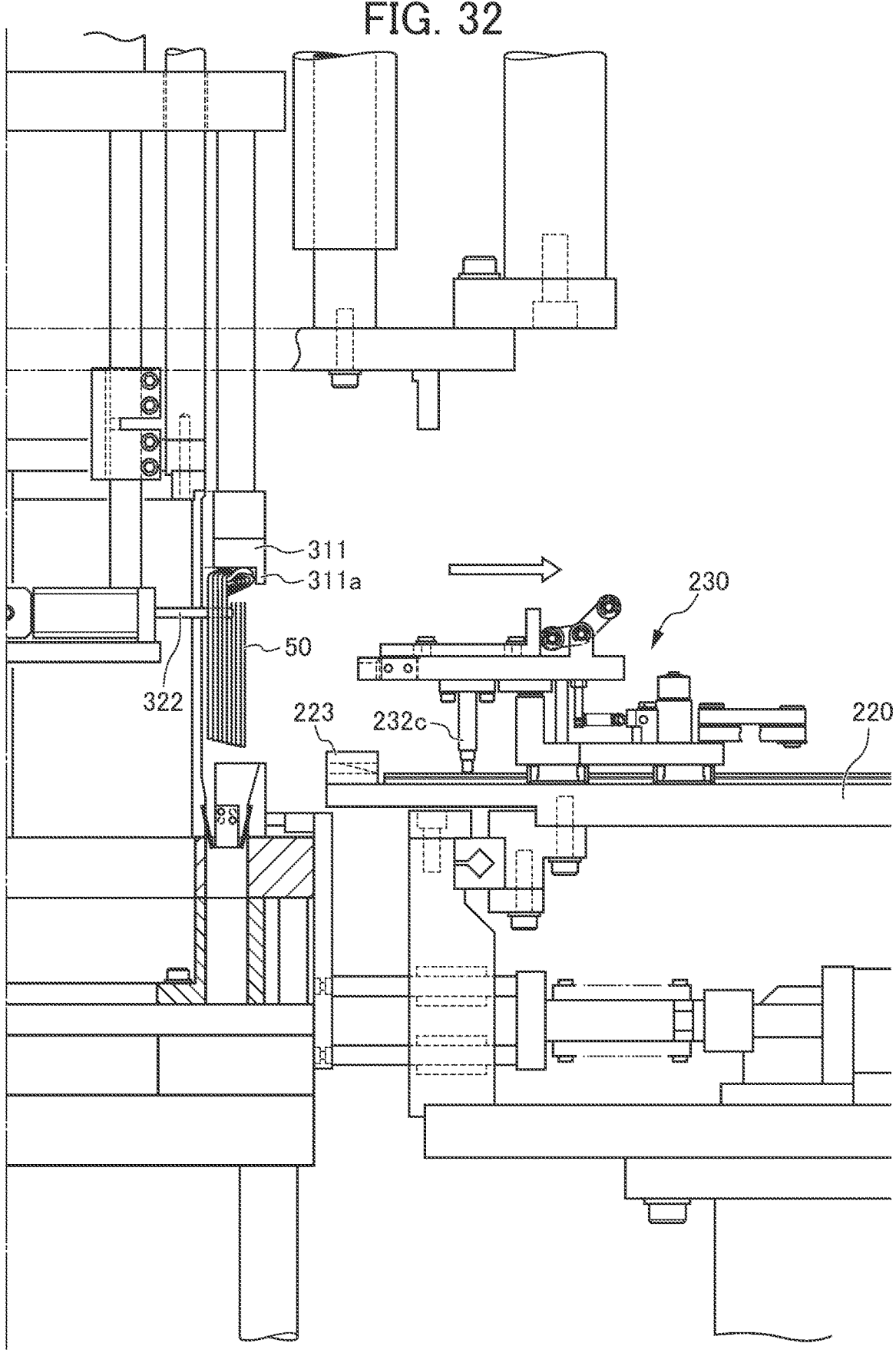
FIG. 32 is a view illustrating a state in which the plurality of gripping devices according to the embodiment are caused to retreat in the radially outward direction.

FIG. 32 is a view illustrating a state in which the plurality of gripping devices 230 according to the embodiment are caused to retreat in the radially outward direction. As illustrated in FIG. 32, in Step S44, the stator manufacturing apparatus 1 applies the driving force to the plurality of gripping devices 230 to cause the plurality of gripping devices 230 to retreat in the radially outward direction and be disassembled, by moving the plates 255 attached to the slide rails 254 in the radially outward direction by driving the servomotors 253 of the four driving mechanisms 250. At this time, the pins 232c of the plurality of gripping devices 230 are disposed on the bottom surface 223c of the correction grooves 223 and come out of the correction grooves 223 in the radially outward direction from the state of being corrected to the side walls of the inclined surfaces 223a, the upper branch portions 232 return to a state of being inclined toward the right with respect to the center axis C1 with respect to the main bodies 231 by the biasing force of the spring 233. As described above, by causing the plurality of gripping devices 230 to retreat in the radially outward direction while maintaining the state corrected by the correction grooves 223 partway, interference between the adjacent gripping devices 230 does not occur when the plurality of gripping devices 230 which are assembled retreat in the radially outward direction.

Figure 33:
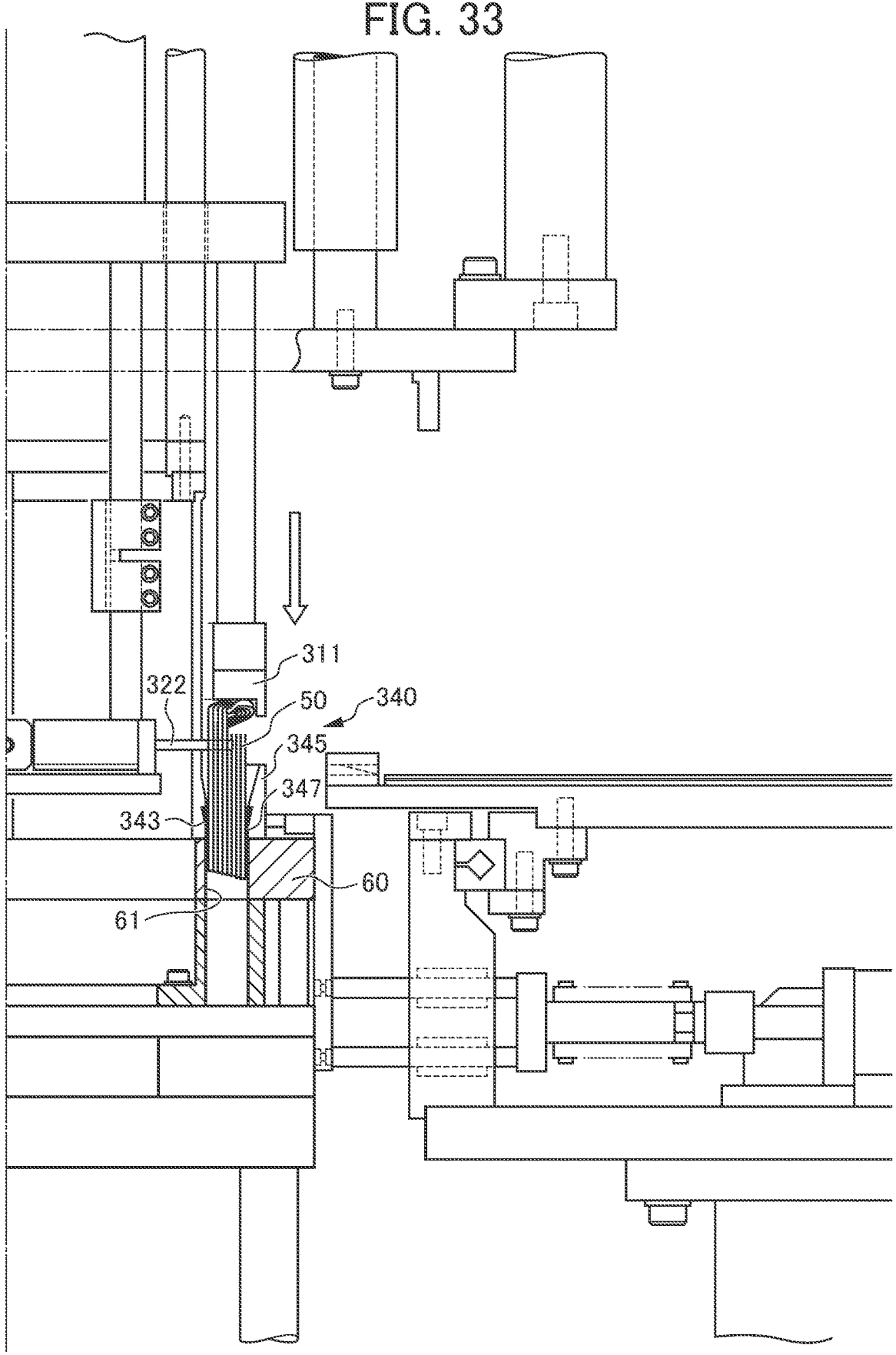
FIG. 33 is a view illustrating a state in which the leg portions of the coil elements in the assembly according to the embodiment are each inserted into slots of a stator core.

FIG. 33 is a view illustrating a state in which the leg portions 41 of the coil elements 40 in the assembly 50 according to the embodiment are each inserted into the slots 61 of the stator core 60. As illustrated in FIG. 33, in Step S45, the stator manufacturing apparatus 1 causes assembly 50 to be lowered by the pressing member 311 being lowered, whereby the leg portion 41 of each of the coil elements 40 in the assembly 50 is guided by the guide plate 343, the pair of first expansion plates 346, and the second expansion plate 347 and is inserted into the slot 61 of the stator core 60. That is, the lower end portions of the guide plate 343, the pair of first expansion plates 346, and the second expansion plate 347 are in a state of being already inserted into the slots 61 of the stator core 60 installed in the stator core installing step S1, in which the insulation paper 62 is disposed. In addition, when the assembly 50 is lowered by the pressing member 311 being lowered, the leg portion 41 of each of the coil elements 40 in the assembly 50 is guided by the guide plate 343, the pair of first expansion plates 346, and the second expansion plate 347. Accordingly, the leg portions 41 of the coil elements 40 in the assembly 50 do not cause the insulation paper 62 to be wound but are each inserted into the slots 61 of the stator core 60.

FIG. 34 is a view for explaining the operations of the guide plate 343, the pair of first expansion plates 346, and the second expansion plate 347 according to the embodiment, and is view when the guiding portion 345 is viewed in the radially inward direction. As illustrated in FIG. 34(A), since the guiding portion 345 has the tapered structure 345a which expands in a direction opposite to the insertion direction, even when the position of the leg portion 41 of the coil element 40 is slightly shifted from the position of the guiding portion 345, the leg portion 41 of the coil element 40 is reliably guided to be positioned between the guide plate 343, the pair of first expansion plates 346, and the second expansion plate 347. Next, as illustrated in FIG. 34(B), the leg portion 41 of the coil element 40 is inserted between the guide plate 343, the pair of first expansion plates 346, and the second expansion plate 347. Next, as illustrated in FIG. 34(C), when the leg portion 41 of the coil element 40 is inserted to reach the lower ends of the guide plate 343, the pair of first expansion plates 346, and the second expansion plate 347, the lower end sides of the guide plate 343, the pair of first expansion plates 346, and the second expansion plate 347 expand. Accordingly, the space between the end portions of the insulation paper 62 expands, and in this state, the leg portion 41 of the coil element 40 is inserted into the slot 61.

FIG. 35 is a view for explaining the operations of the guide plate 343, the pair of first expansion plates 346, and the second expansion plate 347 according to the embodiment, and is a plan view of the vicinity of the slot 61. As illustrated in FIG. 35(A), the insulation paper 62 is disposed in the slot 61 in advance. In addition, as illustrated in FIG. 35(B), when the guiding portions 345 are assembled at the time when a preceding stator manufacturing is ended, the guiding portions 345 are disposed on the slots 61. At this time, the interval between the lower end sides of the guide plate 343, the pair of first expansion plates 346, and the second expansion plate 347 is narrow. Next, as illustrated in FIG. 35(C), when the leg portion 41 of the coil element 40 is guided by the guiding portion 345 and is inserted between the guide plate 343, the pair of first expansion plates 346, and the second expansion plate 347, the lower end sides of the guide plate 343, the pair of first expansion plates 346, and the second expansion plate 347 expand, so that the space between the end portions of the insulation paper 62 expands. In the manner described above, the space between the end portions of the insulation paper 62 expands, and the leg portion 41 of the coil element 40 is reliably inserted into the slot 61.

Here, as illustrated in FIG. 33, when the leg portions 41 of the coil elements 40 in the assembly 50 are each inserted to the slots 61 of the stator core 60, the annular protrusion 311a of the lower surface of the pressing member 311 guides the outer circumferential portion of the turn portion 42 of each of the coil elements 40 of the assembly 50 from the radially outward side. As described above, since the annular protrusion 311a of the lower surface of the pressing member 311 inserts the leg portion 41 of the coil element 40 of the assembly 50 to be inserted into the slot 61 of the stator core 60 while guiding the outer circumferential side of the turn portion 42 of each of the coil elements 40 of the assembly 50 from the radially outward side, even when resistance is generated at the time of insertion when the lower end sides of the guide plate 343, the pair of first expansion plates 346, and the second expansion plate 347, the shape of the assembly 50 can be maintained.

Figure 36:
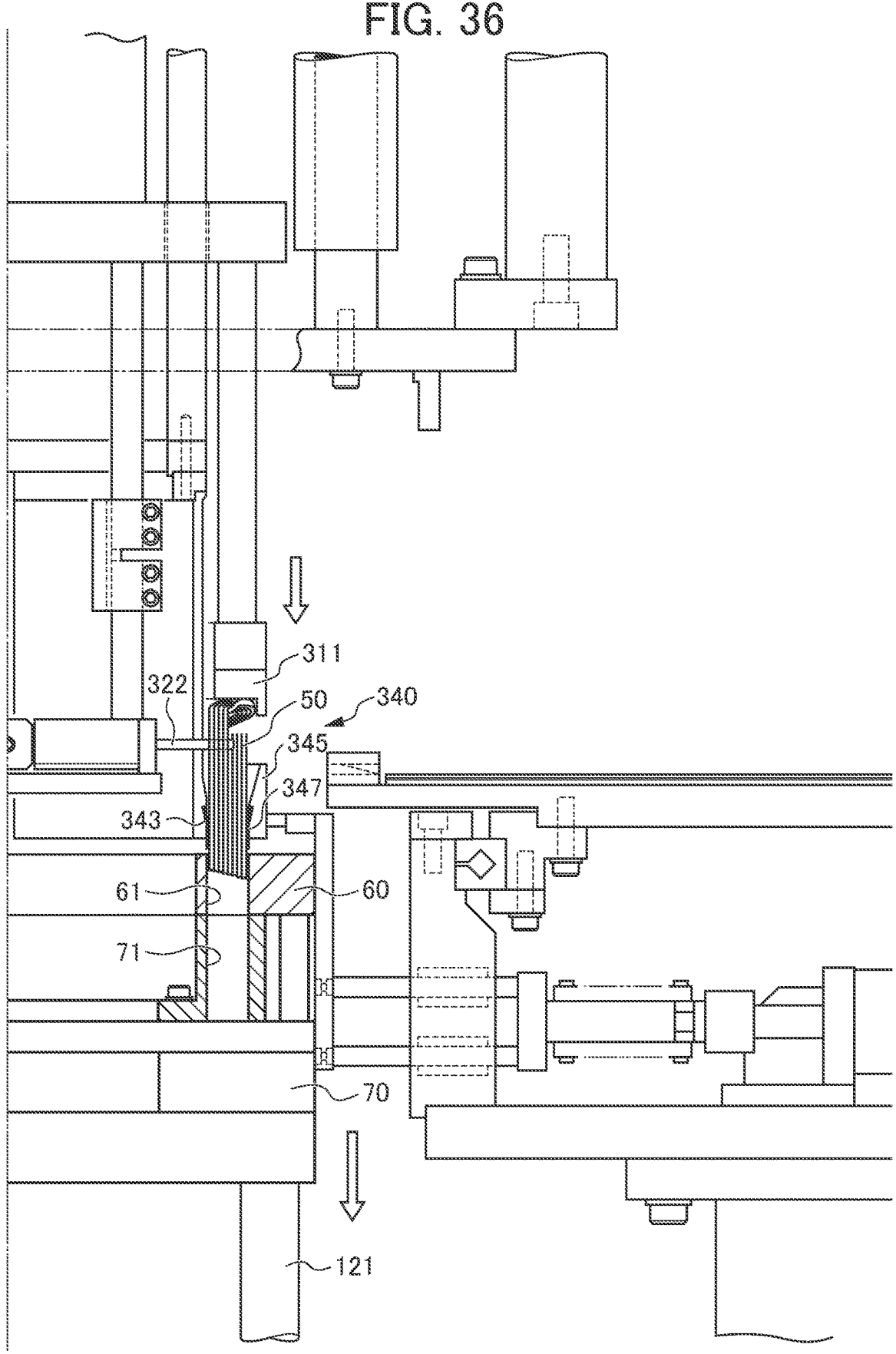
FIG. 36 is a view illustrating a state in which the stator core according to the embodiment is lowered.

FIG. 36 is a view illustrating a state in which the stator core 60 according to the embodiment is lowered. As illustrated in FIG. 36, in Step S46, the stator manufacturing apparatus 1 lowers the stator core 60 having the leg portions 41 each inserted into the slots 61 by lowering the assembly 50 using the pressing member 311 while lowering the four rods 121 of the elevating mechanism 120. Accordingly, the lower end portions of the guide plate 343, the pair of first expansion plates 346, and the second expansion plate 347 come out of the stator core 60 and are exposed.

Figure 37:
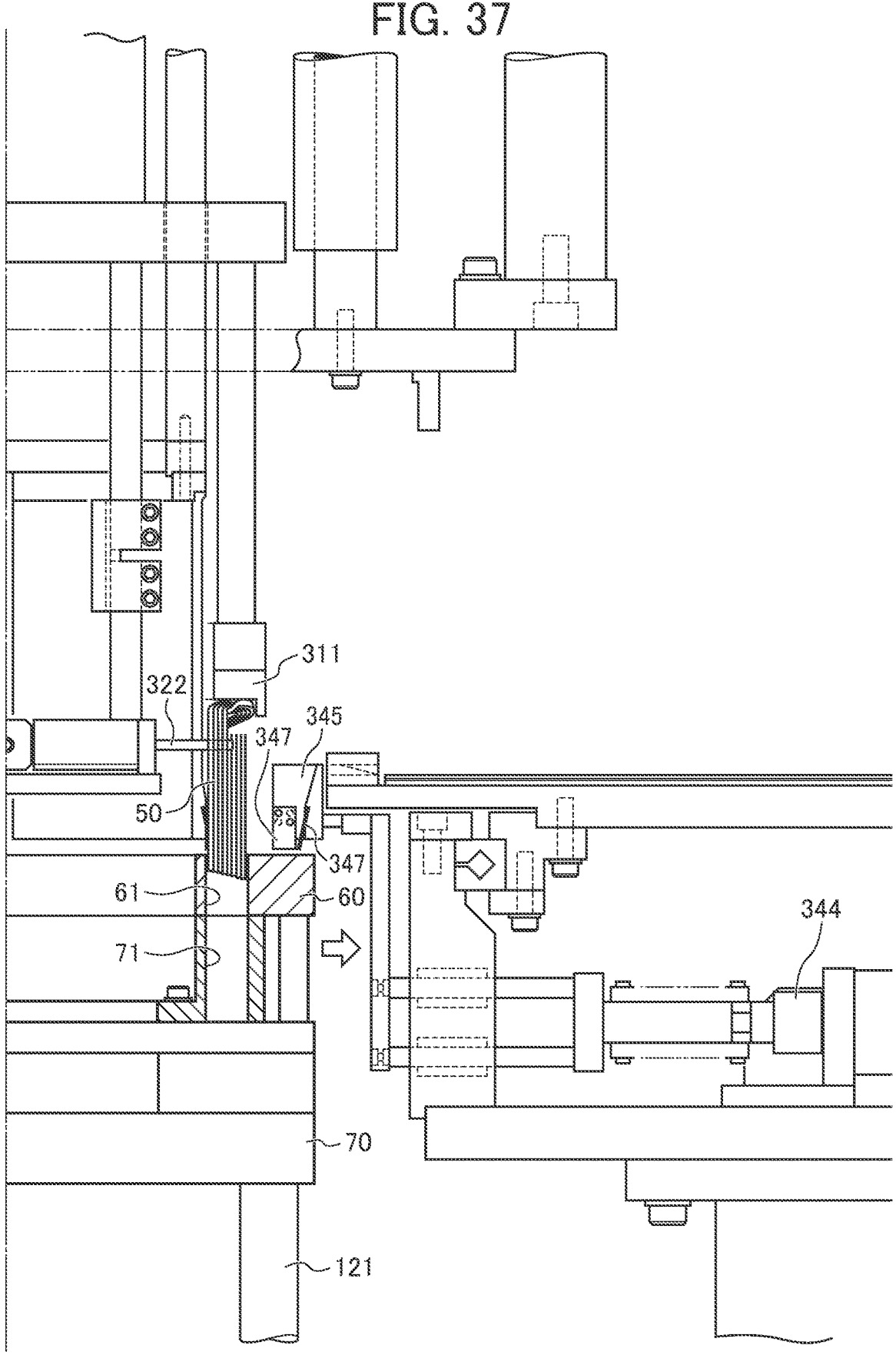
FIG. 37 is a view illustrating a state in which a guiding portion according to the embodiment is caused to retreat toward a radially outward side.

FIG. 37 is a view illustrating a state in which the guiding portion 345 according to the embodiment is caused to retreat toward the radially outward side. As illustrated in FIG. 37, in Step S47, when the lower end portions of the guide plate 343, the pair of first expansion plates 346, and the second expansion plate 347 come out of the stator core 60 and are exposed, the stator manufacturing apparatus 1 causes the guiding portion 345 to slide in the radially outward direction by driving the piston of the cylinder mechanism so as to cause the guiding portion 345 to retreat toward the radially outward side from a lowering trace range of the assembly 50.

Figure 38:
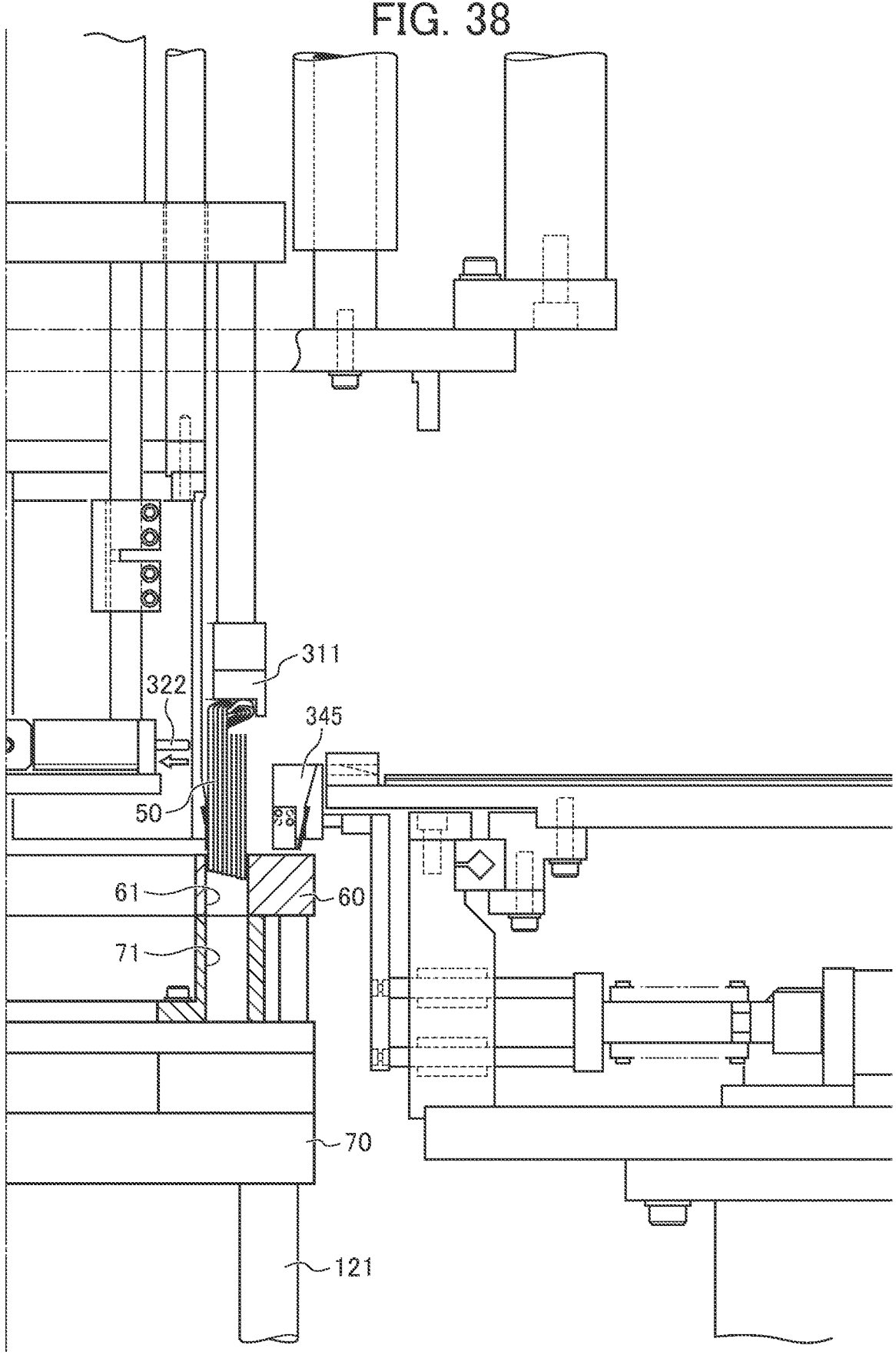
FIG. 38 is a view illustrating a state in which the pins according to the embodiment are retracted in a radially inward direction.

FIG. 38 is a view illustrating a state in which the pins 322 according to the embodiment are retracted in the radially inward direction. As illustrated in FIG. 38, in Step S48, the stator manufacturing apparatus 1 causes the pins 322 which protrude to support the assembly 50 to be retracted in the radially inward direction. Accordingly, regarding the assembly 50, while the turn portion 42 of each of the coil elements 40 in the assembly 50 is guided from the radially outward side by the annular protrusion 311a of the lower surface of the pressing member 311, the leg portions 41 enter the state of being each inserted into the slots 61 of the stator core 60.

Figure 39:
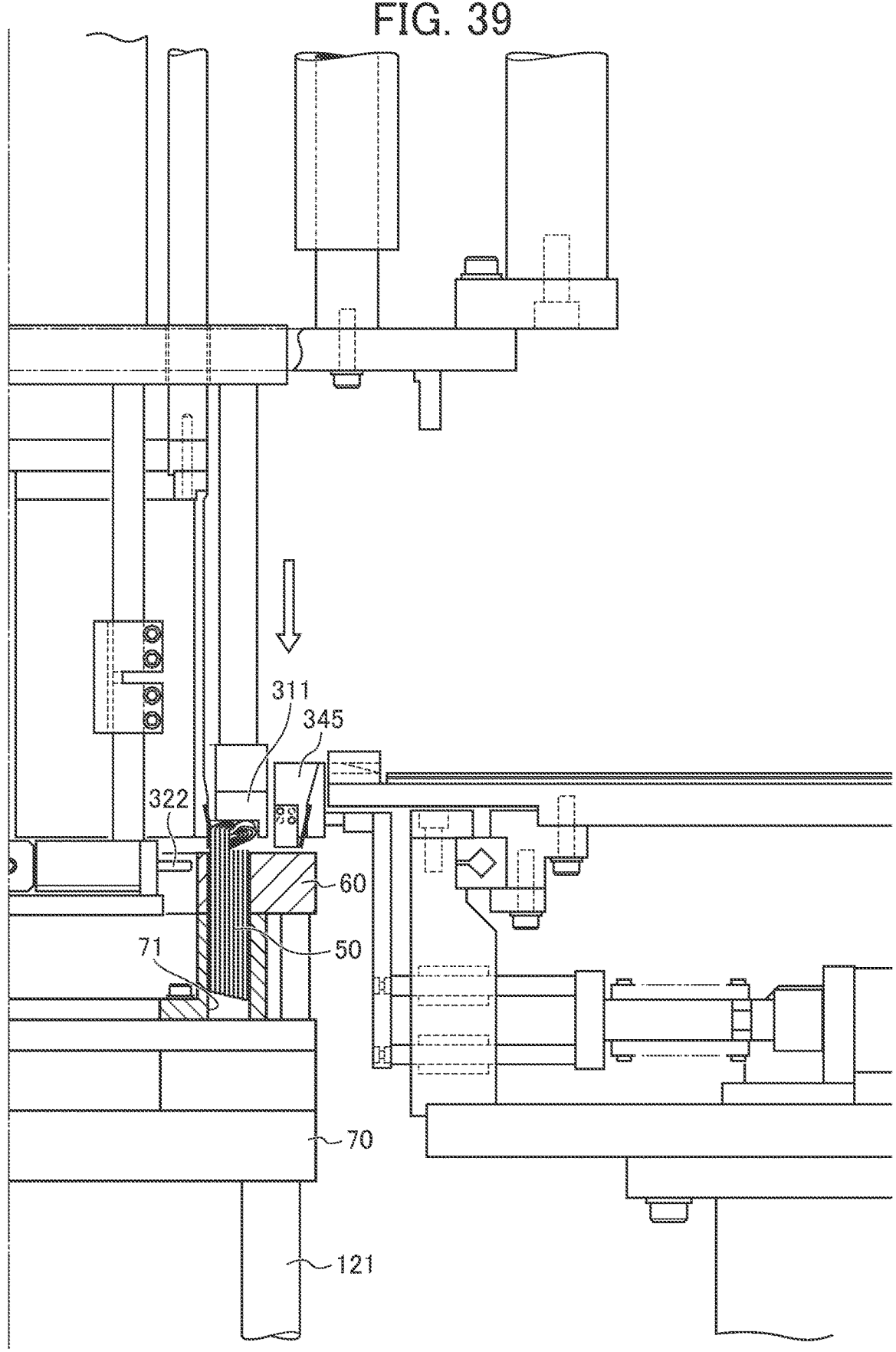
FIG. 39 is a view illustrating a state in which the leg portions of the coil elements in the assembly according to the embodiment are each completely inserted into the slots of the stator core.

FIG. 39 is a view illustrating a state in which the leg portions 41 of the coil elements 40 in the assembly 50 according to the embodiment are each, completely inserted into the slots 61 of the stator core 60. As illustrated in FIG. 39, in Step S49, the stator manufacturing apparatus 1 completely inserts the leg portions 41 of the coil elements 40 in the assembly 50 into the slots 61 of the stator core 60 by lowering the assembly 50 using the pressing member 311 being lowered while fixing the four rods 121 of the elevating mechanism 120. At this time, the pressing member 311 lowers the radially inward side of the guiding portion 345 retreated in the radially outward direction.

As described above, the stator in which the leg portions 41 of the plurality of coil elements 40 are each inserted into the slots 61 of the stator core 60 is manufactured.

Thereafter, the stator manufacturing apparatus 1 places the jig 70 to which the stator core 60 is fixed, on the transporting table 112 by lowering the four rods 121 of the elevating mechanism 120 which pushes upward the jig 70 to which the stator core 60 is fixed. Furthermore, the transporting table 112 on which the jig 70 having the stator core 60 fixed thereto is placed is moved from the center to the front left side end portion of the stator manufacturing apparatus 1. Last, the operator takes out, from the stator manufacturing apparatus 1, the jig 70 having the stator core 60 fixed thereto, which is placed on the transporting table 112 that has reached the front left side end portion of the stator manufacturing apparatus 1. In addition, after transporting the transporting table 112 on which the jig 70 having the stator core 60 fixed thereto is placed to the front left side end portion of the stator manufacturing apparatus 1, the stator manufacturing apparatus 1 causes the guiding portion 345 to slide in the radially inward direction so as to advance radially inward to the position where the arcuate guide 348 does not abut the outer circumference of the stator core 60 yet by driving the piston of the cylinder mechanism, and makes the lower end portions of the pair of first expansion plates 346 and the second expansion plate 347 wait to be inserted into the slots 61 of the next stator core 60.

According to the stator manufacturing apparatus 1 of the embodiment, the following effects are exhibited.

(1) The alignment method of the electrical conductors in which the coil elements 40 as the plurality of substantially U-shaped electrical conductors are overlapped and are aligned in the annular shape, includes: an arranging step of disposing the coil elements 40 in an annular shape at intervals at which the coil element 40 do not overlap in the circumferential direction of the annular shape by causing the plurality of gripping devices 230 disposed in the annular shape to each grip one leg portion 41 of each of the coil elements 40; and an aligning step of aligning the plurality of coil elements 40 in the annular shape while overlapping the coil elements 40 in the circumferential direction of the annular shape by moving the gripping devices 230 in the radially inward direction of the annular shape. The gripping device 230 has a pair of claws 232g1 and 232g2 capable of pinching the leg portions 41 of the substantially U-shaped coil elements 40 one by one, one claw 232g1 has a length capable of gripping one leg portion 41, and the other claw 232g2 has a length capable of gripping one leg portion 41 of one coil element 40-1 and gripping the other leg portion 44 of the other coil element 40-2.

Accordingly, since the other claw 232g2 is longer than one claw 232g1, when the gripping devices 230 disposed in the annular shape are moved inward in the radial direction of the annular shape, the other leg portion 44 of the other coil element 40-2 which is not gripped by the gripping device 230 is able to follow a long portion of the other claw 232g2. Accordingly, it becomes possible to align the other leg portion 44 of the other coil element 40-2 along the other claw 232g2 with the other leg portion 41 of one coil element 40-1, and when the gripping devices 230 are moved to predetermined positions inside the annular shape (positions in the vicinity of the inner circumferential guide 342), the leg portions 41 and the other leg portions 44 can be aligned in the straight line.

(2) In the aligning step, after moving the gripping devices 230 to predetermined positions inside the annular shape, while the plurality of coil elements 40 of overlapping so as not to be moved in the circumferential direction of the annular shape, the gripping devices 230 are moved outward in the radial direction of the annular shape, and are moved from the positions to the predetermined positions inside the annular shape again.

When the gripping devices 230 are moved inward in the radial direction of the annular shape, there may be cases where the coil elements 40 may be pinched between the inner circumferential guide 342 and the claw 232g2 of the gripping device 230 and the other leg portion 44 of the coil element 40 is not aligned. When the gripping device 230 is caused to further retreat after the diameter of the annular shape is further decreased, the pinched coil rectangular wire rod inclined in the coil element 40 returns to a correct position due to the spring back force. By assembling the gripping devices 230 toward the inside in the radial direction again in this state, the other leg portions 44 of the coil elements 40 can be aligned.

(3) The alignment device of the electrical conductors in which the coil elements 40 as the plurality of substantially U-shaped electrical conductors are overlapped and aligned in an annular shape, includes: a plurality of gripping devices 230 which are provided in an annular shape and each hold one leg portion 41 of each of the coil elements 40; and a moving portion (the driving mechanism 250 and the like) which moves the plurality of gripping devices 230 in a radial direction of the annular shape. The gripping device 230 has a pair of claws 232g1 and 232g2 capable of pinching the leg portions 41 of the substantially U-shaped coil elements 40 one by one, one claw 232g1 has a length capable of gripping one leg portion 41, and the other claw 232g2 has a length capable of gripping one leg portion 41 of one coil element 40-1 and gripping the other leg portion 44 of the other coil element 40-2.

Accordingly, since the other claw 232g2 is longer than one claw 232g1, when the gripping devices 230 disposed in the annular shape are moved inward in the radial direction of the annular shape, the other leg portion 44 of the other coil element 40-2 which is not gripped by the gripping device 230 is able to follow a long portion of the other claw 232g2. Accordingly, it becomes possible to align the other leg portion 44 of the other coil element 40-2 along the other claw 232g2 with the other leg portion 41 of one coil element 40-1, and when the gripping devices 230 are moved to predetermined positions inside the annular shape (positions in the vicinity of the inner circumferential guide 342), the leg portions 41 and the other leg portions 44 can be aligned in the straight line.

The present invention is not limited to the above-described embodiments, and modifications and improvements within the scope in which the object of the present invention can be achieved are included in the present invention. For example, in the embodiment, although the substantially U-shaped coil element for a rotary electric machine is used as the electrical conductor, the coil element is not particularly limited as long as the coil element is an electrical conductor. In addition, the configuration of the alignment device is not limited to the configuration of the coil element alignment device 20 as the alignment device in the embodiment.

EXPLANATION OF REFERENCE NUMERALS

1 STATOR MANUFACTURING APPARATUS
20 COIL ELEMENT ALIGNMENT DEVICE (ALIGNMENT DEVICE)
40 COIL ELEMENT (ELECTRICAL CONDUCTOR)
41 ONE LEG PORTION
44 OTHER LEG PORTION
230 GRIPPING DEVICE
232g1 FIXED CLAW (ONE CLAW)
232g2 MOVABLE CLAW (THE OTHER CLAW)
250 DRIVING MECHANISM

The invention claimed is:

1. An alignment method of an electrical conductor in which a plurality of U-shaped electrical conductors are overlapped and are aligned in an annular shape, each U-shaped electrical conductor includes one leg portion and an other leg portion, the method comprising:
   an arranging step of disposing the electrical conductors in an annular shape in plan view at intervals at which the electrical conductors do not overlap in a circumferential direction of the annular shape by causing a plurality of gripping devices disposed in the annular shape to each grip the one end portions of the electrical conductors; and
   an aligning step of aligning the plurality of electrical conductors in the annular shape while overlapping the electrical conductors in a circumferential direction of the annular shape by moving the gripping devices in a radially inward direction of the annular shape,
   wherein each gripping device has a pair of claws gripping the one leg portions of the U-shaped electrical conductors one by one, one claw has a length capable of only gripping the one leg portion of one U-shaped electrically conductor, and the other claw has a length longer than the length of the one claw such that the other claw is capable of gripping the one leg portion of the one U-shaped electrical conductor on a side of the other claw facing the one claw and gripping the other leg portion of another U-shaped electrical conductor on the same side of the other claw.

2. The alignment method according to claim 1, wherein, in the aligning step, the gripping devices are moved radially inward to predetermined positions inside the annular shape, and after moving the gripping devices to the predetermined positions inside the annular shape, while the plurality of electrical conductors are in a state of overlapping and prevented from being moved in the circumferential direction of the annular shape, the gripping devices are moved outward in a radial direction of the annular shape to predetermined outward positions, and are moved from the predetermined outward positions to the predetermined positions inside the annular shape again.

3. An alignment device of an electrical conductor in which a plurality of U-shaped electrical conductors are overlapped and aligned in an annular shape, each U-shaped electrical conductor includes one leg portion and an other leg portion, the device comprising:
   a plurality of gripping devices which are provided in an annular shape and each hold the one leg portions of the electrical conductors; and
   a driving mechanism which moves the plurality of gripping devices in a radial direction of the annular shape,
   wherein each gripping device has a pair of claws capable of pinching the one leg portions of the U-shaped electrical conductors one by one, one claw has a length capable of only gripping the one leg portion of one U-shaped electrical conductor, and the other claw has a length longer than the length of the one claw such that the other claw is capable of gripping the one leg portion of the one U-shaped electrical conductor on a side of the other claw facing the one claw and gripping the other leg portion of another U-shaped electrical conductor on the same side of the other claw.

* * * * *